(12) United States Patent
Geshwind et al.

(10) Patent No.: US 7,652,765 B1
(45) Date of Patent: Jan. 26, 2010

(54) HYPER-SPECTRAL IMAGING METHODS AND DEVICES

(75) Inventors: Frank Geshwind, Madison, CT (US); Andreas C. Coppi, Groton, CT (US); Richard A. Deverse, Kailua-Kona, HI (US); Ronald R. Coifman, North Haven, CT (US); William G. Fateley, Manhattan, KS (US)

(73) Assignee: Plain Sight Systems, Inc., New Haven, CT (US)

( * ) Notice: Subject to any disclaimer, the term of this patent is extended or adjusted under 35 U.S.C. 154(b) by 0 days.

(21) Appl. No.: 10/591,932

(22) PCT Filed: Mar. 7, 2005

(86) PCT No.: PCT/US2005/007585

§ 371 (c)(1),
(2), (4) Date: Nov. 14, 2007

(87) PCT Pub. No.: WO2005/088264

PCT Pub. Date: Sep. 22, 2005

(51) Int. Cl.
*G01J 3/06* (2006.01)
*G01J 3/28* (2006.01)

(52) U.S. Cl. .................................. 356/330
(58) Field of Classification Search ........... 356/310, 356/330
See application file for complete search history.

(56) References Cited

U.S. PATENT DOCUMENTS

| | | | |
|---|---|---|---|
| 4,193,691 A | 3/1980 | Fjarlie et al. | |
| 4,448,529 A | 5/1984 | Krause et al. | |
| 4,790,654 A | 12/1988 | Clarke | |
| 5,061,049 A | 10/1991 | Hornbeck | |
| 5,323,002 A | 6/1994 | Sampsell et al. | |
| 5,483,335 A | 1/1996 | Tobias | |
| 5,504,575 A | 4/1996 | Stafford | |
| 5,506,676 A | 4/1996 | Hendler et al. | |
| 5,567,937 A | 10/1996 | Pinkus | |
| 5,627,639 A * | 5/1997 | Mende et al. | 356/310 |
| 5,737,075 A | 4/1998 | Koch et al. | |
| 5,748,308 A | 5/1998 | Lindberg et al. | |
| 5,828,066 A | 10/1998 | Messerschmidt | |
| 6,046,808 A | 4/2000 | Fateley | |
| 6,128,077 A | 10/2000 | Jovin et al. | |
| 6,128,078 A | 10/2000 | Fateley | |
| 6,373,568 B1 | 4/2002 | Miller et al. | |

FOREIGN PATENT DOCUMENTS

| EP | 0916981 | 5/1999 |
|---|---|---|
| WO | WO-98/35211 | 8/1998 |

* cited by examiner

*Primary Examiner*—F. L Evans
(74) *Attorney, Agent, or Firm*—Fulbright & Jaworski LLP

(57) ABSTRACT

A hyper-spectral imaging system comprises imaging foreoptics (1020) to focus on a scene or object of interest (1010) and transfer the image of said scene or object (1010) onto the focal plane of a spatial light modulator (1030), a spatial light modulator (1030) placed at a focal plane of said imaging foreoptics (1020), an imaging dispersion device (1040) disposed to receive an output image of the spatial light modulator (1030), and an image collecting device disposed to receive the output of the imaging dispersion device (1040).

12 Claims, 58 Drawing Sheets

The Focal Plane of the NIR - DMA Imaging Spectrograph

Filter 1

Filter 1

Example A
1850  1650
Wavelength (nm)

Example B
1850  1650
Wavelength (nm)

Example C
1850  1650
Wavelength (nm)

Example D
1850  1650
Wavelength (nm)

Example E
1850  1650
Wavelength (nm)

Example F
1850  1650
Wavelength (nm)

Side View of Modulator　　Top View of Modulator
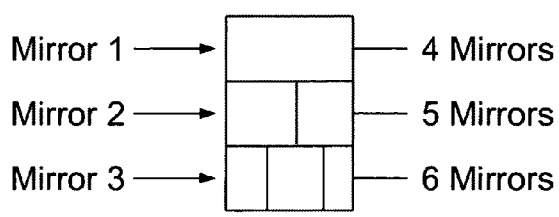
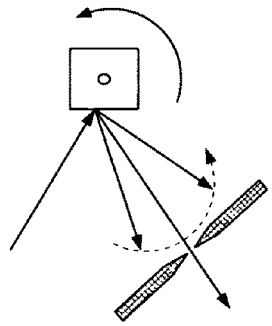
FIG. 14
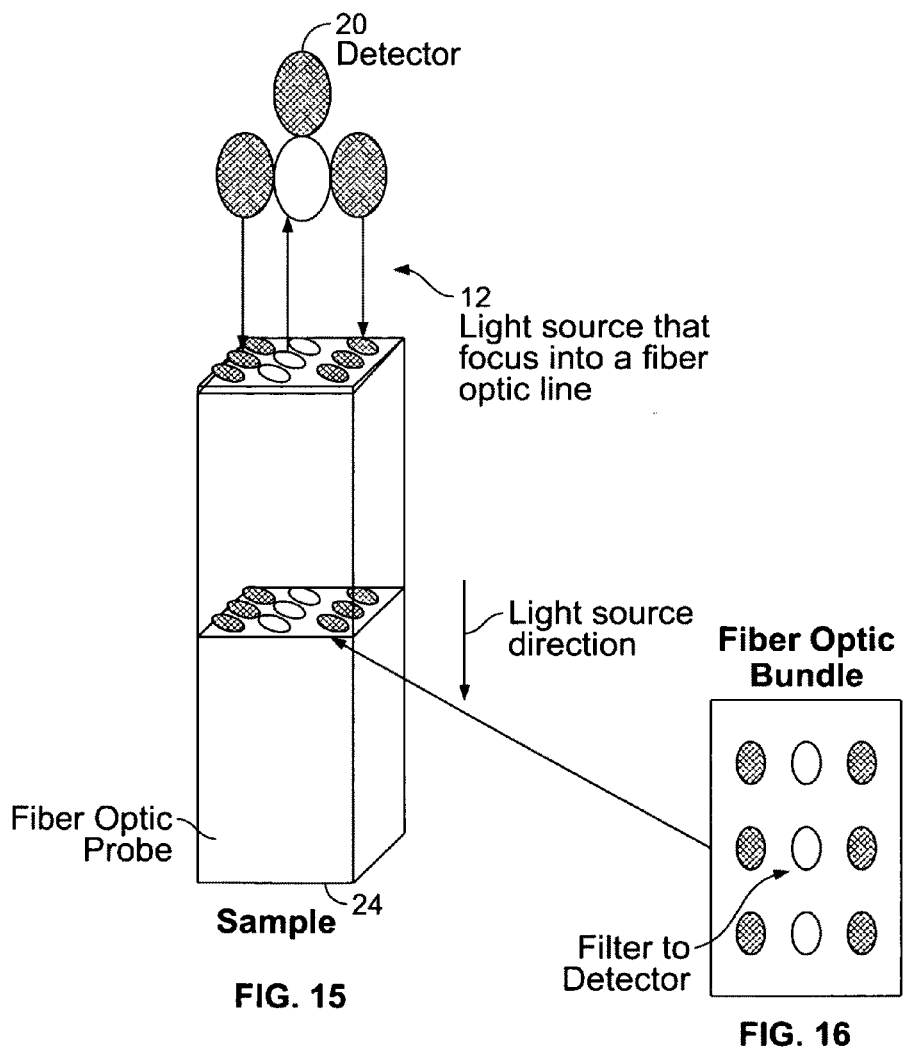
FIG. 15　　FIG. 16

Walsh Packet Library of Patterns of 0,1,-1
All 24 Patterns for 8 Points

Modular Fiber Optic Sensor System

E-Probe for Pierced Ears

E-Probe for Pierced Ears

Effect of Noise on Regression Error for Standard and Walsh Methods

Pushbroom Scan for X Spatial Dimension

F2, 72 Operation PSS NIR TIR 10 Degree DMD

HYPER-SPECTRAL IMAGING METHODS AND DEVICES

RELATED APPLICATIONS

This application is a § 371 from PCT/US2005/007585 filed Mar. 7, 2005, which claims priority benefit of provisional patent application Ser. No. 60/550,614 filed Mar. 6, 2004, which is incorporated by reference in its entirety and is a continuation-in-part of application Ser. No. 10/832,684 filed Apr. 26, 2004, each of which is incorporated by reference in its entirety.

FIELD OF THE INVENTION

The present invention relates generally to methods and devices for hyper-spectral imaging, more particularly to MEMS-modulated-aperture imaging spectrograph systems and methods.

BACKGROUND OF THE INVENTION

Imagers employ either a two-dimensional (2D) multichannel detector array or a single element detector. Imagers using a 2D detector array measure the intensity distribution of all spatial resolution elements simultaneously during the entire period of data acquisition. Imagers using a single detector require that the individual spatial resolution elements be measured consecutively via a raster scan so that each one is observed for a small fraction of the period of data acquisition. Prior art imagers using a plurality of detectors at the image plane can exhibit serious signal-to-noise ratio problems. Prior art imagers using a single element detector can exhibit more serious signal-to-noise ratio problems. Signal-to-noise ratio problems limit the utility of imagers applied to chemical imaging applications where subtle differences between a sample's constituents become important.

Spectrometers are commonly used to analyze the chemical composition of samples by determining the absorption or attenuation of certain wavelengths of electromagnetic radiation by the sample or samples. Because it is typically necessary to analyze the absorption characteristics of more than one wavelength of radiation to identify a compound, and because each wavelength must be separately detected to distinguish the wavelengths, prior art spectrometers utilize a plurality of detectors, have a moving grating, or use a set of filter elements. However, the use of a plurality of detectors or the use of a macro moving grating has signal-to-noise limitations. The signal-to-noise ratio largely dictates the ability of the spectrometer to analyze with accuracy all of the constituents of a sample, especially when some of the constituents of the sample account for an extremely small proportion of the sample. There is, therefore, a need for imagers and spectrometers with improved signal-to-noise ratios.

Prior art variable band pass filter spectrometers, variable band reject filter spectrometers, variable multiple band pass filter spectrometers or variable multiple band reject filter spectrometers typically employ a multitude of filters that require macro moving parts or other physical manipulation in order to switch between individual filter elements or sets of filter elements for each measurement. Each filter element employed can be very expensive, difficult to manufacture and all are permanently set at the time of manufacture in the wavelengths (bands) of radiation that they pass or reject. Physical human handling of the filter elements can damage them and it is time consuming to change filter elements. There is, therefore, a need for variable band pass filter spectrometers, variable band reject filter spectrometers, variable multiple band pass filter spectrometers or variable multiple band reject filter spectrometers without a requirement for discrete (individual) filter elements that have permanently set band pass or band reject properties. There is also a need for variable band pass filter spectrometers, variable band reject filter spectrometers, variable multiple band pass filter spectrometers or variable multiple band reject filter spectrometers to be able to change the filters corresponding to the bands of radiation that are passed or rejected rapidly, without macro moving parts and without human interaction.

In several practical applications it is required that an object be irradiated with radiation having particularly shaped spectrum. In the simplest case when only a few spectrum lines (or bands) are necessary, one can use a combination of corresponding sources, each centered near a required spectrum band. Clearly, however, this approach does not work in a more general case, and therefore it is desirable to have a controllable radiation source capable of providing arbitrary spectrum shapes and intensities. Several types of prior art devices are known that are capable of providing controllable radiation. Earlier prior art devices primarily relied upon various "masking" techniques, such as electronically alterable masks interposed in the optical pathway between a light source and a detector. More recent prior art devices use a combination of two or more light-emitting diodes (LEDs) as radiation sources. In such cases, an array of LEDs or light-emitting lasers is configured for activation using a particular encoding pattern, and can be used as a controllable light source. A disadvantage of these systems is that they rely on an array of different LED elements (or lasers), each operating in a different, relatively narrow spectrum band. In addition, there are technological problems associated with having an array of discrete radiation elements with different characteristics. Accordingly, there is a need for a controllable radiation source, where virtually arbitrary spectrum shape and characteristics can be designed, and where disadvantages associated with the prior art are obviated. Further, it is desirable not only to shape the spectrum of the radiation source, but also encode its components differently, which feature can be used to readily perform several signal processing functions useful in a number of practical applications. The phrase "a spectrum shape" in this disclosure refers not to a mathematical abstraction but rather to configurable spectrum shapes having range (s) and resolution necessarily limited by practical considerations.

In addition to the signal-to-noise issues discussed above, one can consider the tradeoff between signal-to-noise and, for example, one or more of the following resources: system cost, time to measure a scene, and inter-pixel calibration. Thus, in certain prior art systems, a single sensor system may cost less to produce, but will take longer to fully measure an object under study. In prior art multi-sensor systems, one often encounters a problem in which the different sensor elements have different response characteristics, and it is necessary to add components to the system to calibrate for this. It is desirable to have a system with which one gains the lower-cost, better signal-to-noise, and automatic inter-pixel calibration advantages of a single-sensor system while not suffering all of the time loss usually associated with using single sensors.

The conventional spectral imaging systems can be generally categorized into three types: so-called pushbroom imagers, filter scanned imagers, and modulated focal plane array systems. FIG. 60 depicts a typical pushbroom spectral imaging system. In pushbroom imagers, a scene 8000 is imaged onto the entrance aperture of an imaging spectrograph containing a slit mask 8010. One column of spatial resolution elements defined by rows of detectors at the focal plan of an imaging spectrograph are spectrally imaged through the slit for each frame of data captured by the focal plane. The light from the slit is spectrally dispersed 8020 along a direction perpendicular to the direction of the slit, generating a rectangular image 8030 which varies spatially along an axis parallel to the slit, and spectrally along the orthogonal axis. A focal plane array is typically used to capture the rectangular image. To image a scene, the slit is translated such that it moves incrementally across the scene, with the pushbroom system collecting one image for each position of the slit. In this way, the pushbroom system collects a so-called hyper-spectral image cube of the scene. Note that it is standard in the art to refer to such a dataset as an image cube or a data cube or a datacube. This use of "cube" is imprecise, in that the underlying dataset may be rectangular (i.e. not necessarily of the same size in all 3 dimensions). The scanning of the slit across the scene may be accomplished by moving the imaging system, moving the scene or an object of interest, or optical scanning (e.g. with a moving (macro) mirror).

However, the slit must be very narrow in the pushbroom system to achieve the desired spectral resolution. At any given time, a narrow slit only accepts a very small fraction of the light from the entire scene, thus making the hyper-spectral imaging systems much less sensitive than the conventional imaging systems. That is, the pushbroom system will either acquire data of low signal to noise ratio or take longer to acquire the data. In the latter case, the pushbroom system is limited to imaging scenes that do not change over time. For changing scenes, the pushbroom system will suffer from artifacts.

Additionally, the scanning must be mechanically precise with the pushbroom system. Any scanning errors due to mechanical imprecision in the pushbroom system will result in a distorted data set. Further, the need to move the camera or the object of interest in certain pushbroom system is undesirable for a variety of reasons, including but not limited to the corresponding costs and complexities of associated additional system components, and the limitation that the system may only be used in contexts where it is possible to move the object or the camera in a controlled manner.

In filter scanned imagers, an ordinary broadband camera images a scene of interest, but a tunable filter is inserted somewhere in the optical path between the scene and the camera. The filter may be a liquid crystal tunable filter such as a CRI VariSpec LCTF (see. http://www.cri-inc.com/files/VariSpec_Brochure.pdf), or any similar device that transmits a narrowband of wavelengths at any given time, with the center wavelength of the band tunable in time. FIG. 31 depicts a typical liquid crystal tunable filter scanned spectral imaging system 3000. Light from the object 3010 enters the collimating lens system 3020 where it encounters the liquid crystal tunable filter system 3030 and then propagates onto the focusing lens system 3040 where the object is focused onto the focal plane 3050.

However, the bandpass of the filter in the filter scanned imager must be very narrow to achieve the desired spectral resolution. Like the slit in the pushbroom systems, at any given time, a narrow bandpass only accepts a very small fraction of the light from the entire scene, thus making the hyper-spectral imaging systems much less sensitive than ordinary imaging systems. That is the filter scanning system will either acquire data of low signal to noise ratio (SNR) or take longer to acquire the data. In the latter case, the filter scanning system is only limited to imaging scenes that do not change over time. For changing scenes, the filter scanning system will suffer from artifacts.

Multiplexed focal plane array spectral imaging systems, such as Fourier transform interferometric imaging systems, typically employ an imaging optical system, the output of which is passed through an interferometric assembly, and then imaged onto a focal plane array. As the interferometer is scanned, a multiplexed spectral image is acquired. FIG. 32 depicts a conventional scanning multiplexed focal plane array spectral imaging system, such as a Fourier transform focal plane array spectral imaging system 4000. The object source 4010 is collected by image grade collimating optics 4020 where it is collimated onto a beam splitter 4030 that splits the energy 50/50 to stationary mirror 4040 and to a moving mirror 4050. This is then recombined at the beamsplitter 4030 and propagates onto the focusing optics 4060 and is re-imaged onto the focal plane 4070.

However, in Fourier transform interferometric imaging and other similar systems, distortions and extreme system sensitivities can result from passing the light of an imaging system through an interferometer. This leads to the distorted data, as well as system complexity and extreme sensitivity of motion.

Each of the foregoing prior art systems scans through a full hyper-spectral datacube. However, the output of such measurement from such prior art system is generally an input to an algorithm that processes each pixel, and produces an answer consisting one or a few numbers per pixel. For example, these could be the output of a set of inner products, as is standard in the art of chemometrics. Since hyper-spectral datacubes contain a large amount of data and the answer consists of a smaller amount of data, it is desirable to find a method for directly measuring such answer. In other words, it is desirable to find a method for enabling adaptive measurements of spectral image parameters.

Conventional Hadamard transform spectroscopy (HTS), Hadamard transform imager (HTI), and Hadamard transform spectral imager (HTSI) overcome only some of the limitations and problems described herein. Hadamard optical systems utilize spatially encoded apertures that can be employed either at the entrance aperture of an optical system, the exit aperture or both. They have the common attribute that they encode the available aperture spatially where the spatial resolution elements that make up the encodement dictate the spectral, spatio-spectral or spatial resolution elements that propagate through the optical system including diffractive optical elements and on to the sensor or exit aperture. These masks have some spatial extent that places special requirements on the optics of the system. As the encodement mask grows either by longer length encodements with fixed sub-apertures or as the sub-aperture dimension grows for a fixed encodement length, the spatial resolution elements making up the sub-apertures in the encodement mask depart from the optical axis. When the resolution elements depart from the optical axis or paraxial condition it is desirable to employ optics that can image the off axis resolution elements without inducing excessive aberrations that degrade the performance or cripple the advantages gained by Hadamard transform (HT) multiplexing.

Typically the optical path for conventional monochromators begins with a source that is focused onto an aperture plane that has a large aspect ratio aperture known as a slit. This slit is often very small in extent in the dispersion plane compared to the other extent in the spatial plane. However, it is not required that this aspect ratio be large. If the aspect ratio is close to 1 then simple spherical optics can be employed that perform well as long as the departure from the optical axis is kept to a minimum. However, most monochromators have a large aspect ratio in order to increase the opportunity to maximize throughput, and detectors must be able to "see" the large extent of the slit aperture. The light entering the slit aperture is then dispersed and focused onto an exit slit aperture. Monochromators generally perform well on the optical axis and do not typically employ optics that can manage rays that depart from the optical axis in the plane of dispersion as required by HT multiplexing instruments. The optical system generally utilizes optical performance attributes normally found only in imaging and spectral imaging systems to employ encoding techniques. This requirement is driven by the extent of the encoding mask. The extent of the encoding mask is governed by the diffraction limit of the wavelengths within the bandpass, the encodement length N and the attributes of the optical system.

In a conventional dispersive spectrometer the radiation from a source is collected and separated into it's individual spectral resolution elements by a spectral separator such as a diffraction grating or prism and then is collected and focused for spatial presentation on a focal plane. The dispersive spectrometer uses a single exit slit to select one spectral resolution element of N spectral resolution elements for measurement by the detector. The Hadamard transform spectrometer (HTS) uses an array of slits (i.e. a mask) at the focal plane to select one more than half, $(N+1)/2$, of the spectral resolution elements at the focal plane for measurement by the detection system. The optical challenge to effect an HT multiplexing spectrometer is to collect all of the spatially distributed individual band pass images of the entrance slit and transfer them to as small detector as possible. It is desirable to keep the area of the detector at a minimum as the noise of many detectors increases with the square of the area. If the optics are able to illuminate a single detector element with all of the available light impinging upon the focal plane containing the spatially distributed images of the slit for each of the N band pass resolution elements, a multitude of spectral resolution elements can be measured simultaneously using a single detector element. This arrangement results in a multiplexing spectrometer. The recovery of N spectral resolution elements requires measuring the detector response for N different encodements of $(N+1)/2$ open mask elements. The raw data is recorded as the detector response versus encodement number and is called an encodegram. Hadamard transformation of the encodegram yields the spectrum.

The Hadamard transform instruments developed in the 1960s and 1970s employed moving masks. Significant problems such as misalignment and jamming associated with a moving mask led to a reputation of poor reliability and contributed to a dormant period in the development of Hadamard transform spectrometer (HTS) and Hadamard transform imager (HTI). Interest was rekindled in the 1980s using stationary Hadamard encoding mask based on liquid crystal (LC) technology. The first generation 1D stationary Hadamard encoding mask was a cholesteric LC with $N=127$ mask elements and used polarization as its operating phenomenon. Two parallel polarizers and rotation or lack of rotation of the polarized radiation generated the opaque and transparent states, respectively. The second generation 1D stationary Hadamard encoding mask was fabricated using a polymer dispersed liquid crystal (PDLC) material with $N=255$ mask elements and used light scattering as its operating phenomenon. The PDLC contained LC droplets dispersed in a polymer matrix whose index of refraction matched the index of refraction in one direction in the birefringent LC droplet. Alignment of the LC droplets optical axis under an applied voltage removed discontinuities in index of refraction at the polymer matrix/LC interface to generate a good transparent state while random orientation of LC droplets in the polymer matrix generated the opaque state from light scattering by the discontinuities in index of refraction at the polymer matrix/LC droplet interface. A 2D stationary Hadamard encoding mask was also based on LC technology. A fero-electric liquid crystal (FLC) positioned between a pair of polarizers with perpendicular orientation operated as an electro-optic half-wave plate when a + value of applied voltage rotated the plane of polarization by 90 degrees to produce the transparent state and a − value of applied voltage left the plane of polarization unaltered to produce the opaque state.

Development based on stationary Hadamard encoding masks continued in the 1990s and a 2D moving Hadamard encoding mask was also fabricated and used to perform imaging in the near-infrared and mid-infrared spectral regions. Note that the mid-infrared spectral region is not generally accessible via Hadamard encoding masks based on LC technology since any LC material generally has strong absorption bands in the mid-infrared spectral region. A stationary Hadamard encoding mask of available for the visible and near-infrared spectral regions is the digital micro-mirror device (DMD), a device based on micro-optoelectromechanical systems (MOEMS) technology and developed by Texas Instruments for projector display applications. One DMD format incorporates 508,800 micro-mirrors in a 848 column by 600 row array that is 14.4 mm wide by 10.2 mm high. Each individual micro-mirror is 16 microns square and adjacent micro-mirrors are separated by a 1 μm gap. The micro-mirrors are individually addressable and rotatable by +10 or −10 degrees about the diagonal axis to produce binary "on" and "off" states. The on state has Tt determined by the mirror reflectivity and approaches 1 while the off state approaches To=0. However, the ideal condition of on and off is not realized due to diffraction of the light off of the small and periodic features of the micro-mirror device.

The DMD is an array of spatial resolution elements that can be selected as groups of super-resolution elements or as individual resolution elements consisting of a single micro-mirror. The DMD resolution elements are disposed as spectral resolution elements in the spectrometer with the columns attributed to the frequency or wavelength dimension and the rows attributed to the slit height dimension. The DMD resolution elements are utilized as spatio-spectral resolution elements in the imaging spectrograph with the columns as the frequency or wavelength dimension and the rows as a vertical spatial dimension with the horizontal spatial dimension being accessed, if desired, by translating the sample relative to the imaging spectrograph. The DMD resolution elements are spatial resolution elements in the imager with the columns for the horizontal dimension and the rows for the vertical dimension and the frequency or wavelength dimension provided by other instrumentation. If a photo-acoustic detection system to is present then the depth dimension of the sample can also be accessed by changing the modulation frequency used in the photo-acoustic detection system.

The notable features of HTS, HTI and HTSI are: a multiplexing technique using a single-element detector; uses a Hadamard encoding mask (multi-slit array) in the focal plane; sends one more than half the resolution elements to the single-element detector in an encodement; uses a number of encodements equal to the number of resolution elements desired and the number of mask elements (pixels) in the stationary Hadamard encoding mask (a moving Hadamard encoding mask has $2N-1$ mask elements); each encodement contains a different combination of one more than half the resolution elements; the primary data is the encodegram, a record of detector response versus encodement number; and uses a FHT of the encodegram to decode the encodegram and generate the spectrum or image. Additionally, HTS is a dispersive technique using a single-element detector.

However even considering these notable features of HTS, HTI and HTSI, there is still a need for a multiplexed spectral imaging system that can accomplish its multiplexing and scene scanning without macro-moving parts while maintaining the advantages of a DMD-based Hadamard transform spectral image collection system. Additionally, the present invention proceeds upon the desirability of providing such system that can be digitally controlled, enabling adaptive measurement of spectral image parameters.

Beginning with Martin Harwit's pioneering design, U.S. Pat. No. 3,720,469, extending M. Golay's fundamental work of the 1940's to Hadamard transform imaging spectroscopy, many novel spectrographs have been conceived that apply fixed optical masks mechanically scanned with respect to the object being imaged. We note two relevant recent examples that employ novel mask designs and coded apertures schemes similar to the present invention, but different in that they require mechanical translation of a fixed mask.

Stephen Mende, in U.S. Pat. No. 5,627,639, discloses various coded aperture methods for imaging spectrographs. He employs novel Hadamard mask including the possibility of a spatial light modulator (LCD) but still requires the scene being imaged to be translated with respect to the mask.

Whereas, in "HADAMARD imaging spectrometer with microslit matrix", Rainer Riesenberg; Ulrich Dillner; Proc. SPIE Vol. 3753, p. 203-213 (October 1999), the authors describe a fixed novel MEMS mask consisting of tiny mirror pixels arranged in a coded pattern. However, the mirrors are fixed and, again, the mask is placed at the entrance of an imaging spectrograph and mechanically scanned across the aperture in order to Hadamard encode the input.

Given the recent developments in micro-mirror array technology, pioneered by Texas Instruments™, the ability to digitally control the position of the individual mirrors has enabled several novel spectrograph designs that no longer require scanning in the conventional sense. For example, in "Characterization of a digital micromirror device for use as an optical mask in imaging and spectroscopy", Kevin J. Kearney; Zoran Ninkov; Proc. SPIE Vol. 3292, p. 81-92 (April 1998), the authors propose a design for a Multi-Object-Spectrograph (MOS). Their system involves an imaging spectrograph with a micro-mirror array placed at the entrance image plane. The mirrors are adaptively used to select a single object per line of the array but at any location within that line, thus allowing the spectrograph to query multiple objects in the scene no longer necessarily vertically aligned as required by conventional line-scanning spectrographs. However, in a sense, this system uses a spatial light modulator to avoid the multiplexing taken advantage of in the present invention that intentionally records overlapping spectra on the focal plane array.

OBJECT AND SUMMARY OF THE INVENTION

An object of the present invention is provide a hyper-spectral imaging system which uses a micro-mirror array instead of the traditional entrance slit of a conventional spectral measurement system. In accordance with an embodiment of the present invention, the detector of the hyper-spectral imaging system as aforesaid comprises a camera, charge coupled device (CCD), focal plane array or other similar device.

In accordance with an embodiment of the present invention, a scene or object of interest is imaged onto a spatial light modulator. The spatial light modulator is used to pass or reject the spatial resolution elements of the image. The selected spatial resolution elements propagate through an imaging spectrograph system and are spectrally imaged onto a focal plane array sensor.

In accordance with an embodiemtn of the present invention, the hyper-spectral imaging system is capable of multiplexed measurements, including Hadamard hyper-spectral imaging and an adaptive multiplexing. It is appreciated that applications of the present invention in spectrometry and imaging are not limited to HT techniques since the information corresponding to any micro-mirror in the DMD can be included in or excluded from any measurement as desired by the investigator or operator. In accordance with an aspect of the present invention, an instrument comprising no moving parts other than the micro-mirrors in the DMD provides a compact and robust instrument for operation in rugged or potentially hostile environments ranging from process control to outer space.

Advantages of the present invention, include but not limited to, extended hours of operability, operable capabilitites beyond the conventional single slit spectral imaging systems, improved signal to noise ratios, increased sensitivity for chemistry and features of interest in hyper-spectral imagery and spectral data, faster information delivery, smaller bandwidth for telemetry of data, and post processing reduction of data.

In accordance with an embodiment of the present invention, the hyper-spectral imaging system is a DMD-modulated-aperture imaging spectrograph system operable in the near-infrared or a Near-infrared Spectral Target Identification System (NSTIS). The NSTIS comprises fore optics for imaging a scene of interest, a micro-mirror array spatial light modulator (SLM or a digital micro-mirror device (DMD)), a diffraction grating and an infrared camera, a device for transferring images between these optical components, and electronics to drive the SLM.

It is intended that the devices and methods in this application in general are capable of operating in various ranges of electromagnetic radiation, including the ultraviolet, visible, infrared, and microwave spectrum portions. Further, it will be appreciated by those of skill in the art of signal processing, be it acoustic, electric, magnetic, etc., that the devices and techniques disclosed herein for optical signal processing can be applied in a straightforward way to those other signals as well.

BRIEF DESCRIPTION OF THE DRAWINGS

The present invention will be understood and appreciated more fully from the following detailed description, taken in conjunction with the drawings in which:

FIGS. 11-14 illustrate alternative embodiments of a modulating spectrometer in accordance with this invention; FIG. 12 illustrates an embodiment of a complete modulating spectrometer in which the DMA element is replaced by the concave mirrors of FIG. 11. FIG. 13 illustrates a modulating lens spectrometer using lenses instead of DMA, and a "barber pole" arrangement of mirrors to implement variable modulation. FIG. 14. illustrates a "barber pole" modulator arrangement;

FIGS. 15 and 16 illustrate an embodiment of this invention in which one or more light sources provide several modulated spectral bands using a fiber optic bundle;

FIG. 24 is a flow chart of a raster-scan used in one embodiment of the present invention; FIG. 25 is a flowchart of a Walsh-Hadamard scan used in accordance with another embodiment of the invention. FIG. 26 is a flowchart of a multi-scale scan, used in a different embodiment.

FIGS. 41-1 and 41-2 illustrate the top 10 wavelet packets in local regression basis selected using 50 training samples in the example of FIG. 40;

DETAILED DESCRIPTION OF THE EMBODIMENTS

Figure 1A:
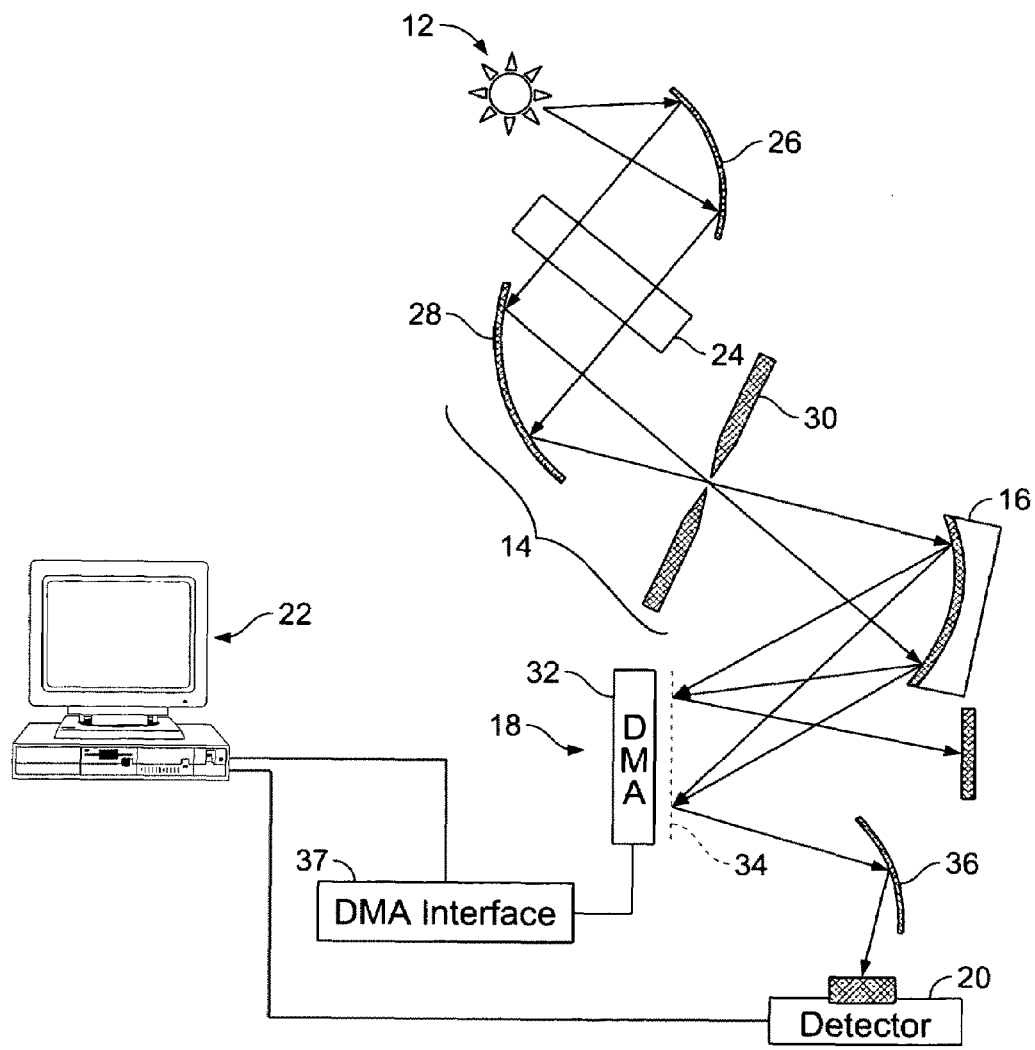
FIGS. 1A and 1B are schematic diagrams illustrating a spectrometer constructed in accordance with two embodiments of the invention.
Figure 1B:
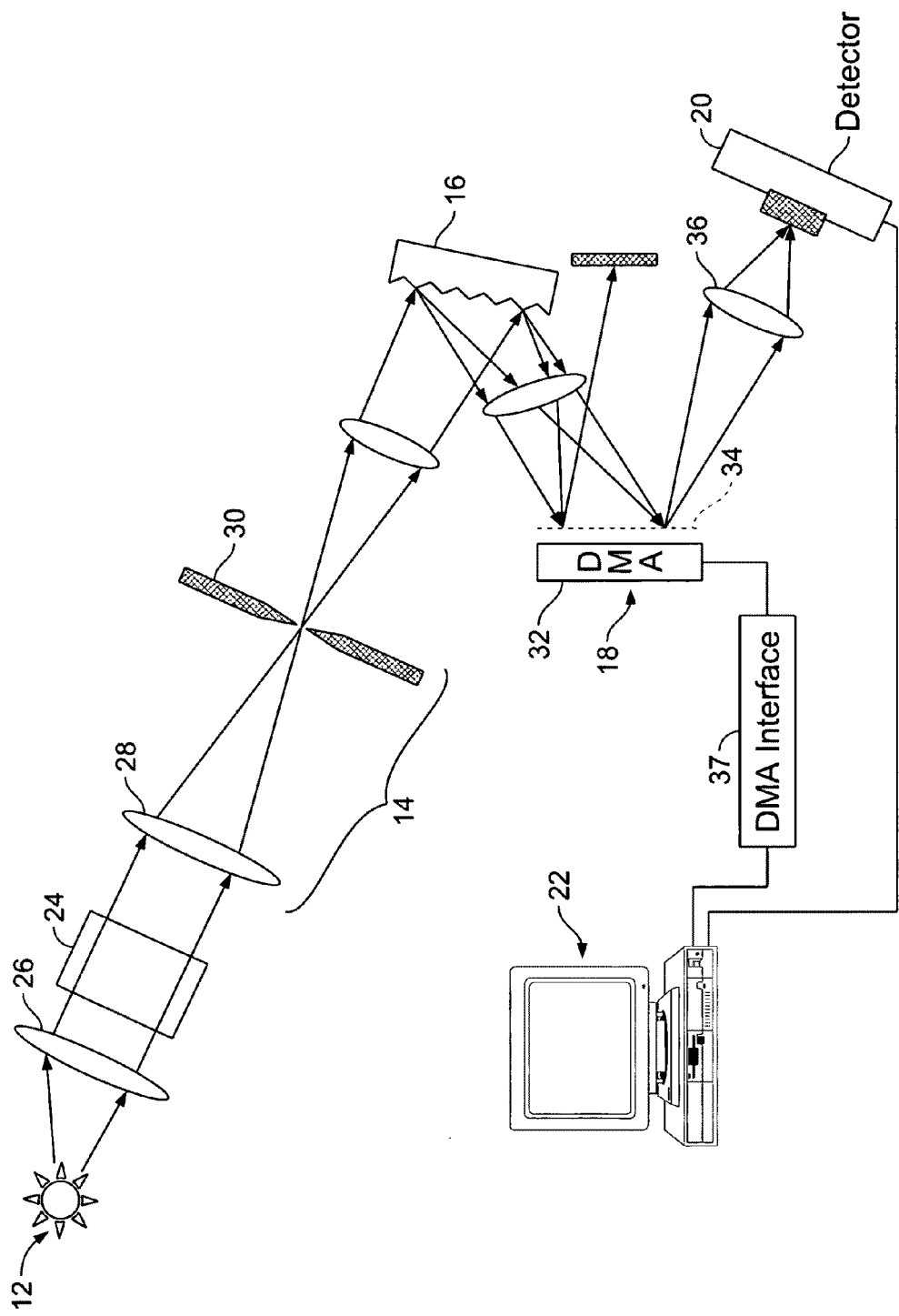

Turning now to the drawing figures and particularly FIGS. 1A and 1B, a spectrometer assembly 10 constructed in accordance with one embodiment of the invention is illustrated.

With reference to FIG. 1A the device broadly includes a source 12 of electromagnetic radiation, a mirror and slit assembly 14, a wavelength dispersing device 16, a spatial light modulator 18, a detector 20, and an analyzing device 22.

In particular, the electromagnetic radiation source 12 is operable to project rays of radiation onto or through a sample 24 that is to be analyzed, such as a sample of body tissue or blood. The radiation source can be any device that generates electromagnetic radiation in a known wavelength spectrum such as a globar, hot wire, or light bulb that produces radiation in the infrared spectrum. To increase the amount of rays that are directed to the sample, a parabolic reflector 26 can be interposed between the source 12 and the sample 24. In a specific embodiment, the source of electromagnetic radiation is selected as to yield a continuous band of spectral energies, and is referred to as the source radiation. It should be apparent that the energies of the radiation source are selected to cover the spectral region of interest for the particular application.

The mirror and slit assembly 14 is positioned to receive the radiation rays from the source 12 after they have passed through the sample 24 and is operable to focus the radiation onto and through an entrance slit 30. The collection mirror 28 focuses the radiation rays through slit 30 and illuminates the wavelength dispersing device 16. As shown in diagram form in FIG. 1B, in different embodiments of the invention radiation rays from the slit can also be collected through a lens 15, before illuminating a wavelength dispersion device 16.

The wavelength dispersing device 16 receives the beams of radiation from the mirror and slit assembly 14 and disperses the radiation into a series of lines of radiation each corresponding to a particular wavelength of the radiation spectrum. The preferred wavelength dispersing device is a concave diffraction grating; however, other wavelength dispersing devices, such as a prism, can be utilized. In a specific embodiment, the wavelengths from the dispersing device 16 are in the near infrared portion of the spectrum and can cover, for example, the range of 1650-1850 nanometers (nm). It should be emphasized, however, that in general this device is not limited to just this or to any spectral region. It is intended that the dispersion device in general is capable of operating in other ranges of electromagnetic radiation, including the ultraviolet, visible, infrared, and microwave spectrum portions, as well as acoustic, electric, magnetic, and other signals, where applicable.

Figure 2:
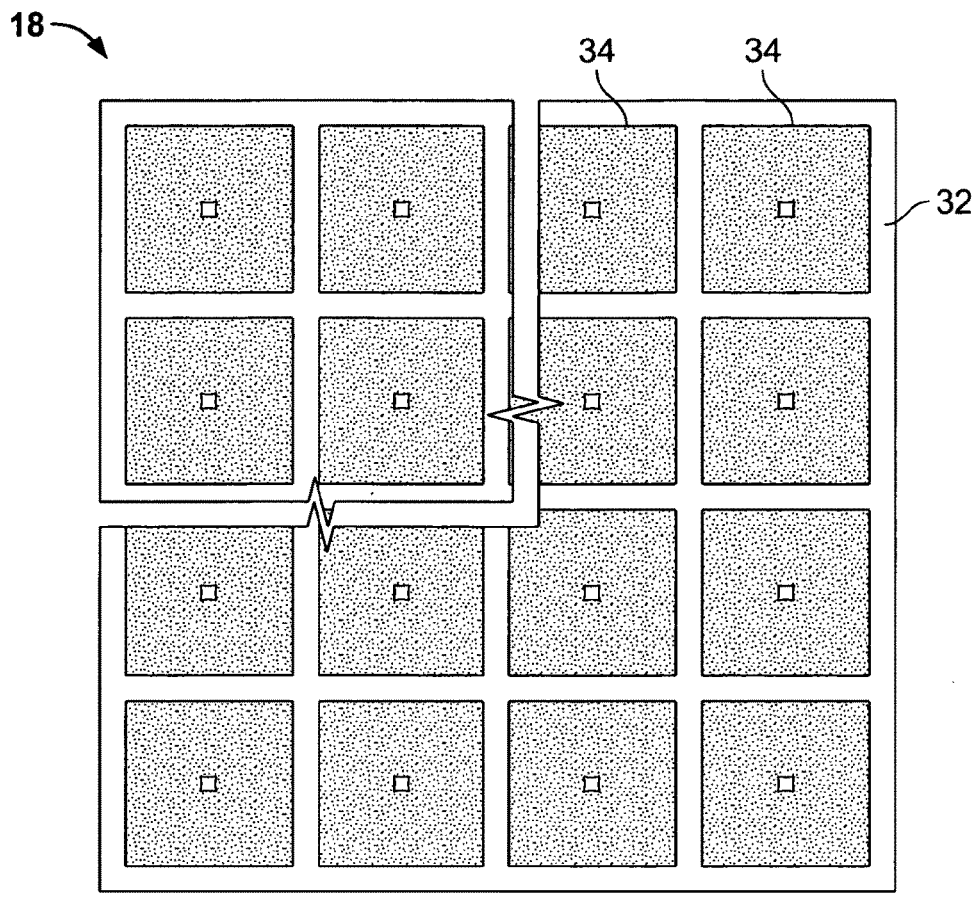
FIG. 2 is a plan view of a micro-mirror array used in the present invention.

The spatial light modulator (SLM) 18 receives radiation from the wavelength dispersing device 16, individually modulates each spectral line, and reflects the modulated lines of radiation onto the detector 20. As illustrated in FIG. 2, the SLM is implemented in a first preferred embodiment as a micro-mirror array that includes a semi-conductor chip or piezo-electric device 32 having an array of small reflecting surfaces 34 thereon that act as mirrors. One such micro-mirror array is manufactured by Texas Instruments and is described in more detail in U.S. Pat. No. 5,061,049, hereby incorporated into the present application by reference. Those skilled in the art will appreciate that other spatial light modulators, such as a magneto-optic modulator or a liquid crystal device can be used instead of the micro-mirror array. Various embodiments of such devices are discussed in more detail below.

Figure 3:
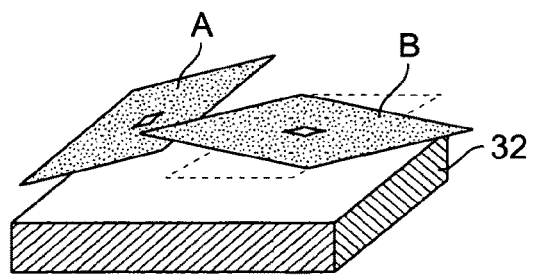
FIG. 3 is a schematic diagram of two micro-mirrors illustrating the modulations of the mirrors of the micro-mirror device of FIG. 2.

The semi-conductor 32 of the micro-mirror array 18 is operable to individually tilt each mirror along its diagonal between a first position depicted by the letter A and a second position depicted by the letter B in FIG. 3. In preferred forms, the semi-conductor tilts each mirror 10 degrees in each direction from the horizontal. The tilting of the mirrors 34 is preferably controlled by the analyzing device 22, which can communicate with the micro-mirror array 18 through an interface 37.

The micro-mirror array 18 is positioned so that the wavelength dispersing device 16 reflects each of the lines of radiation upon a separate column or row of the array. Each column or row of mirrors is then tilted or wobbled at a specific and separate modulation frequency. For example, the first row of mirrors can be wobbled at a modulation frequency of 100 Hz, the second row at 200 Hz, the third row at 300 Hz, etc.

In a specific embodiment, the mirrors are calibrated and positioned so that they reflect all of the modulated lines of radiation onto a detector 20. Thus, even though each column or row of mirrors modulates its corresponding line of radiation at a different modulation frequency, all of the lines of radiation are focused onto a single detector.

The detector 20, which can be any conventional radiation transducer or similar device, is oriented to receive the combined modulated lines of radiation from the micro-mirror array 18. The detector is operable for converting the radiation signals into a digital output signal that is representative of the combined radiation lines that are reflected from the micro-mirror array. A reflector 36 can be interposed between the micro-mirror array 18 and the detector 20 to receive the combined modulated lines of radiation from the array and to focus the reflected lines onto the detector.

The analyzing device 22 is operably coupled with the detector 20 and is operable to receive and analyze the digital output signal from the detector. The analyzing device uses digital processing techniques to demodulate the signal into separate signals each representative of a separate line of radiation reflected from the micro-mirror array. For example, the analyzing device can use discrete Fourier transform processing to demodulate the signal to determine, in real time, the intensity of each line of radiation reflected onto the detector. Thus, even though all of the lines of radiation from the micro-mirror array are focused onto a single detector, the analyzing device can separately analyze the characteristics of each line of radiation for use in analyzing the composition of the sample.

Figure 4:
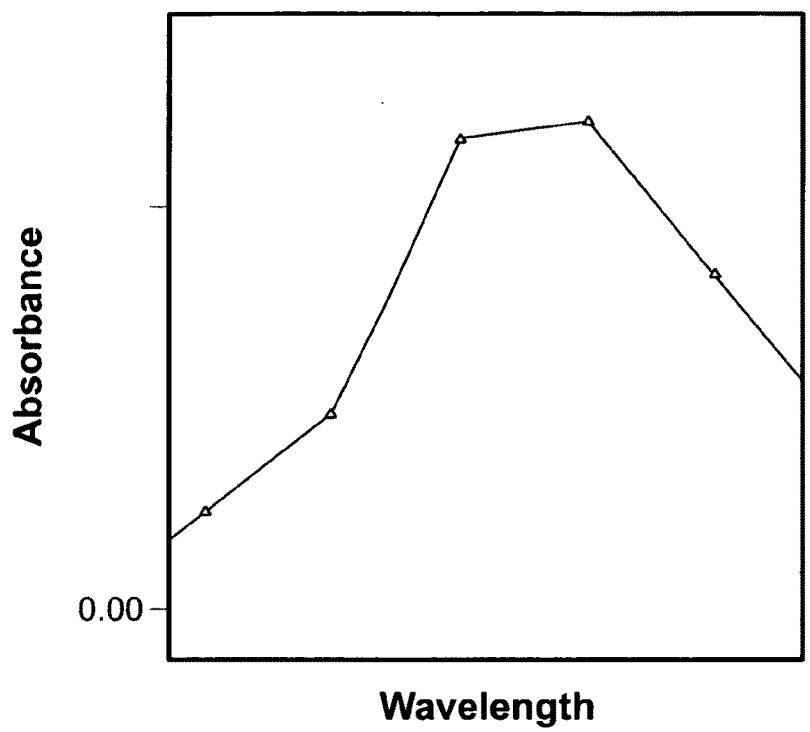
FIG. 4 is a graph illustrating an output signal of the spectrometer when used to analyze the composition of a sample.

In accordance with one embodiment of this invention, the analyzing device is preferably a computer that includes spectral analysis software. FIG. 4 illustrates an output signal generated by the analyzing device in accordance with one embodiment. The output signal illustrated in FIG. 4 is a plot of the absorption characteristics of five wavelengths of radiation from a radiation source that has passed through a sample.

Figure 5:
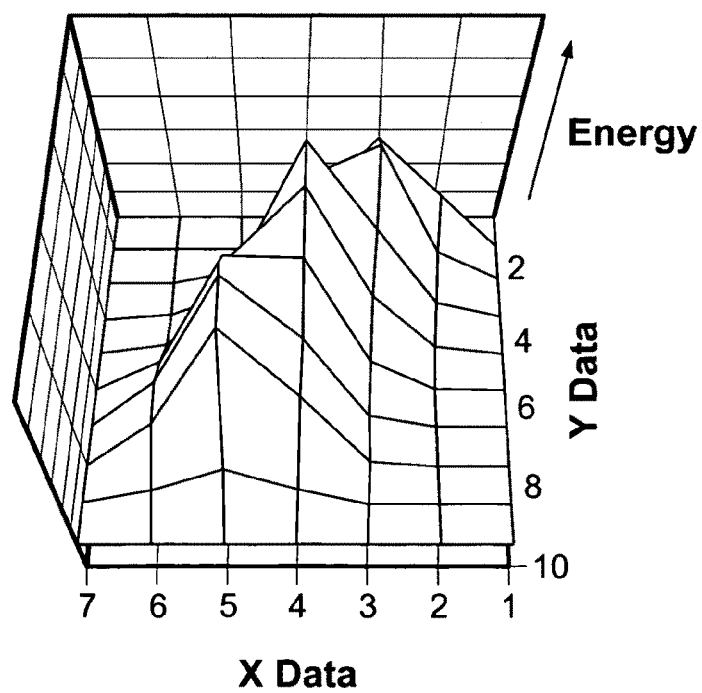
FIG. 5 is a graph illustrating an output signal of the imager when used for imaging purposes.
Figure 6:
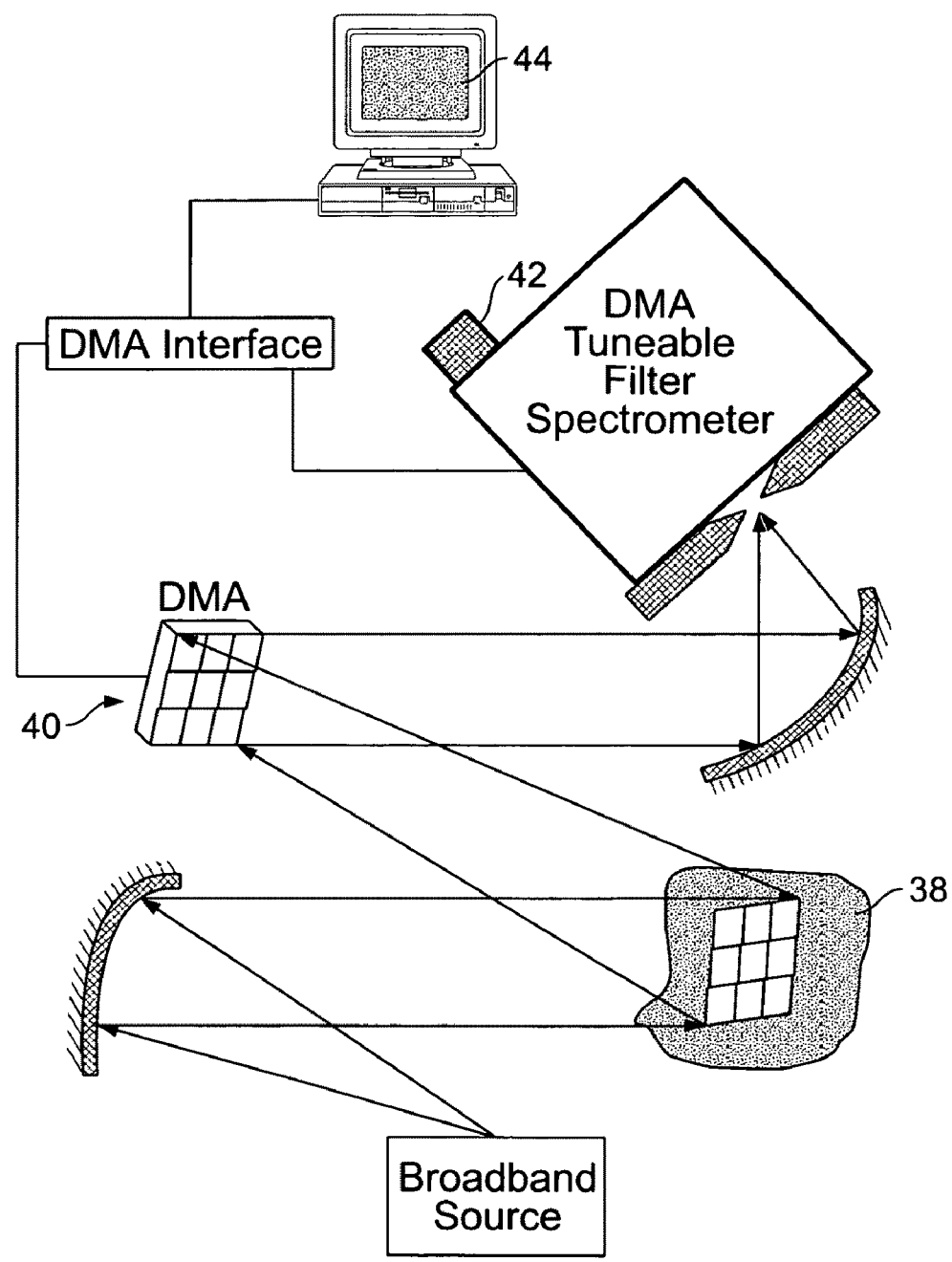
FIG. 6 is a schematic diagram illustrating an imager constructed in accordance with a preferred embodiment of the invention.
Figure 6A:
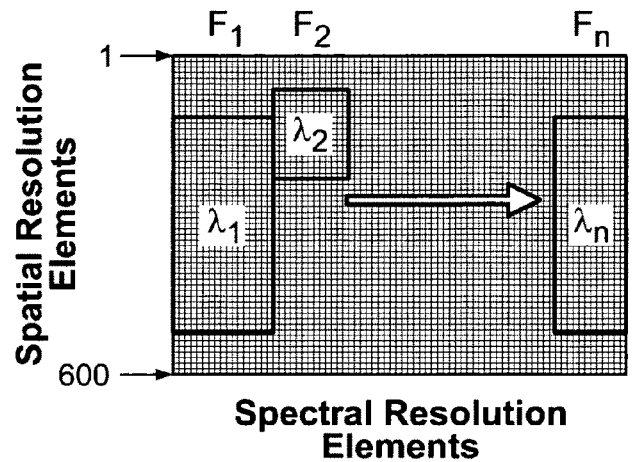
FIG. 6A illustrates spatio-spectral distribution of a DMA, where individual elements can be modulated.

In one embodiment of the system of this invention illustrated in FIG. 6A, it is used for digital imaging purposes. In particular, when used as an imaging device, an image of a sample 38 is focused onto a micro-mirror array 40 and each micro-mirror in the array is modulated at a different modulation rate. The micro-mirror array geometry is such that some or all of the reflected radiation impinges upon a single detector element 42 and is subsequently demodulated to reconstruct the original image improving the signal-to-noise ratio of the imager. Specifically, an analyzing device 44 digitally processes the combined signal to analyze the magnitude of each individual pixel. FIG. 6B illustrates spatio-spectral distribution of the DMA, where individual elements can be modulated. FIG. 5 is a plot of a three dimensional image showing the magnitude of each individual pixel.

Figure 7:
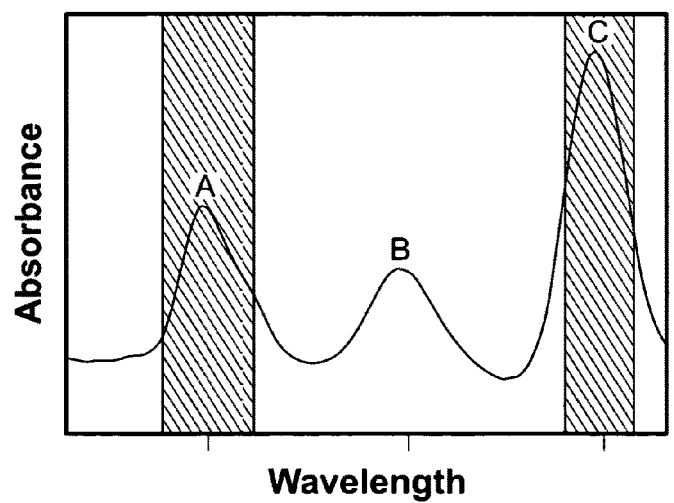
FIG. 7 is an illustration of the input to the DMA Filter Spectrometer and its use to pass or reject wavelength of radiation specific to constituents in a sample.

FIG. 7 illustrates the output of a digital micro-mirror array (DMA) filter spectrometer used as a variable band pass filter spectrometer, variable band reject filter spectrometer, variable multiple band pass filter spectrometer or variable multiple band reject filter spectrometer. In this embodiment, the combined measurement of the electromagnetic energy absorbed by sample constituents A and C is of interest. The shaded regions in FIG. 7 illustrate the different regions of the electromagnetic spectrum that will be allowed to pass to the detector by the DMA filter spectrometer. The wavelengths of electromagnetic radiation selected to pass to the detector correspond to the absorption band for compound A and absorption band for compound C in a sample consisting of compounds A, B, and C. The spectral region corresponding to the absorption band of compound B and all other wavelengths of electromagnetic radiation are rejected. Those skilled in the art will appreciate that the DMA filter spectrometer is not limited to the above example and can be used to pass or reject any combination of spectral resolution elements available to the DMA. Various examples and modifications are considered in detail below.

As a DMA filter imager the spatial resolution elements (pixels) of an image can be selectively passed or rejected (filtered) according to the requirements of the image measurement. The advantages of both the DMA filter spectrometer and DMA filter imager are:

(1) All spectral resolution elements or spatial resolution elements corresponding to the compounds of interest in a particular sample can be directed simultaneously to the detector for measurement. This has the effect of increasing the signal-to-noise ratio of the measurement.

(2) The amount of data requiring processing is reduced. This reduces storage requirements and processing times.

Figure 8:
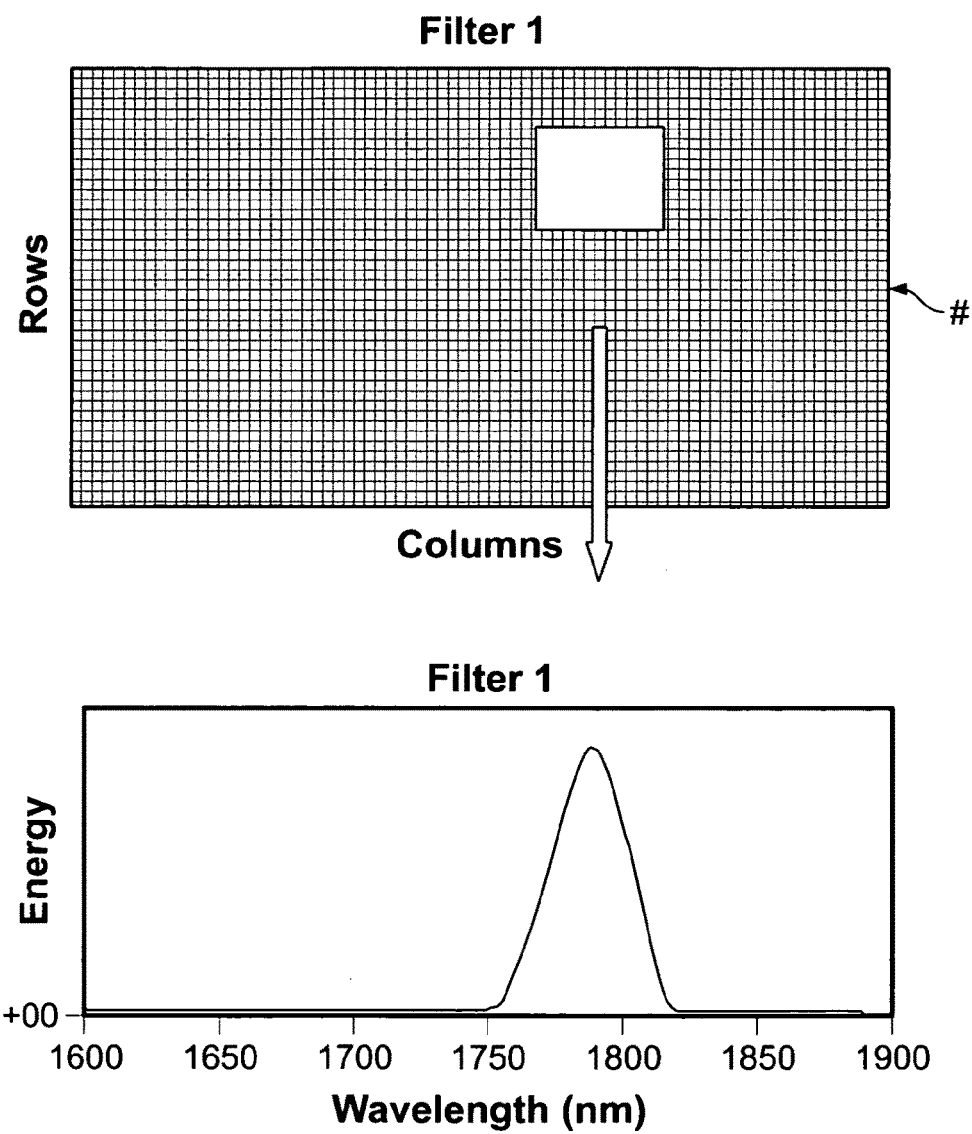
FIG. 8 illustrates the design of a band pass filter in accordance with the present invention (top portion) and the profile of the radiation passing through the filter (bottom portion)
Figure 9A:
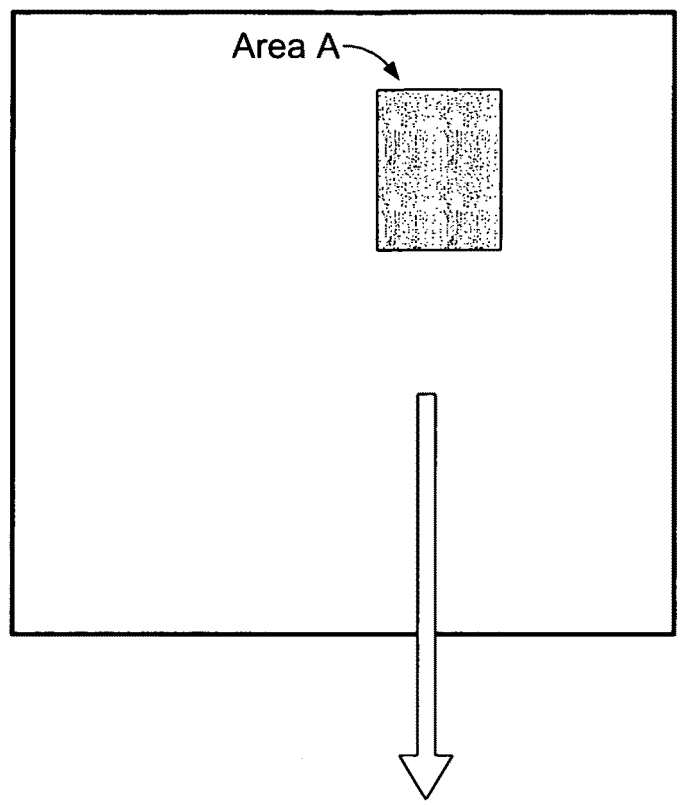
FIG. 9 illustrates the design of multi-modal band-pass or band-reject filters with corresponding intensity plots, in accordance with the present invention.
Figure 9A:
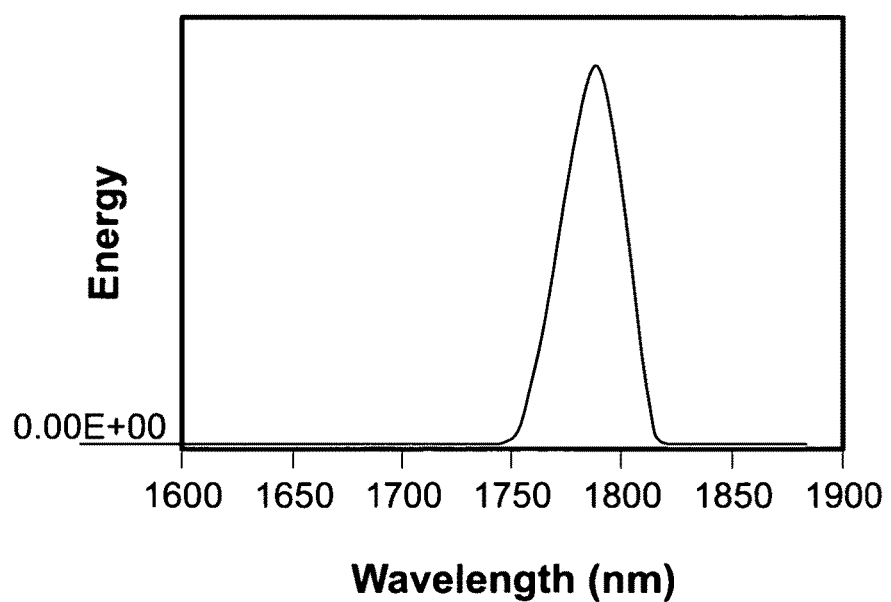
Figure 9B:
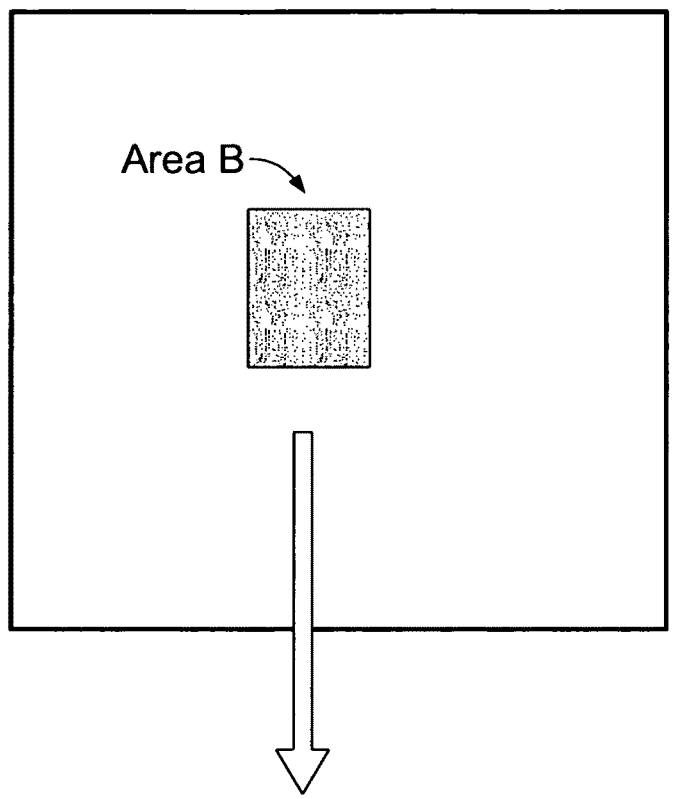
Figure 9B:
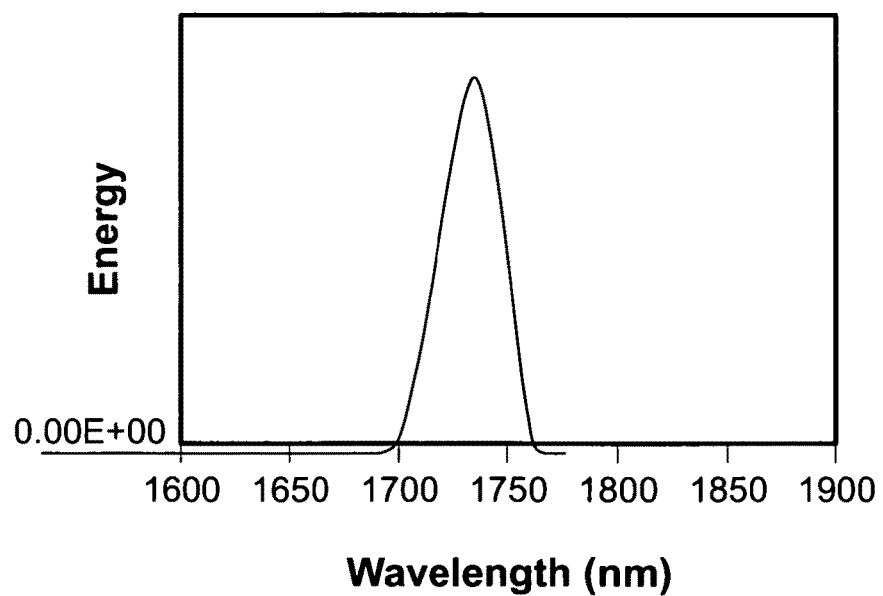
Figure 9C:
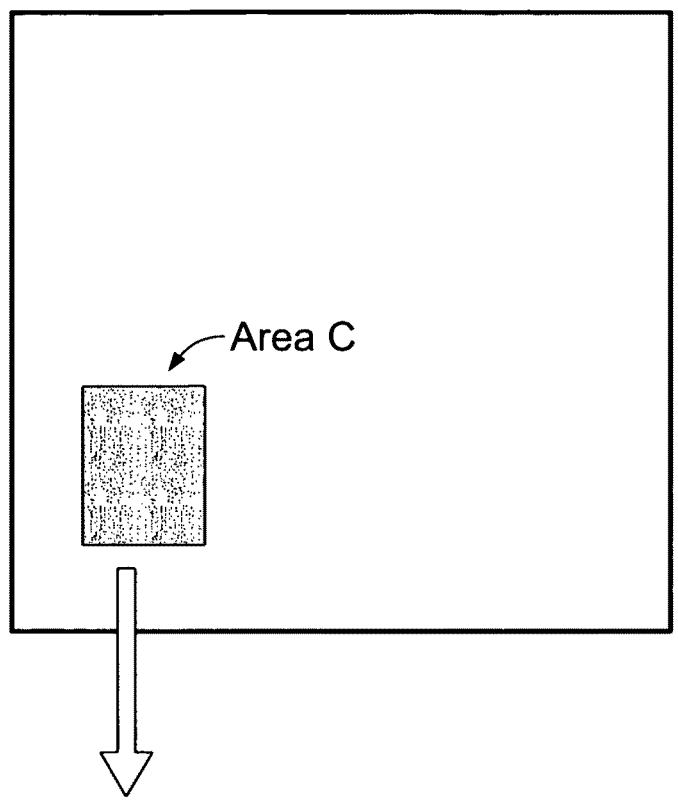
Figure 9C:
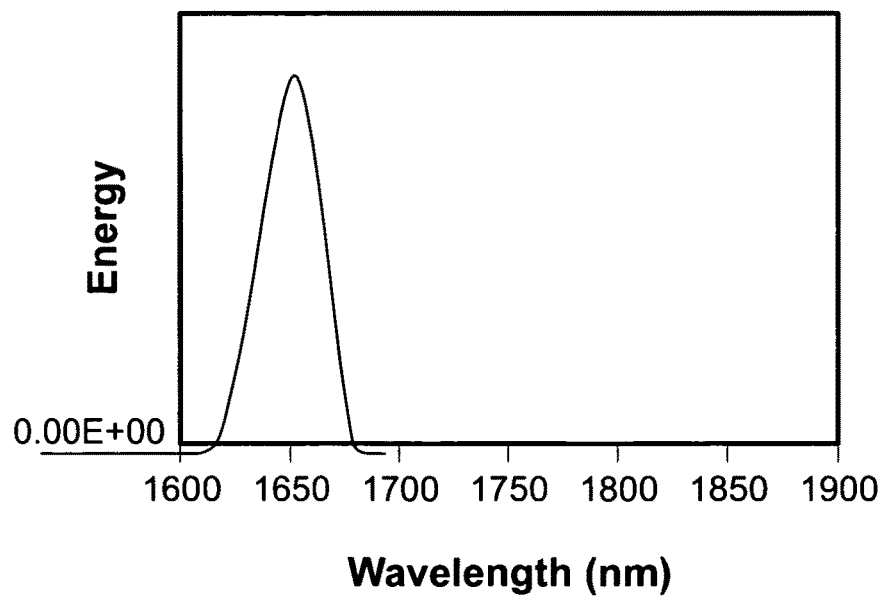
Figure 9D:
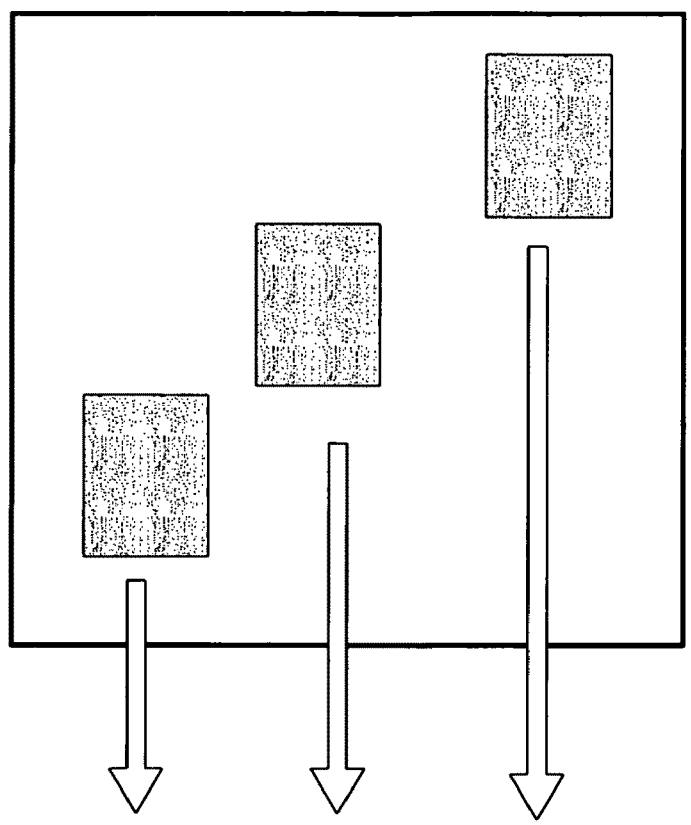
Figure 9D:
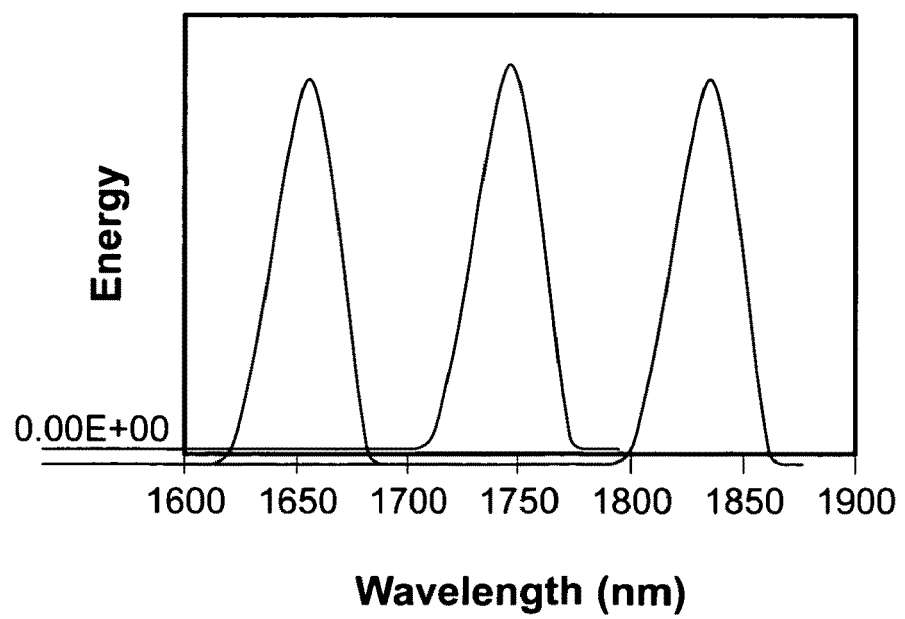

As noted above, using a DMA one can provide one or more spectral band pass or band-reject filter(s) with a chosen relative intensity. In particular, in accordance with the present invention the radiation wavelengths that are reflected in the direction of the detector are selected by specific columns of micro-mirrors of the DMA, as illustrated in FIG. 8. The relative intensity of the above spectral band is controlled by the selection of specific area of micro-mirrors on the DMA, represented by the dark area designated "A" in FIG. 8. Thus, the dark area shown in FIG. 8 is the mirrors that direct specific wavelength radiation, i.e., spectral band, to the detector. Clearly, the "on" minors in the dark area create a band-pass filter, the characteristics of which are determined by the position of the "on" area in the DMA. The bottom portion of the figure illustrates the profile of the radiation reaching the detector.

FIG. 8 also demonstrates the selection of specific rows and columns of mirrors in the DMA used to create one spectral band filter with a single spectral mode. It should be apparent, however, that using the same technique of blocking areas in the DMA one can obtain a plurality of different specific spectral band filters, which can have multi-modal characteristics. The design of such filters is illustrated in FIG. 9.

As shown in FIG. 9, a multitude of different specific filters can be designed on one DMA using simple stacking. FIG. 9 illustrates the creation of several filters by selective reflection from specific micro-mirrors. In particular, the left side of the figure illustrates the creation of three different filters, designated 1, 2, and 3. This is accomplished by the selection of specific mirrors on the DMA, as described above with reference to FIG. 8. The total collection of spectral band filters is shown at the bottom-left of this figure. The spectral band provided by each filter is shown on the right-hand side of the figure. The bottom right portion illustrates the radiation passing through the combination of filters 1, 2 and 3.

The above discussion describes how the relative intensity of each spectral band can be a function of the DMA area used in the reflection. The following table illustrates the linear relationship between areas of the DMA occupied by individual filters, and the resulting filter. Clearly, if the entire DMA array is in the "on" position, there will be no filtering and in principle the input radiation passes through with no attenuation.

| FIG. 9, left side | FIG. 9, right side |
|---|---|
| Reflected radiation from micro-mirrors | Filter created |
| area A | 1 |
| area B | 2 |
| area C | 3 |
| areas a + b + c | 1 + 2 + 3 |

Figure 10:
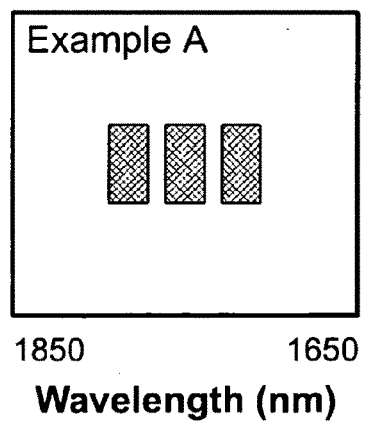
FIG. 10 illustrates the means for the intensity variation of a spectral filter built in accordance with this invention.
Figure 10:
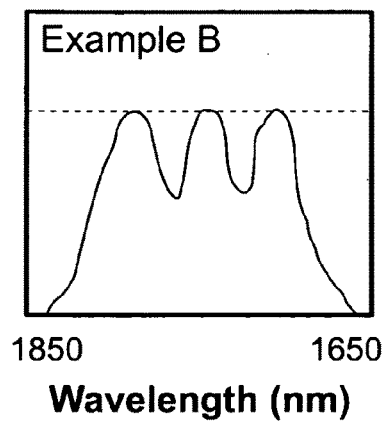
Figure 10:
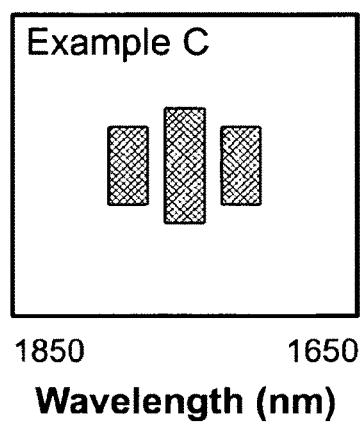
Figure 10:
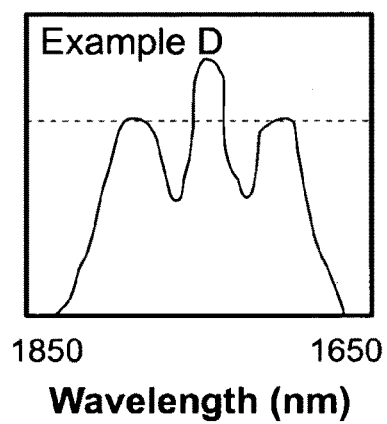
Figure 10:
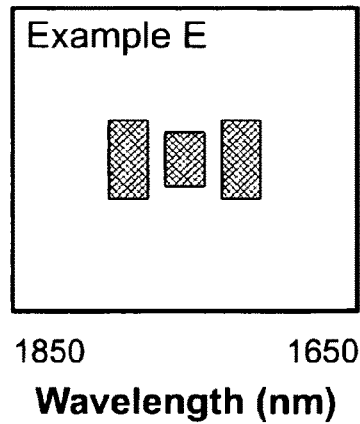
Figure 10:
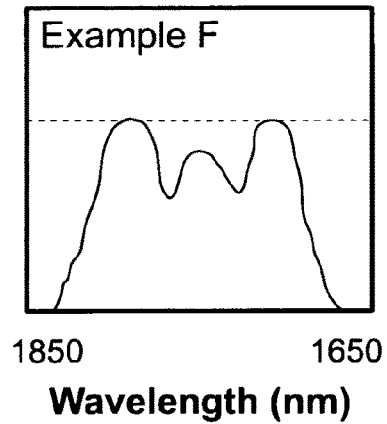

FIG. 10 illustrates the means for the intensity variation of a spectral filter built in accordance with this invention, and is summarized in the table

| Example A | Example B |
|---|---|
| Reflection from a DMA See FIGS. 8 and 9. Reflection areas 1, 2, and 3 create spectral filter 1, 2 and 3 respectively. area 1 = area 2 = area 3 | The intensity recorded at the detector for example A for the combination filter 1, 2, and 3, Intensity, I, $I_1 = I_2 = I_3$ |
| Example C | Example D |
| The reflection of area 2 of the DMA is increased. area 1 = area 3 < area 2 | The intensity recorded at the detector for filters 1, 2, and 3 is $I_1 \approx I < I_2$ |
| Example E | Example F |
| The reflection of area 2 of the DMA is decreased area 1 = area 3 > area 2 | The intensity recorded at the detector for filter 1, 2, and 3 is $I_1 \approx I_3 > I_2$ |

FIGS. 9 and 10 illustrate the ability to design spectral filters with different characteristics using a DMA. A point to keep in mind is that different spectral components of the radiation from the sample have been separated in space and can be filtered individually. The ability to process individual spectral components separately should be retained. To this end, in accordance with the present invention, spectral components are modulated.

The basic idea is to simply modulate the output from different filters differently, so one can identify and process them separately. In a preferred embodiment, different modulation is implemented by means of different modulation rates. Thus, with reference to FIG. 9, the output of filter 1 is modulated at rate $M_1$; output of filter 2 is modulated at rate $M_2$, and filter 3 is modulated using rate $M_3$, where $M_1 \neq M_2 \neq M_3$. In different embodiments, modulation can be achieved by assigning a different modulation encodement to each filter, with which it is modulated over time.

As a result, a system built in accordance with the present invention is capable of providing: a) Spectral bandwidth by selection of specific columns of micro-mirrors in an array; b) Spectral intensity by selection of rows of the array; and c) Spectral band identification by modulation.

FIGS. 11-14 illustrate alternative embodiments of a modulating spectrometer in accordance with this invention, where the DMA is replaced with different components. In particular, FIGS. 1A and B show an embodiment in which the DMA is replaced with fixed elements, in this case concave mirrors.

The idea is to use fixed spectral grating, which masks out spectrum block components that are not needed and passes those which are.

The idea here is that the broadly illuminated dispersive element distributes spectral resolution elements in one dimension so that in the orthogonal dimension one can collect light of the same wavelengths. With reference to FIG. 6A one can see that at a particular plane, herein called the focal plane, one has a wavelength axis (x or columns) and a spatial axis (y or rows). If one were to increase the number of spatial resolution elements (y) that are allowed to pass energy through the system and out of the exit aperture for any given wavelength (x), or spectral resolution element (x), this would have the effect of increasing the intensity of the particular spectral resolution elements' intensity at the detector.

Figure 11A:
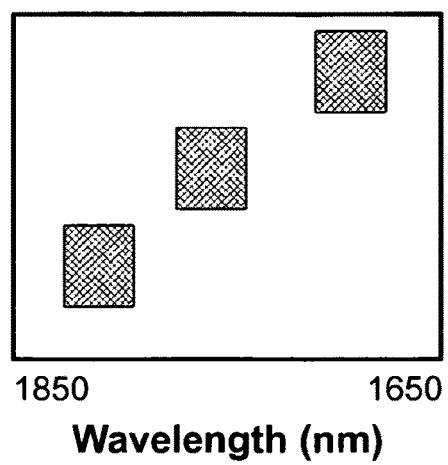
FIGS. 11A and 11B show embodiments in which the DMA is replaced with concave mirrors.
Figure 11B:
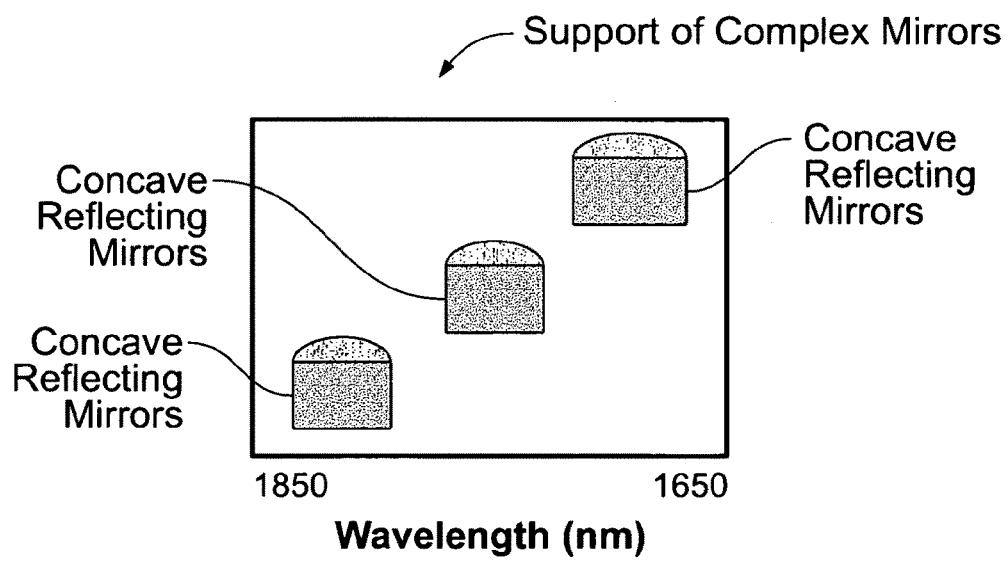

If the array of spatio/spectral resolution elements at the focal plane as shown in FIG. 6A is replaced with fixed elements, such as the concave mirrors in FIG. 11B, one can have a different device configured to perform a particular signal processing task—in this case pass the predetermined spectrum components at the desired intensity levels. FIG. 11A shows the spatio/spectral resolution elements at the focal plane to be used. The fixed optical elements are placed to interact with predetermined spatio/spectral resolution elements provided by the grating and entrance aperture geometry and to direct the specific assortment of spatio/spectral elements to specific spatial locations for modulation encoding (possibly using the barber pole arrangement, shown next).

Figure 12:
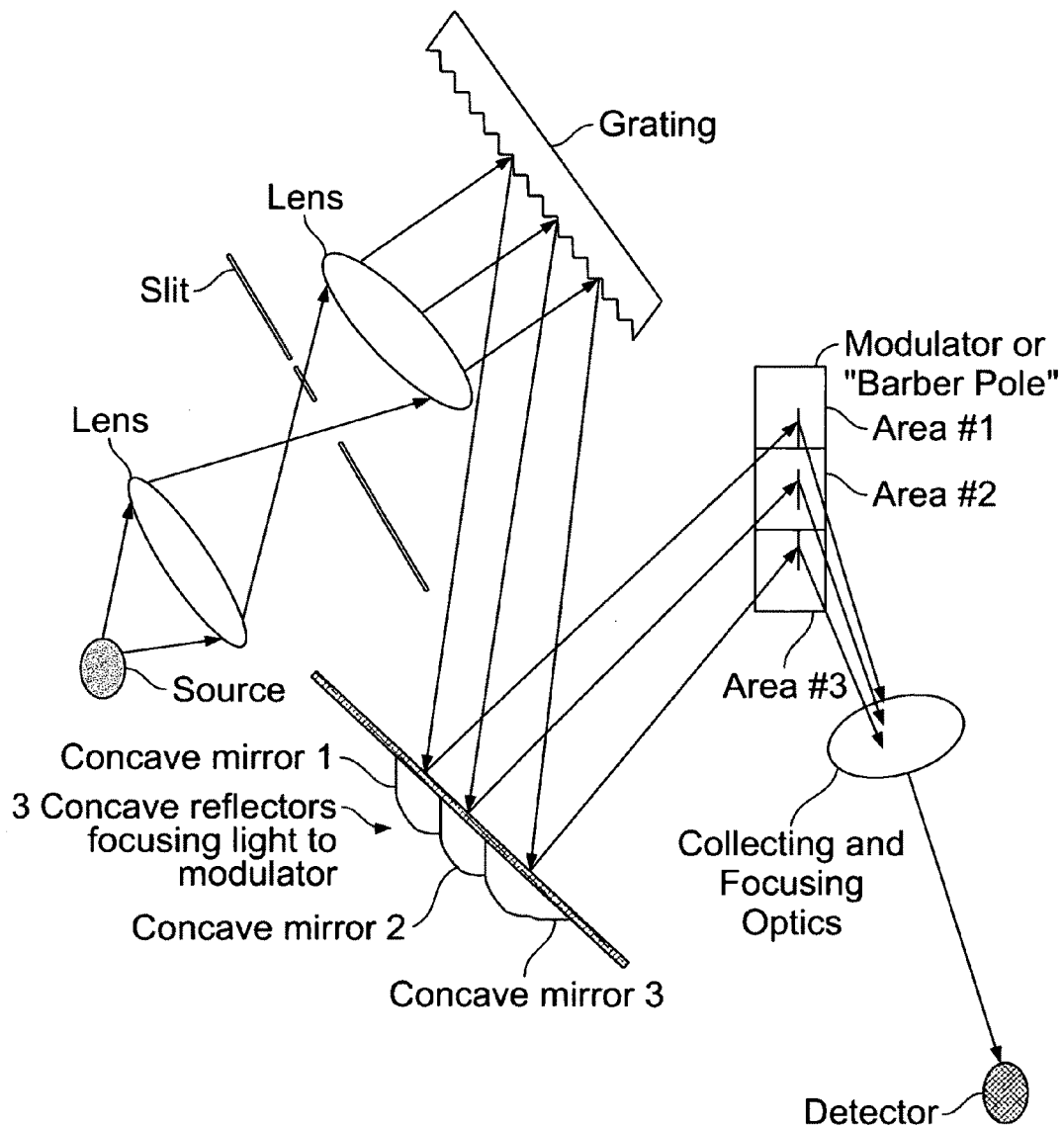
Figure 13:
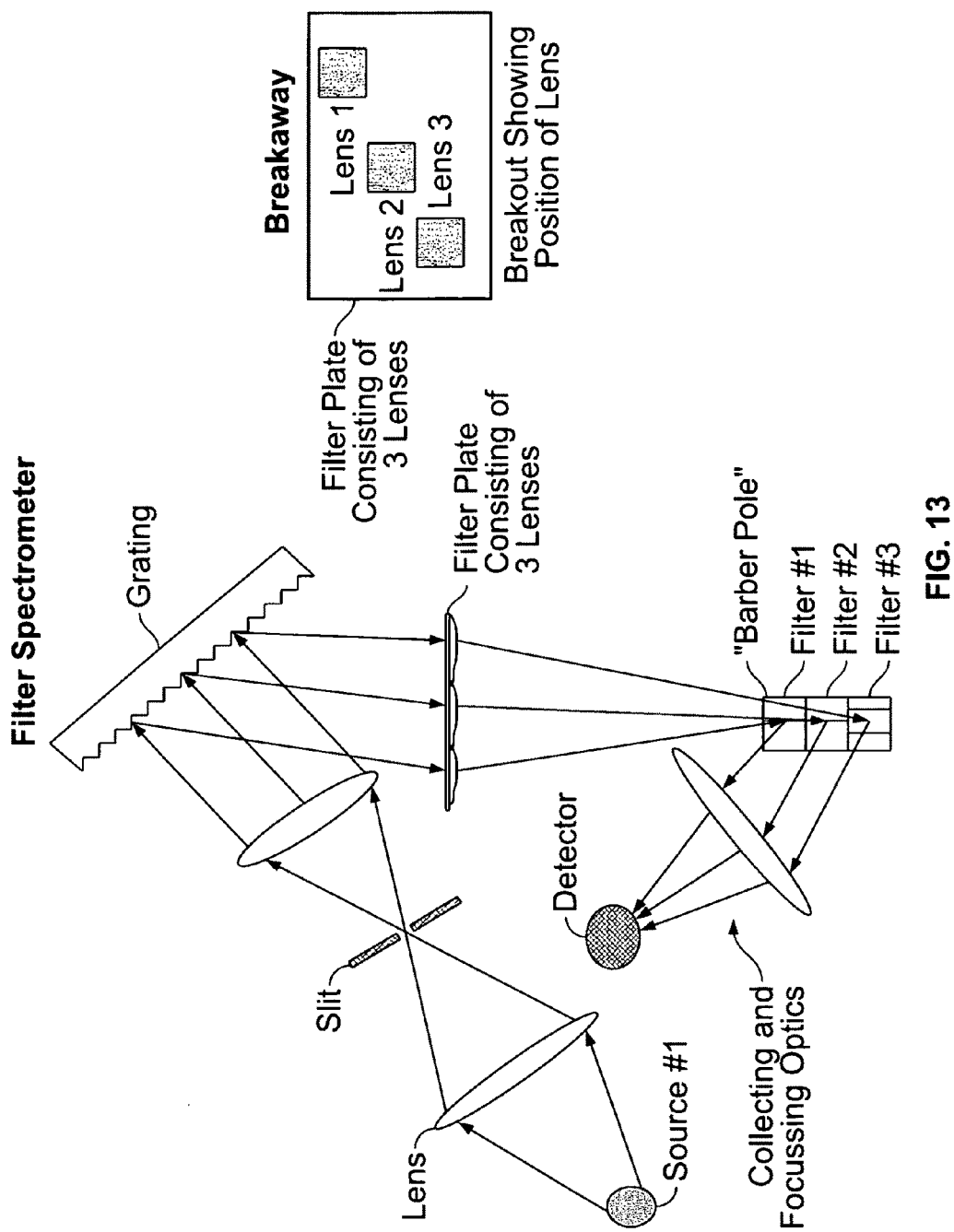

FIG. 12 illustrates an embodiment of a complete modulating spectrometer in which the DMA element is replaced by the concave mirrors of FIG. 11. FIG. 13 illustrates a modulating lens spectrometer using lenses instead of DMA, and a "barber pole" arrangement of mirrors to implement variable modulation. The "barber pole" modulation arrangement is illustrated in FIG. 14.

With reference to FIG. 14, modulation is accomplished by rotating this "barber pole" that has different number of mirrors mounted for reflecting light from the spatially separated spectral wavelengths. Thus, irradiating each vertical section will give the reflector its own distinguishable frequency. In accordance with this embodiment, light from the pole is collected and simultaneously sent to the detector. Thus, radiation from concave mirror 1 impinges upon the four-mirror modulator; concave mirror 2 radiation is modulated by the five-mirror modulator, and concave mirror 3 directs radiation to the six-mirror modulator. In the illustrated embodiment, the modulator rate is four, five, or six times per revolution of the "barber pole."

The operation of the device is clarified with reference to FIG. 12, tracing the radiation from the concave mirrors 12 to the detector of the system. In particular, concave mirror 1 reflects a selected spectral band with chosen intensity. This radiated wave impinges upon a modulator, implemented in this embodiment as a rotation barber pole. The modulating rates created by the barber pole in the exemplary embodiment shown in the figure are as shown in the table below.

| FIG. 13 | Number of mirrors Per 360° rotation | Modulation Per 360° of barber pole |
|---|---|---|
| Area A | 4 | 4/360° |
| Area B | 5 | 5/360° |
| Area C | 6 | 6/360° |

Accordingly, this arrangement yields a modulation rate of 4/360° for the radiation from Area A, FIG. 12.

By a analogy, the mirrors of Areas B and C are modulated at the rate of 5/360° and 6/360°, respectively. As illustrated, all radiation from mirrors A, B, and C is simultaneously directed to the detector. This radiation is collected by either a simple mirror lens or a toroidal mirror, which focuses the radiation onto a single detector. The signal from the detector now goes to electronic processing and mathematical analyses for spectroscopic results.

In the discussion of modulating spectrometers, a single light source of electromagnetic radiation was described. There exist yet another possibility for a unique optical design—a modulating multi-light source spectrometer. FIGS. 15 and 16 illustrate an embodiment of this invention in which a light source 12 provides several modulated spectral bands, e.g., light emitting diodes (LED), or lasers (shown here in three different light sources). The radiation from these light sources impinges upon the sample 24. One possible illumination design is one in which light from a source, e.g. LED, passes through a multitude of filters, impinging upon the sample 24. The radiation from the sample is transmitted to a detector 20, illustrated as a black fiber. The signal from the detector is electronically processed to a quantitative and qualitative signal describing the sample chemical composition.

In this embodiment, a plurality of light sources is used at differed modulating rates. FIGS. 15 and 16 illustrate the combination of several light sources in the spectrometer. The choice of several different spectral bands of electromagnetic radiation can be either light emitting diodes, LED, lasers, black body radiation and/or microwaves. Essentially the following modulation scheme can be used to identify the different light sources, in this example LED's of different spectral band wavelength.

| No. of Source | Spectral band Wavelength, rim | Modulation Rate |
|---|---|---|
| 1 | 1500-1700 | $m_1$ |
| 2 | 1600-1800 | $m_2$ |
| 3 | 1700-1900 | $m_3$ |
| . | . | . |
| . | . | . |

Note:
$m_1 \ne m_2 \ne m_3 \ne \ldots$

It should be noted that either the radiation will be scattered or transmitted by the sample 24. This scattered or transmitted radiation from the sample is collected by an optical fiber. This radiation from the sample is conducted to the detector. The signal from the detector is electronically processed to yield quantitative and qualitative information about the sample.

In a particular embodiment the radiation path consists of optical fibers. However, in accordance with alternate embodiments, mirrors and lenses could also constitute the optical path for a similar modulating multi-light source spectrometer.

The spectrometer described herein records spectral information about one unique area on a single detector. In a similar manner, the spectral characteristic of a multitude of areas in a sample can be recorded with a multitude of detectors in accordance with different embodiments of the invention. Such a multitude of detectors exists in an array detector. Array detectors are known in the art and include, for example Charge coupled devices (CCD), in the ultraviolet, and visible portions of the spectrum; InSb—array in near infrared; InGaAs—array in near infrared; Hg—Cd—Te—array in mid-infrared and other array detectors.

Array detectors can operate in the focal plane of the optics. Here each detector of the array detects and records the signal from a specific area, x,y. Practical Example B described herein on the gray-level camera provides a further illustration. Different aspects of the embodiments discussed herein are considered in more detail. As is understood by one skilled in the art, standard optical duality implies that each of the preceding configurations can be operated in reverse, exchanging the position of the source and the detector.

The postsample processing, i.e., signal processing performed after a sample had been irradiated, describes an aspect of the present invention. In accordance with another aspect of this invention, significant benefits can result from irradiating a sample with pre-processed radiation, in what is referred to as pre-sample processing. In accordance with an embodiment of the present invention, one or more light sources, capable of providing modulated temporal and/or spatial patterns of input radiation, should be used. These sources are referred to next as controllable source(s) of radiation, which in general are capable of generating arbitrary combinations of spectral radiation components within a predetermined spectrum range.

Several types of prior art devices are known that are capable of providing controllable radiation. Earlier prior art devices primarily relied upon various "masking" techniques, such as electronically alterable masks interposed in the optical pathway between a light source and a detector. More recent prior art devices use a combination of two or more light-emitting diodes (LEDs) as radiation sources. Examples are provided in U.S. Pat. Nos. 5,257,086 and 5,488,474, the content of which is hereby incorporated by reference for all purposes. As discussed in the above patents, an array of LEDs or light-emitting lasers is configured for activation using a particular encoding pattern, and can be used as a controllable light source. A disadvantage of this system is that it relies on an array of different LED elements, each operating in a different, relatively narrow spectrum band. In addition, there are technological problems associated with having an array of discrete radiation elements with different characteristics.

These and other problems associated with the prior art are addressed in accordance with the present invention using a device that in a specific embodiment can be thought of as the reverse of the setup illustrated in FIG. 1A. In particular, one or more broadband radiation sources illuminate the digital micro-mirror array (DMA) 18 and the modulations of the micro-mirrors in the DMA encode the source radiation prior to impinging upon the sample. The reflected radiation is then collected from the sample and directed onto a detector for further processing.

Figure 17:
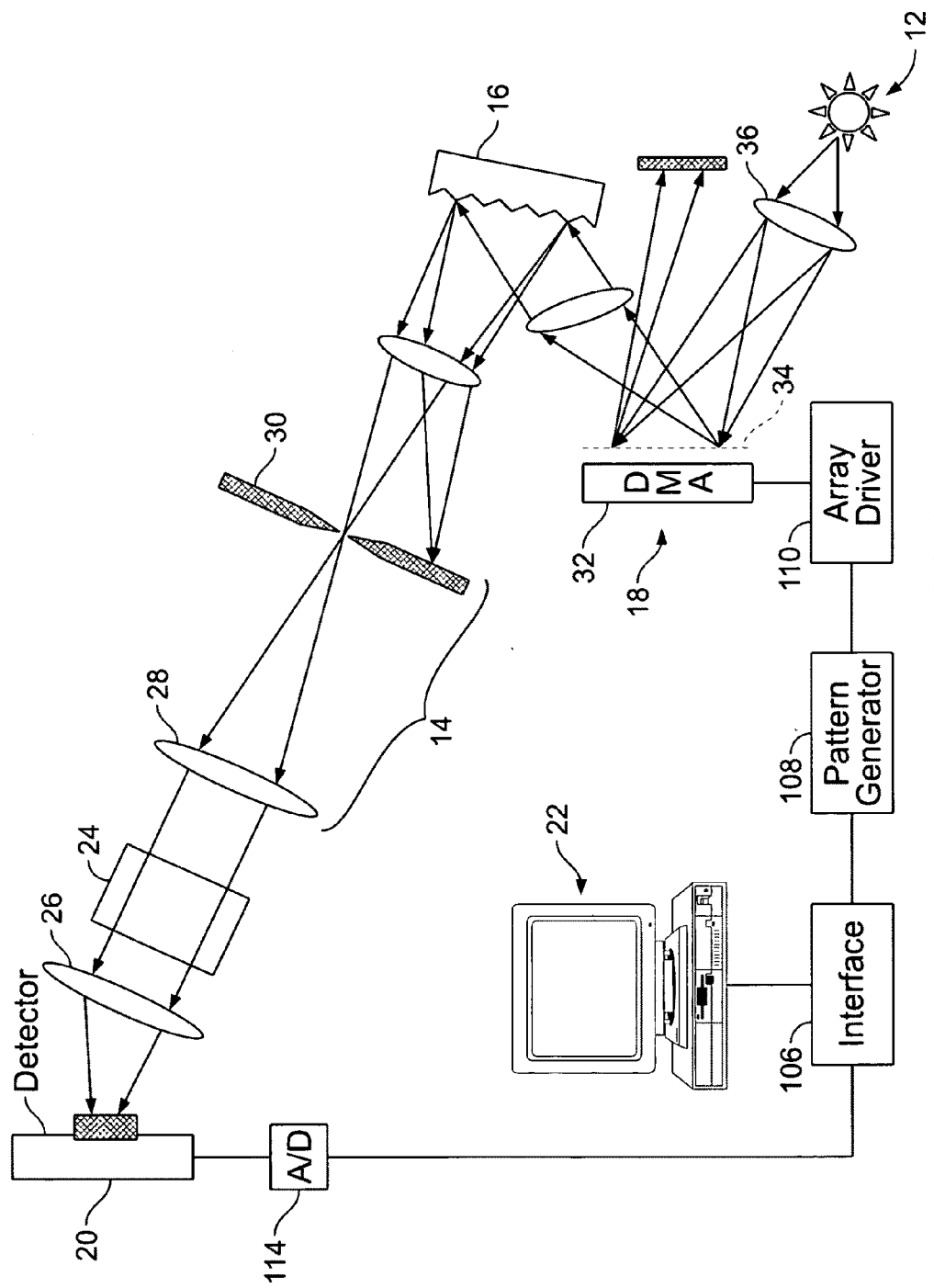
FIG. 17 illustrates in diagram form an apparatus using controllable radiation source.

FIG. 17 illustrates a schematic representation of an apparatus in accordance with the present invention using a controllable radiation source. Generally, the system includes a broadband radiation source 12, DMA 18, wavelength dispersion device 16, slit assembly 30, detector 20 and control assembly 22.

In particular, control assembly 22 can include a conventional personal computer 104, interface 106, pattern generator 108, DMA driver 110, and analog to digital (A/D) converter 114. Interface 106 operates as a protocol converter enabling communications between the computer 22 and devices 108-114.

Pattern generator 108 can include an EPROM memory device (not shown) which stores the various encoding patterns for array 18, such as the Hadamard encoding pattern discussed below. In response to control signals from computer 22, generator 108 delivers signals representative of successive patterns to driver 110. More particularly, generator 108 produces output signals to driver 110 indicating the activation pattern of the mirrors in the DMA 18. A/D converter 114 is conventional in nature and receives the voltage signals from detector 20, amplifies these signals as analog input to the converter in order to produce a digital output representative of the voltage signals.

Radiation source 12, grating 16, DMA 18 slit assembly 30 and detector 20 cooperatively define an optical pathway. Radiation from source 12 is passed through a wavelength dispersion device, which separates in space different spectrum bands. The desired radiation spectrum can them be shaped by DMA 18 using the filter arrangement outlined herein. In accordance with a preferred embodiment, radiation falling on a particular micro-mirror element can also be encoded with a modulation pattern applied to it. In a specific mode of operating the device, DMA 18 is activated to reflect radiation in a successive set of encoding patterns, such as Hadamard, Fourier, wavelet or others. The resultant set of spectral components is detected by detector 20, which provides corresponding output signals. Computer 22 then processes these signals.

Computer 22 initiates an analysis by prompting pattern generator 108 to activate the successive encoding patterns. With each pattern, a set of wavelength components are resolved by grating 16 and after reflection from the DMA 18 is directed onto detector 20. Along with the activation of encoding patterns, computer 22 also takes readings from A/D converter 114, by sampling data. These readings enable computer 22 to solve a conventional inverse transform, and thereby eliminate background noise from the readings for analysis.

In summary, the active light source in accordance with the present invention consists of one or more light sources, from which various spectral bands are selected for transmission, while being modulated with a temporal and/or spatial patterns. The resulting radiation is then directed at a region (or material) of interest to achieve a variety of desired tasks. A brief listing of these tasks include: (a) Very precise spectral coloring of a scene, for purposes of enhancement of display and photography; (b) Precise illumination spectrum to correspond to specific absorption lines of a compound that needs to be detected, (see FIGS. 40-44 on protein in wheat as an illustration) or for which it is desirable to have energy absorption and heating, without affecting neighboring compounds (This is the principle of the microwave oven for which the radiation is tuned to be absorbed by water molecules allowing for heating of moist food only); (c) The procedure in (b) could be used to imprint a specific spectral tag on ink or paint, for watermarking, tracking and forgery prevention, acting as a spectral bar code encryption; (d) The process of light curing to achieve selected chemical reactions is enabled by the tunable light source.

Various other applications are considered herein. Duality allows one to reverse or "turn inside out" any of the post-sample processing configurations described previously, to yield a pre-sample processing configuration. Essentially, in the former case one takes post sample light, separates wavelengths, encodes or modulates each, and detects the result. The dualized version for the latter case is to take source light, separates wavelengths, encode or modulate each, interact with a sample, and detect the result.

Various embodiments of systems for performing post- and pre-sample processing were discussed herein. In a specific embodiment, the central component of the system is a digital micro-mirror array (DMA), in which individual elements (micro-mirrors) can be controlled separately to either pass along or reject certain radiation components. By the use of appropriately selected modulation patterns, the DMA array can perform various signal processing tasks. In a accordance with a preferred embodiment of this invention, the functionality of the DMAs discussed above can be generalized using the concept of Spatial Light Modulators (SLMs), devices that broadly perform spatio-spectral encoding of individual radiation components, and of optical synapse processing units (OSPUs), basic processing blocks. This generalization is considered herein as well as the Hadamard processing, spatio-spectral tagging, data compression, feature extraction and other signal processing tasks.

In accordance with the present invention, one-dimensional (1D), two-dimensional (2D) or three-dimensional (3D) devices capable of acting as a light valve or array of light valves are referred to as spatial light modulators (SLMs). More broadly, an SLM in accordance with this invention is any device capable of controlling the magnitude, power, intensity or phase of radiation or which is otherwise capable of changing the direction of propagation of such radiation. This radiation can either have passed through, or be reflected or refracted from a material sample of interest. In a preferred embodiment, an SLM is an array of elements, each one capable of controlling radiation impinging upon it. Note that in accordance with this definition an SLM placed in appropriate position along the radiation path can control either spatial or spectral components of the impinging radiation, or both. Furthermore, "light" is used here in a broad sense to encompass any portion of the electromagnetic spectrum and not just the visible spectrum. Examples of SLM's in accordance with different embodiments of the invention include liquid crystal devices, actuated micro-mirrors, actuated mirror membranes, di-electric light modulators, switchable filters and optical routing devices, as used by the optical communication and computing environments and optical switches. In a specific embodiment, the use of a DMA as an example of spatial light modulating element is discussed herein. U.S. Pat. No. 5,037,173 provides examples of technology that can be used to implement SLM in accordance with this invention, and is hereby incorporated by reference.

In a preferred embodiment, a 1D, 2D, or 3D SLM is configured to receive any set of radiation components and functions to selectively pass these components to any number of receivers or image planes or collection optics, as the application can require, or to reject, reflect or absorb any input radiation component, so that either it is or is not received by one or more receivers, image planes or collection optics devices. It should be clear that while in the example discussed herein, the SLM is implemented as a DMA, virtually any array of switched elements can be used in accordance with the present invention.

Generally, an SLM in accordance with the invention is capable of receiving any number of radiation components, which are then encoded, tagged, identified, modulated or otherwise changed in terms of direction and/or magnitude to provide a unique encodement, tag, identifier or modulation sequence for each radiation component in the set of radiation components, so that subsequent optical receiver(s) or measuring device(s) have the ability to uniquely identify each of the input radiation components and its properties. In a relevant context, such properties include, but are not limited to, irradiance, wavelength, band of frequencies, intensity, power, phase and/or polarization. The tagging of individual radiation components can be accomplished using rate modulation. Thus, different spectral components of the input radiation that have been separated in space using a wavelength dispersion device are then individually encoded by modulating the micro-mirrors of the DMA array at different rates. The encoded radiation components are directed to a single detector, but nevertheless can be analyzed individually using Fourier analysis of the signal from the detector. Other examples for the use of "tagging" are discussed below.

In accordance with this invention, various processing modalities can be realized with an array of digitally controlled switches (an optical synapse), which function to process and transmit signals between different components of the system. In the context of the above description, the basic OSPU can be thought of as a data acquisition unit capable of scanning an array of data, such as an image, in various modes, including raster, Hadamard, multiscale wavelets, and others, and transmitting the scanned data for further processing. Thus, a synapse is a digitally controlled array of switches used to redirect image (or generally data) components or combinations of light streams, from one location to one or more other locations. In particular it can perform Hadamard processing, as defined below, on a plurality of radiation elements by combining subsets of the elements (i.e., binning) before conversion to digital data. A synapse can be used to modulate light streams by modulating temporally the switches to impose a temporal bar code (by varying in time the binning operation). This can be built in a preferred embodiment from a DMA, or any of a number of optical switching or routing components, used for example in optical communications applications.

Figure 18A:
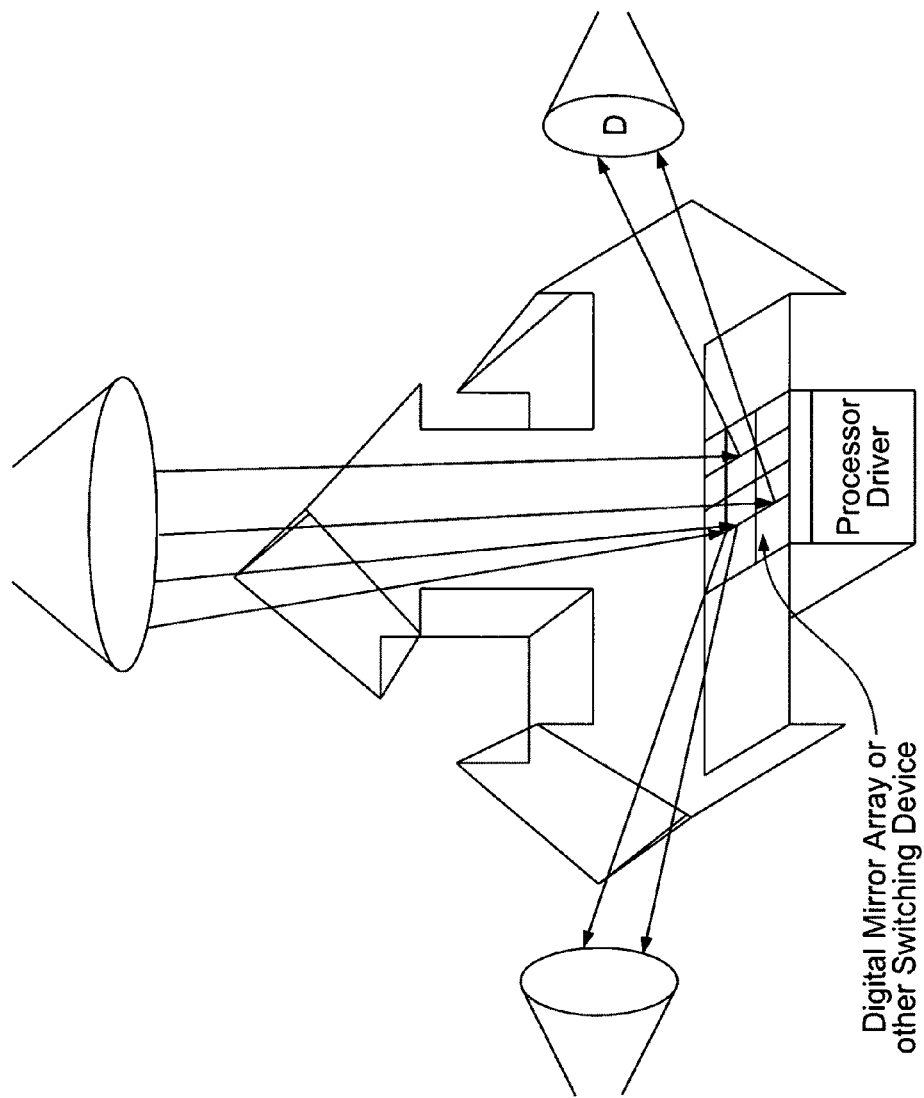
FIGS. 18A and 18B illustrate in a diagram form an optical synapse processing unit (OSPU) used as a processing element in accordance with the present invention.
Figures 18B, 19:
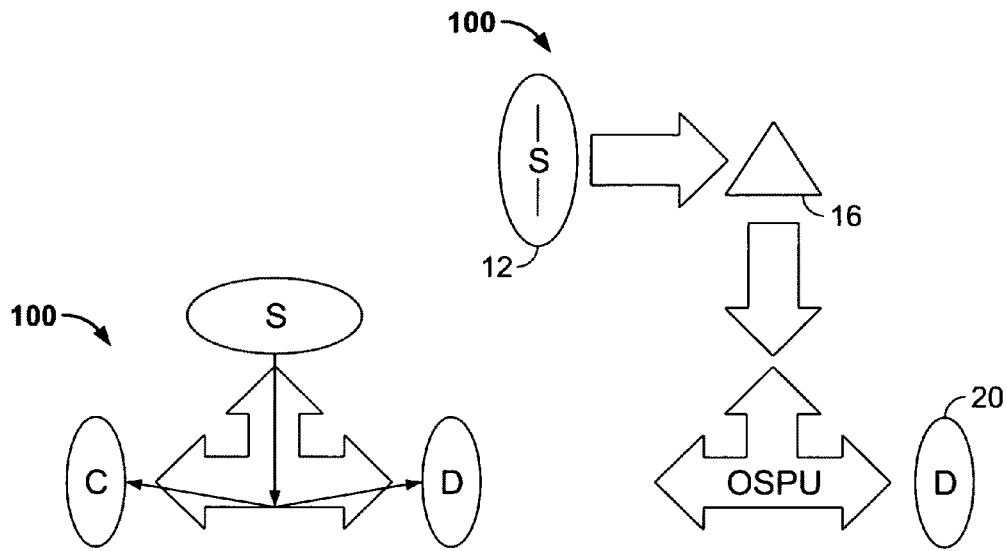
FIG. 19 illustrates in a diagram form the design of a spectrograph using OSPU.

An OSPU unit in accordance with the present invention is shown in diagram form in FIGS. 18A and 18B, as three-port device taking input from a radiation source S, and distributing it along any of two other paths, designated C (short for camera) and D (for detector). Different scanning modes of the OSPU are considered in more detail herein.

In the above disclosure and in one preferred embodiment of the invention an OSPU is implemented using a DMA, where individual elements of the array are controlled digitally to achieve a variety of processing tasks while collecting data. In accordance with the present invention, information bearing radiation sources could be, for example, a stream of photons, a photonic wavefront, a sound wave signal, an electrical signal, a signal propagating via an electric field or a magnetic field, a stream of particles, or a digital signal. Example of devices that can act as a synapse include spatial light modulators, such as LCDs, MEMS mirror arrays, or MEMS shutter arrays; optical switches; optical add-drop multiplexers; optical routers; and similar devices configured to modulate, switch or route signals. Clearly, DMAs and other optical routing devices, as used by the optical communication industry can be used to this end. It should be apparent that liquid crystal displays (LCD), charge coupled devices (CCD), CMOS logic, arrays of microphones, acoustic transducers, or antenna elements for electromagnetic radiation and other elements with similar functionality that will be developed in the future, can also be driven by similar Methods.

Applicants' contribution in this regard is in the novel process of performing pretransduction digital computing on analog data via adaptive binning means. Such novelty can be performed in a large number of ways. For example, one can implement adaptive current addition using a parallel/serial switch and wire networks in CMOS circuits. Further, in the acoustic processing domain, one or more microphones can be used in combination with an array of adjustable tilting sound reflectors (like a DMD for sound). In each case, one can "bin" data prior to transduction, in an adaptive way, and hence measure some desired computational result that would traditionally be obtained by gathering a "data cube" of data, and subsequently digitally processing the data. The shift of paradigm is clear: in the prior art traditionally analog signals are captured by a sensor, digitized, stored in a computer as a "data cube", and then processed. Considerable storage space and computational requirements are extended to do this processing. In accordance with the present invention, data from one or more sensors is processed directly in the analogue domain, the processed result is digitized and sent to a computer, where the desired processing result can be available directly, or following reduced set of processing operations.

In accordance with the present invention, the digitally controlled array is used as a hybrid computer, which through the digital control of the array elements performs (analog) computation of inner products or more generally of various correlations between data points reaching the elements of the array and prescribed patterns. The digital control at a given point (i.e., element) of the array can be achieved through a variety of different mechanisms, such as applying voltage differences between the row and column intersecting at the element; the modulation is achieved by addressing each row and column of the array by an appropriately modulated voltage pattern. For example, when using DMA, the mirrors are fluctuating between two tilted positions, and modulation is achieved through the mirror controls, as known in the art. The specifics of providing to the array element of signal(s) following a predetermined pattern will depend on the design implementation of the array and are not considered in further detail. Broadly, the OSPU array is processing raw data to extract desired information.

In accordance with the present invention, various assemblies of OSPU along with other components can be used to generalize the ideas presented above and enable new processing modalities. For example, FIG. 19 illustrates in block diagram form the design of a spectrograph using OSPU. As shown, the basic design brings reflected or transmitted radiation from a line in the sample or source onto a dispersing device 16, such as a grating or prism, onto the imaging fiber into the OSPU to encode and then forward to a detector 20.

Figure 20:
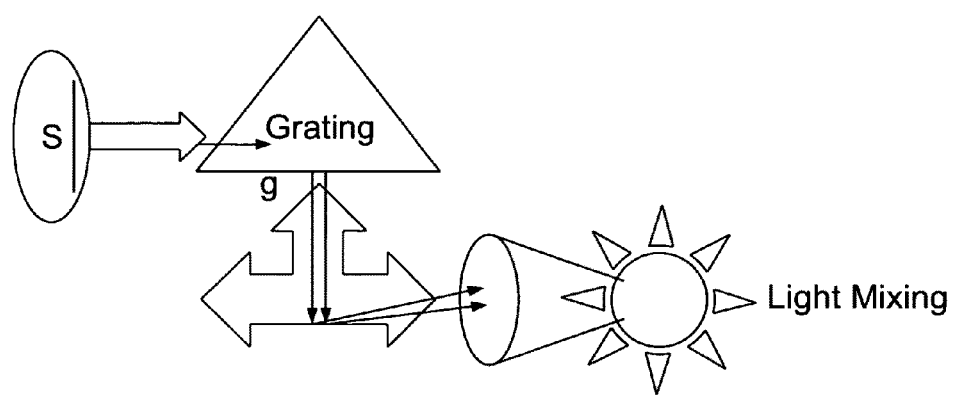
FIG. 20 illustrates in a diagram form an embodiment of a tunable light source.

FIG. 20 illustrates in a diagram form an embodiment of a tunable light source, which operates as the spectrograph in FIG. 19, but uses a broadband source. In this case, the switching elements of the OSPU array, for example the mirrors in a DMA, are set to provide a specified energy in each row of the mirror, which is sent to one of the outgoing imaging fiber bundles. This device can also function as a spectrograph through the other end, i.e., fiber bundle providing illumination, as well as spectroscopy.

Figure 21:
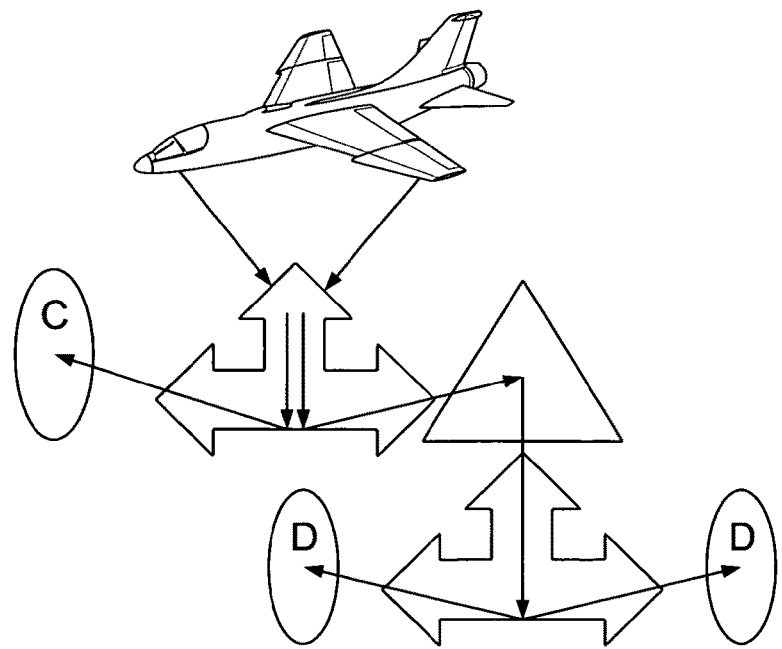
FIG. 21 illustrates in a diagram form an embodiment of the spectral imaging device, which is built using two OSPUs.
Figure 22:
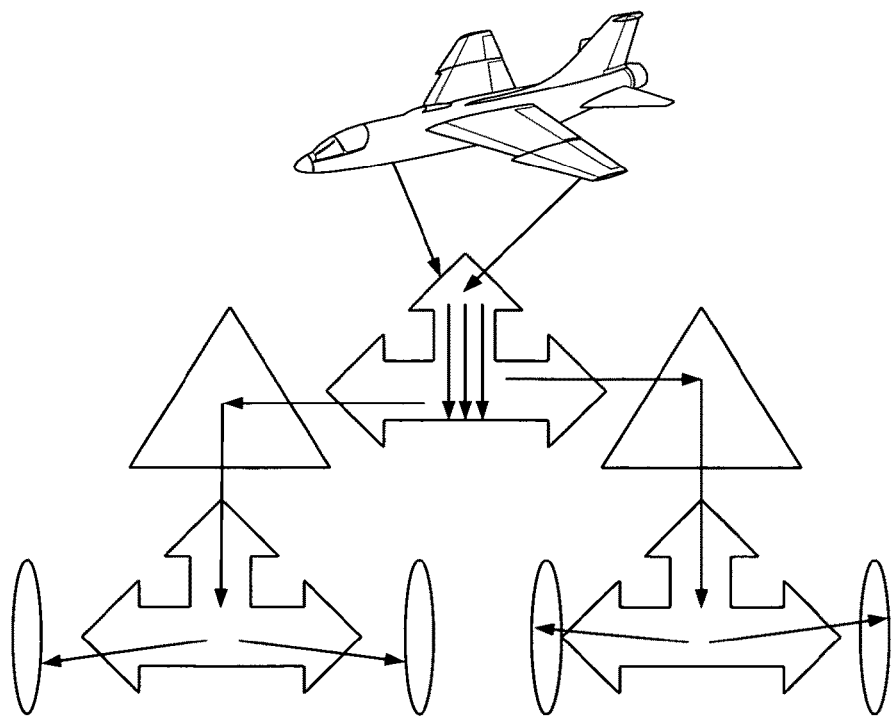
FIGS. 22 and 23 illustrate different devices built using OSPUs.
Figure 23:
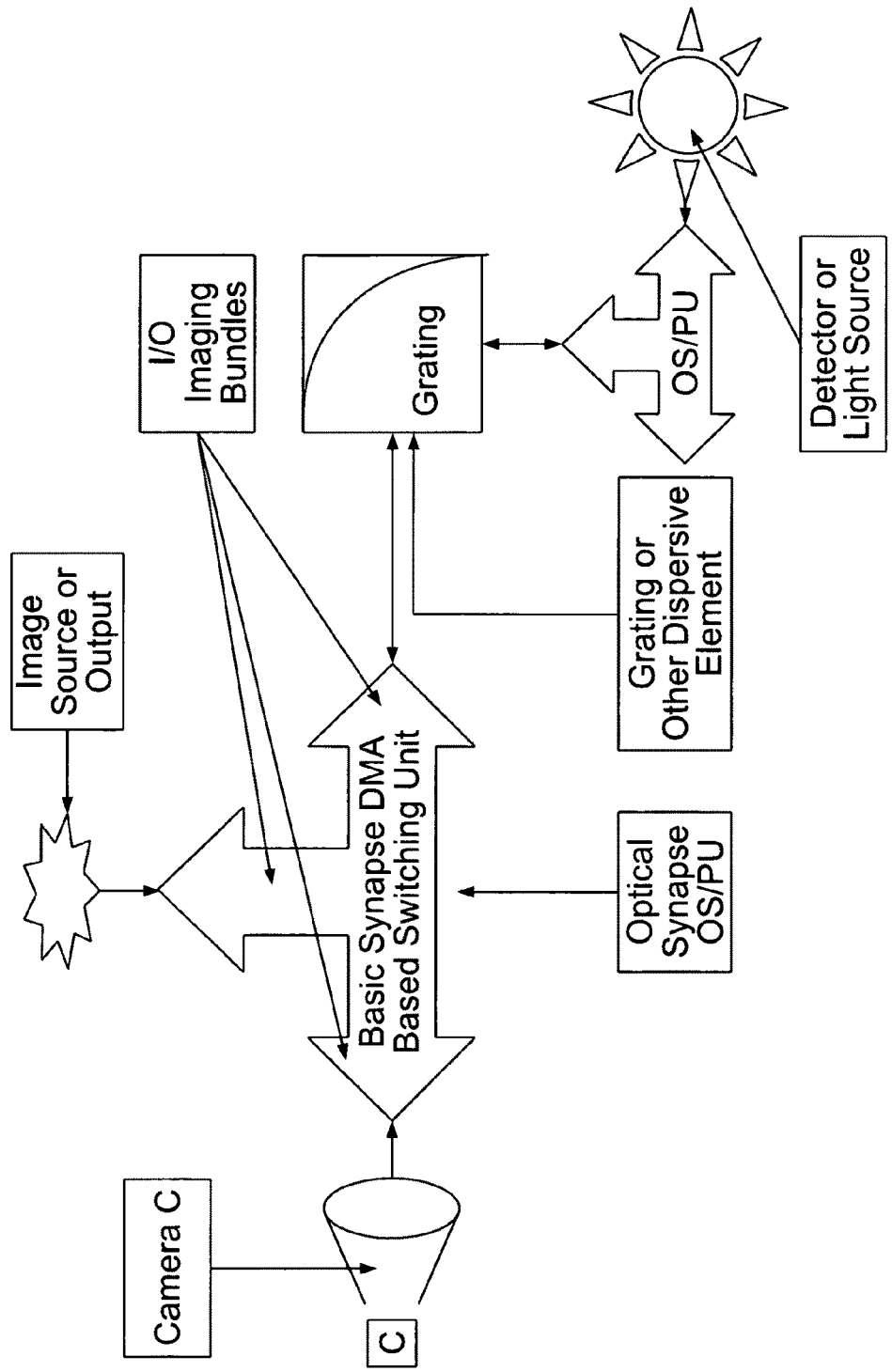

FIG. 21 illustrates in a diagram form an embodiment of the spectral imaging device discussed herein, which is built with two OSPUs. Different configurations of generalized processing devices are illustrated in FIG. 22, in which each side is imaging in a different spectral band, and FIG. 23, which illustrates the main components of a system for processing input radiation using an OSPU.

Figure 24:
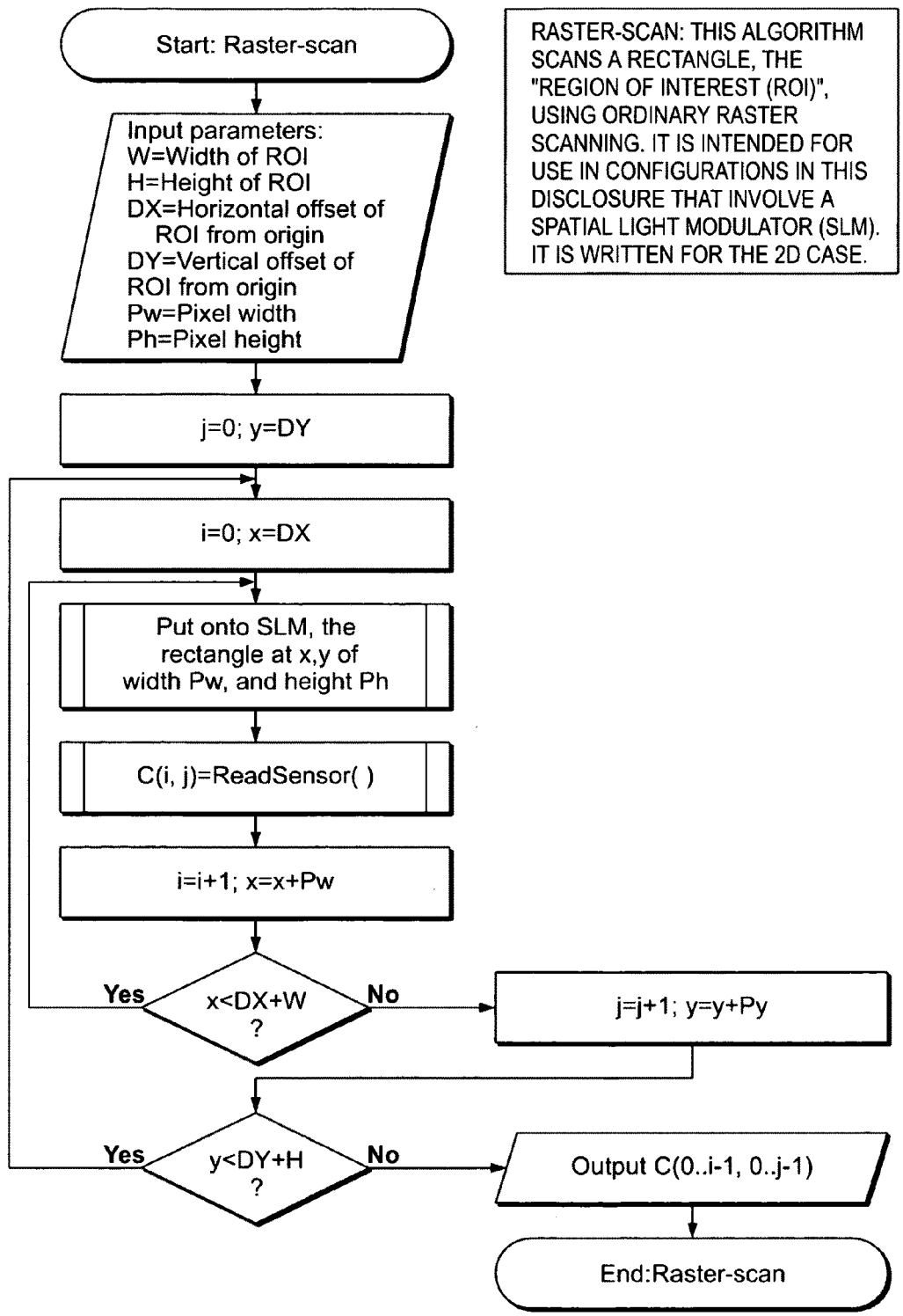
FIGS. 24-26 are flow charts of various scans used in accordance with the present invention. Specifically.
Figure 25:
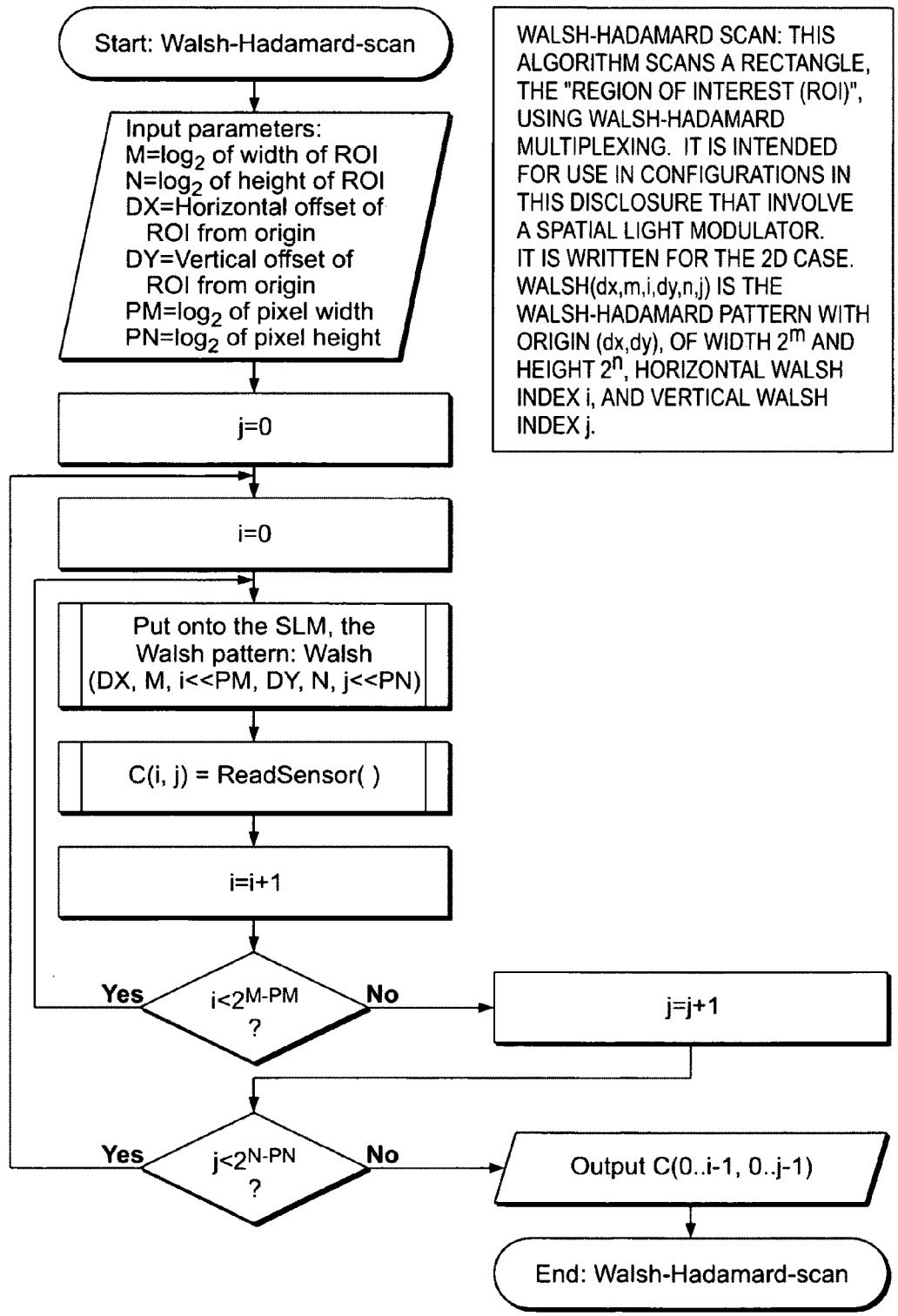
Figure 26:
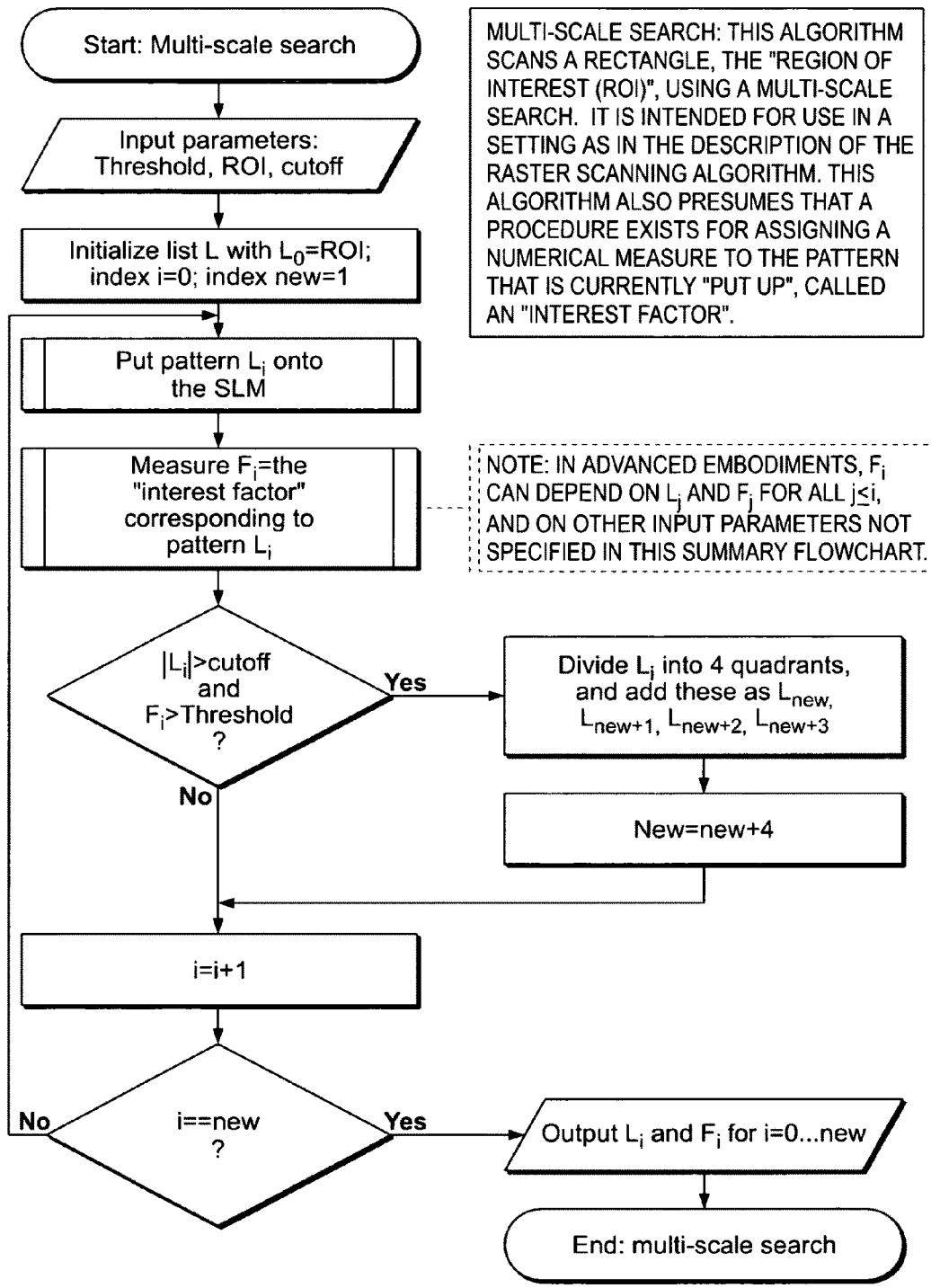

In accordance with the present invention, different scanning modes can be used in different applications, as illustrated in FIG. 24, FIG. 25 and FIG. 26. These algorithms are of use, for example, when one is using an OSPU in conjunction with a single sensor, and the OSPU is binning energy into that sensor, the binning being determined by the pattern that is put onto the SLM of the OSPU.

In particular, FIG. 24 is a flow chart of a raster-scan using in one embodiment of the present invention. This algorithm scans a rectangle, the "Region Of Interest (ROI)," using ordinary raster scanning. It is intended for use in configurations in this disclosure that involve a spatial light modulator (SLM). It is written for the 2D case, but the obvious modifications will extend the algorithm to other dimensions, or restrict to 1D.

FIG. 25 is a flowchart of a Walsh-Hadamard scan used in accordance with another embodiment of the invention. This algorithm scans a rectangle, the "Region Of Interest (ROI)", using Walsh-Hadamard multiplexing. Walsh (dx, m, i, dy, n, j) is the Walsh-Hadamard pattern with origin (dx, dy), of width $2^m$ and height $2^n$, horizontal Walsh index i, and vertical Walsh index j.

FIG. 26 is a flowchart of a multi-scale scan. This algorithm scans a rectangle, the "Region Of Interest (ROI)", using a multi-scale search. It is intended for use in a setting as in the description of the raster scanning algorithm. The algorithm also presumes that a procedure exists for assigning a numerical measure to the pattern that is currently on is called an "interest factor."

Figure 26A:
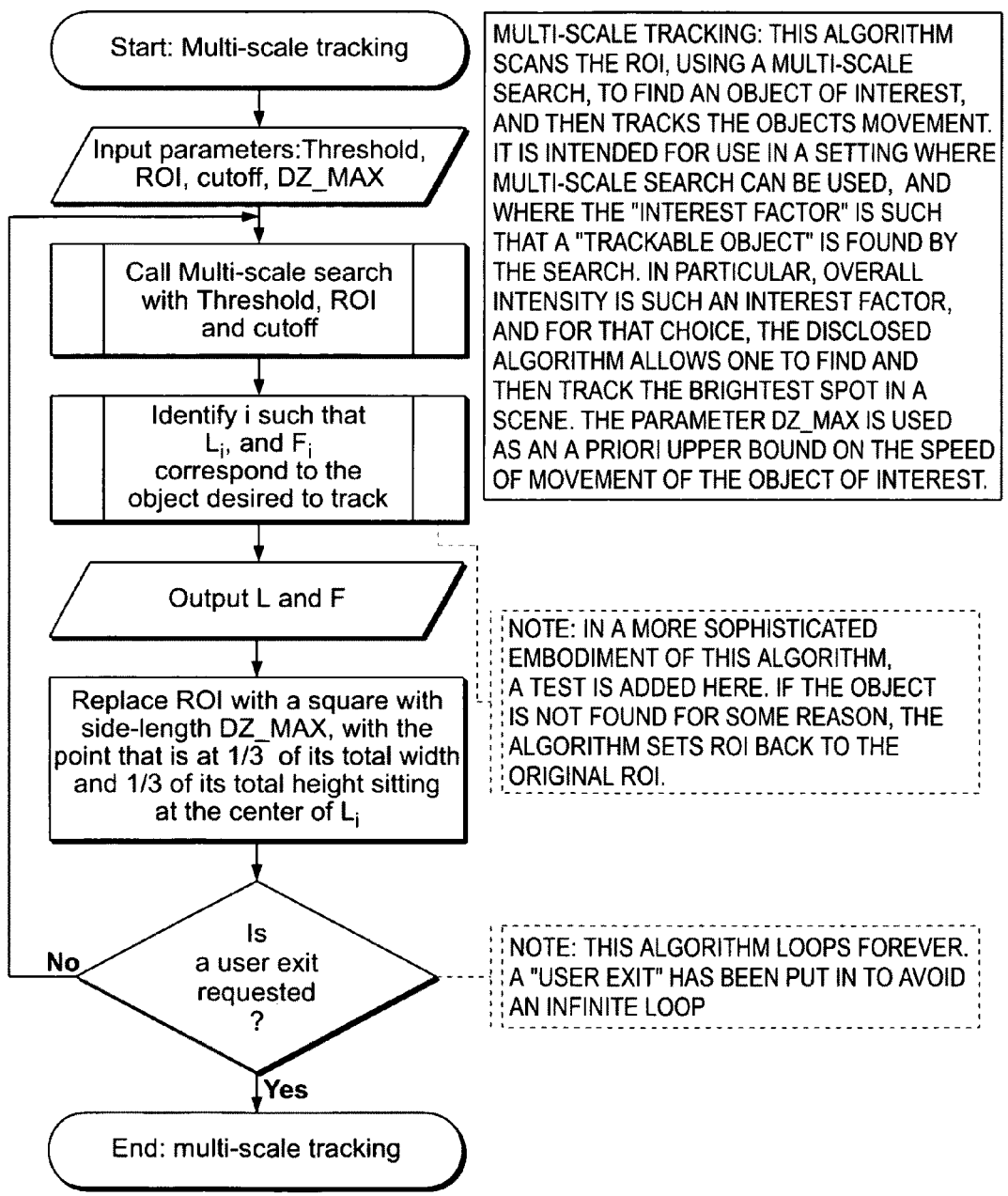
FIG. 26A illustrates a multi-scale tracking algorithm in a preferred embodiment of the present invention.

FIG. 26A illustrates a multi-scale tracking algorithm in a preferred embodiment of the present invention. The algorithm scans the region of interest, (using multi-scan search), to find an object of interest and then tracks the object's movement across the scene. It is intended for use in a setting where multi-scale search can be used, and where the "interest factor" is such that a trackable object can be found. Examples of interest factors used in accordance with a preferred embodiment (when pattern $L_i$ is put onto the SLM, the sensor reads $C_i$ and we are defining the "interest factor" $F_i$). in the preceding scan algorithms a single sensor is assumed. Thus 1. $F(L_i)=C_i$
2. $F(L_i)=C_i/\text{area}(L_i)$
3. $F(L_i)=C_i/C_k$, where $L_k$ is the rectangle that contains $L_i$, and that has N times the area of $L_i$, (for example, N=4), and which has already been scanned by the algorithm (there will always be exactly one such).

A modification of the algorithm is possible, where instead of putting up the pattern $L_i$, one can put up a set of a few highly oscillatory Walsh patterns fully supported on exactly $L_i$, and take the mean value of the sensor reading as $F_i$. This estimates the total variation within $L_i$ and will yield an algorithm that finds the edges within a scene. In different examples the sensor is a spectrometer. $F(L_i)$=distance between the spectrum read by the sensor, and the spectrum of a compound of interest. (distance could be, e.g., Euclidean distance of some other standard distance). This will cause the algorithm to zoom in on a substance of interest.

In another embodiment, $F(L_i)$=distance between the spectrum read by the sensor, and the spectrum already read for $L_k$, where $L_k$ is the rectangle that contains $L_i$, and that has N (N=4) times the area of $L_i$, and which has already been scanned by the algorithm (there will always be exactly one such). This will cause the algorithm to zoom in on edges between distinct substances.

In yet another embodiment, $F(L_i)$=distance between the spectrum read by the sensor, and the spectrum already read for $L_o$. This will cause the algorithm to zoom in on substances that are anomalous compared to the background.

In derived embodiments, $F(L_i)$ can depend on a priori data from spectral or spatiospectral libraries.

By defining the interest factor appropriately, one can thus cover a range of different applications. In a preferred embodiment, the interest factor definitions can be pre-stored so a user can analyze a set of data using different interest factors.

It is also clear that, in the case of Walsh functions, because of the multi-scale nature of the Walsh patterns, one can combine raster and Walsh-Hadamard scanning (raster scanning at large scales, and using Walsh-Hadamard to get extra signal to noise ratio at fine scales, where it is needed most). This allows one to operate within the linear range of the detector.

Also, one can used the combined raster/Walsh idea in variations of the Multi-scale search and tracking algorithms.

For this, whenever one is studying the values of a sensor associated with the sub-rectangles of a bigger rectangle, one could use the Walsh patterns at the relevant scale, instead of scanning the pixels at. that scale. This will provide for an improvement in SNR. One could again do this only at finer scales, to stay in the detectors linearity range.

Several signal processing tasks, such as filtering, signal enhancement, feature extraction, data compression and others can be implemented efficiently by using the basic ideas underlying the present invention. The concept is first illustrated in the context of one-dimensional arrays for Hadamard spectroscopy and is then extended to hyper-spectral imaging and various active illumination modes. The interested reader is directed to the book "Hadamard Transform Optics" by Martin Harwit, et al., published by Academic Press in 1979, which provides an excellent overview of the applied mathematical theory and the degree to which common optical components can be used in Hadamard spectroscopy and imaging applications.

Hadamard processing refers generally to analysis tools in which a signal is processed by correlating it with strings of 0 and 1 (or +/−1). Such processing does not require the signal to be converted from analogue to digital, but permits direct processing on the analogue data by means of an array of switches (synapse). In a preferred embodiment of the invention, an array of switches, such as a DMA, is used to provide spatio-spectral tags to different radiation components. In alternative embodiments it can also be used to impinge spatio/spectral signatures, which directly correlate to desired features.

A simple way to explain Hadamard spectroscopy is to consider the example of the weighing schemes for a chemical scale. Assume that we need to weigh eight objects, $x_1, x_2, \ldots, x_8$, on a scale. One could weigh each object separately in a process analogous to performing a raster scan, or balance two groups of four objects. Selecting the second approach, assuming that the first four objects are in one group, and the second four in a second group, balancing the two groups can be represented mathematically using the expression:

$$m = x_1 + x_2 + x_3 + x_4 - (x_5 + x_6 + x_7 + x_8) = (x, w),$$

where x is a vector, the components of which correspond to the ordered objects $x_i$, $=(1, 1, 1, 1, -1, -1, -1, -1)$ and $(x, w)$ designates the inner product of the two vectors. Various other combinations of object groups can be obtained and mathematically expressed as the inner product of the vector x and a vector of weights w, which has four +1 and four −1 elements.

For example, $w=(1, -1, 1, 1, -1, -1, 1, -1)$ indicates that $x_1, x_3, x_4, x_7$ are on the left scale while $x_2, x_5, x_6, x_8$ are on the right. The inner product, or weight $M=(x, w)$ is given by expression:

$$m = (x, w) = x_1 - x_2 + x_3 + x_4 - x_5 - x_6 + x_7 - x_8.$$

It is well known that if one picks eight mutually orthogonal vectors w, which correspond, for example, to the eight Walsh patterns, one can recover the weight $x_i$ of each object via the orthogonal expansion method $$x = [(x, w_1)w_1 + (x, w_2)w_2 + \ldots + (x, w_8)w_8],$$

or in matrix notation $$[W]x = m; \quad x = [W]^{-1}m$$

where [W] is the matrix of orthogonal vectors, m is the vector of measurements, and $[W]^{-1}$ is the inverse of matrix [W].

It is well known that the advantage of using the method is its higher-accuracy, more precisely if the error for weighing measurement is $\epsilon$, the expected error for the result calculated from the combined measurements is reduced by the square root of the number of samples. This result was proved by Hotteling to provide the best reduction possible for a given number of measurements.

Figure 27:
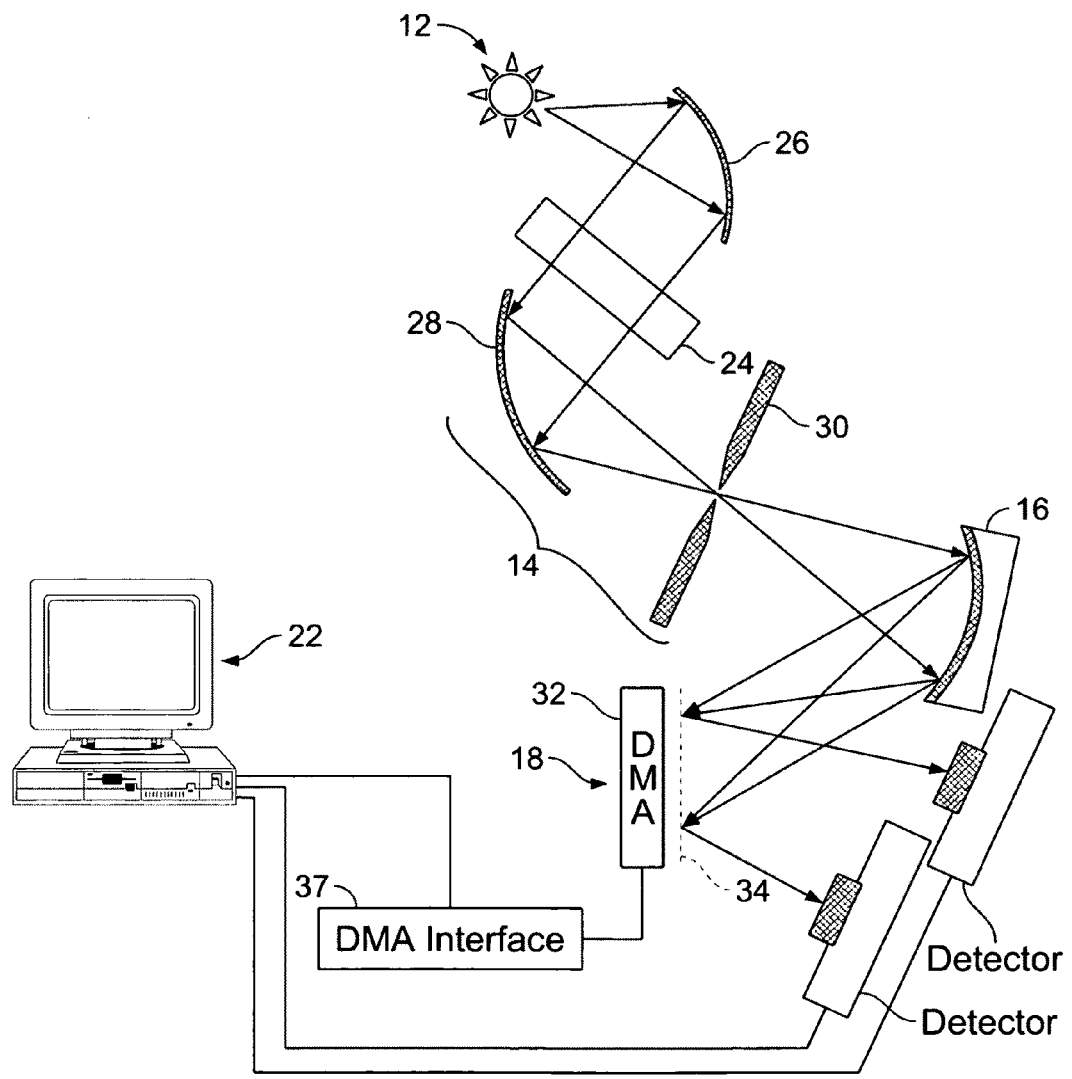
FIG. 27 is a block diagram of a spectrometer with two detectors.

In accordance with the present invention, this signal processing technique finds simple and effective practical application in spectroscopy, if we consider a spectrometer with two detectors (replacing the two arms of the scales). With reference to FIG. 27, the diffraction grating sends different spectral lines into an eight mirror array, which redistributes the energy to the 2 detectors in accordance with a given pattern of +1/−1 weights, i.e., $w_i = (1, -1, 1, 1, -1, -1, 1, -1)$ Following the above analogy, the difference between the output values of the detectors corresponds to the inner product $m = (x, w_1)$. If one is to redistribute the input spectrum energy to the 2 spectrometers using eight orthogonal vectors of weights, (following the pattern by alternating the mirror patterns to get eight orthogonal configurations), an accurate measurement of the source spectrum can be obtained. This processing method has certain advantages to the raster scan in which the detector measures one band at a time.

Clearly, for practical applications a precision requiring hundreds of bands can be required to obtain accurate chemical discrimination. However, it should be apparent that if once knows in advance which bands are needed to discriminate two compounds, the turning of the mirrors to only detect these bands could provide such discrimination with a single measurement.

Following is a description of a method for selecting efficient mirror settings to achieve discrimination using a minimum number of measurements. In matrix terminology, the task is to determine a minimum set of orthogonal vectors.

In accordance with the present invention, to this end one can use the Walsh-Hadamard Wavelet packets library. As known, these are rich collections of ±1, 0 patterns which will be used as elementary analysis patterns for discrimination. They are generated recursively as one follows: (a) first, double the size of the pattern w in two ways either as (w,w) or as (w,−w). It is clear that if various n patterns $w_i$ of length n are orthogonal, then the 2n patterns of length 2n are also orthogonal. This is the simplest way to generate Hadamard-Walsh matrices.

Figure 28:
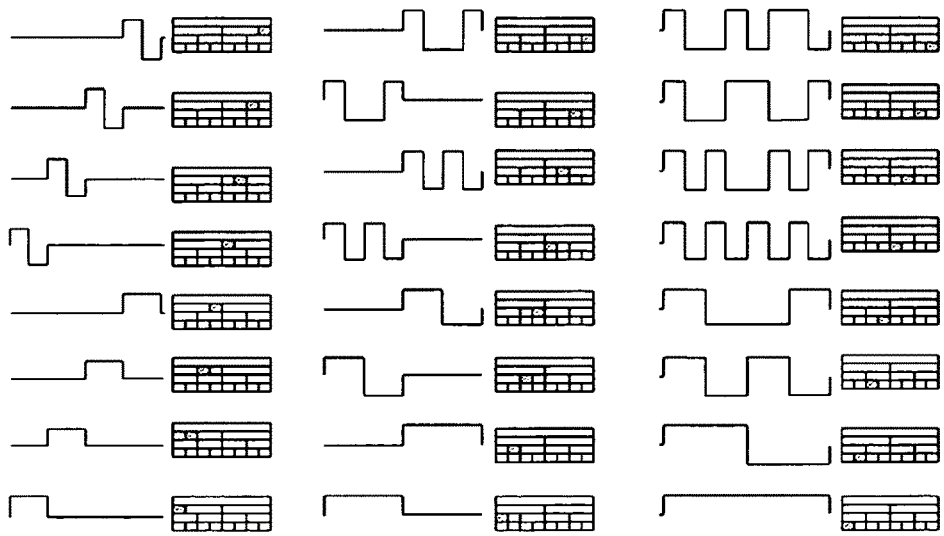
FIG. 28 illustrates a Walsh packet library of patterns for N=8.

The wavelet packet library consists of all sequences of length N having broken up in $2^m$ blocks, all except one are 0 and one block is filled with a Walsh pattern (of ±1) of length $2^l$ where $l+m=n$. As known, a Walsh packet is a localized Walsh string of ±1. FIG. 28 illustrates all 24 library elements for N=8.

A correlation of a vector x with a Walsh packet measures a variability of x at the location where the packet oscillates. The Walsh packet library is a simple and computationally efficient analytic tool allowing sophisticated discrimination with simple binary operations. It can be noted that in fact, it is precisely the analog of the windowed Fourier transform for binary arithmetic.

As an illustration, imagine two compounds A and B with subtle differences in their spectrum. The task is to discriminate among them in a noisy environment and design efficient mirror configurations for DMA spectroscope. In accordance with a preferred embodiment, the following procedure can be used:

(1) Collect samples for both A and B, the number of samples collected should be representative of the inherent variability of the measurements. A sample in this context is a full set x of the spectrum of the compound.

(2) Compute the inner product (x, w) for all samples X of A and (y, w) for all samples Y of B for each fixed Walsh product w.

(3) Measure the discrimination power pw of the pattern w to distinguish between compound A and B. This could be done by comparing the distribution of the numbers {(x, w)} to the distribution of the numbers {(y, w)}, where the farther apart these distributions, the better they can be distinguished.

(4) Select an orthogonal basis of patterns w maximizing the total discrimination power and order them in decreasing order.

(5) Pick the top few patterns as an in put to a multidimensional discrimination method.

As an additional optional step in the above procedure, experiments can be run using data on which top few selected patterns failed, and repeat steps 3, 4 and 5.

Because of the recursive structure of the W-packet library, it is possible to achieve 2+3+4 in $N\log_2 N$ computations per sample vector of length N, i.e. essentially at the rate data collection. It should be noted that this procedure of basis selection for discrimination can also be used to enhance a variety of other signal processing tasks, such as data compression, empirical regression and prediction, adaptive filter design and others. It allows to define a simple orthogonal transform into more useful representations of the raw data. Further examples are considered below and illustrated herein, such as the wheat protein example.

The use of Hadamard processing was considered herein to provide simple, computationally efficient and robust signal processing. In accordance with the present invention, the concept of using multiple sensors and/or detectors can be generalized to what is known as hyper-spectral processing.

As known, current spectroscopic devices can be defined broadly into two categories—point spectroscopy and hyperspectral imaging. Point spectroscopy in general involves a single sensor measuring the electromagnetic spectrum of a single sample (spatial point). This measurement is repeated to provide a point-by-point scan of a scene of interest. In contrast, hyper-spectral imaging generally uses an array of sensors and associated detectors. Each sensor corresponds to the pixel locations of an image and measures a multitude of spectral bands. The objective of this imaging is to obtain a sequence of images, one for each spectral band. At present, true hyper-spectral imaging devices, having the ability to collect and process the full combination of spectral and spatial data are not really practical as they require significant storage space and computational power.

Figure 29:
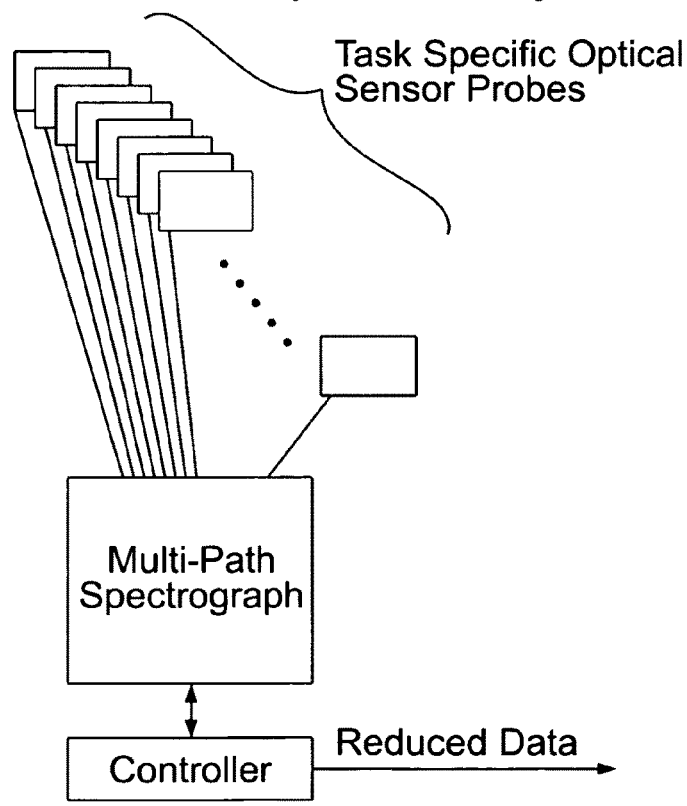
FIG. 29 is a generalized block diagram of hyper-spectral processing in accordance with the invention.
Figure 30:
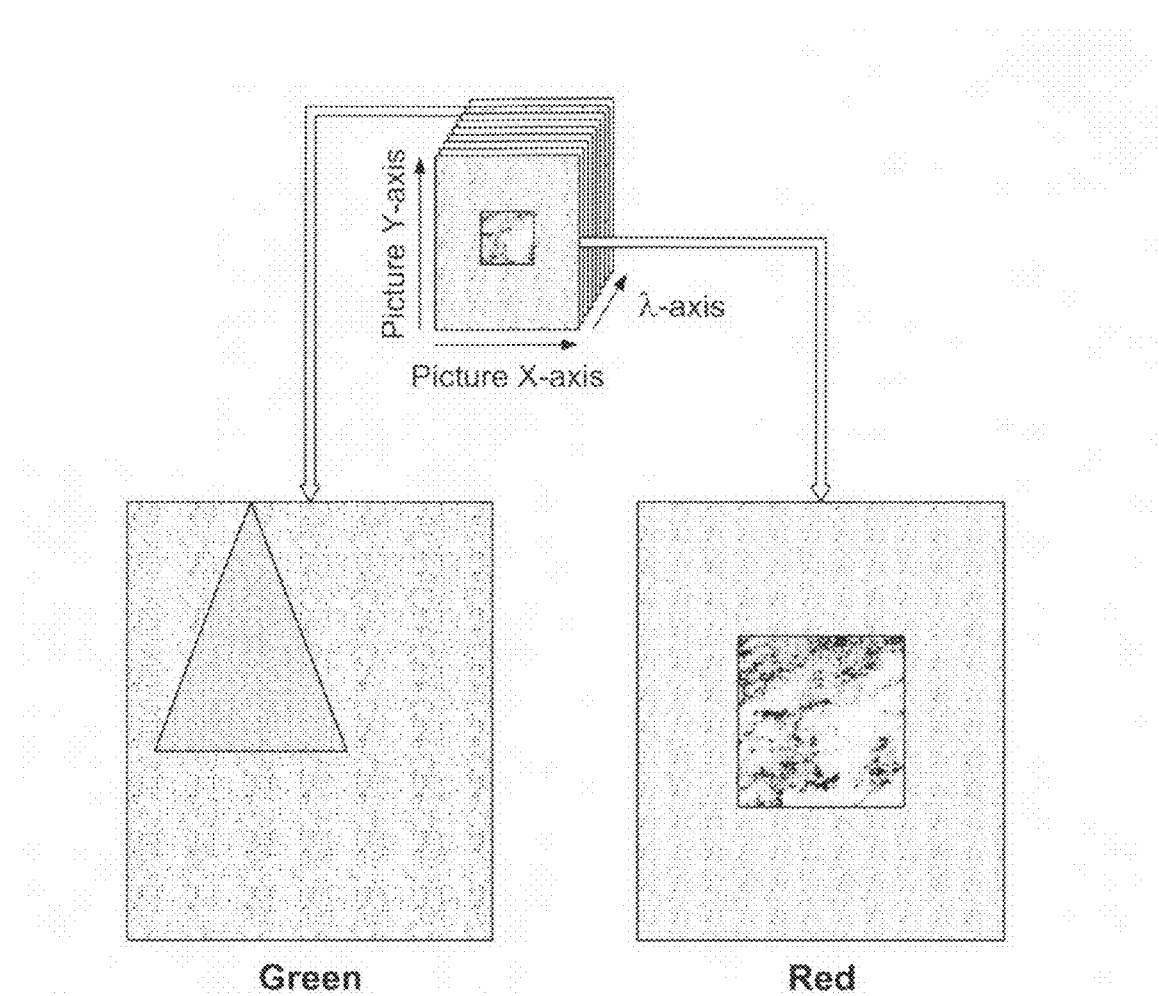
FIG. 30 illustrates the difference in two spectral components (red and green) of a data cube produced by imaging the same object in different spectral bands.
Figure 31:
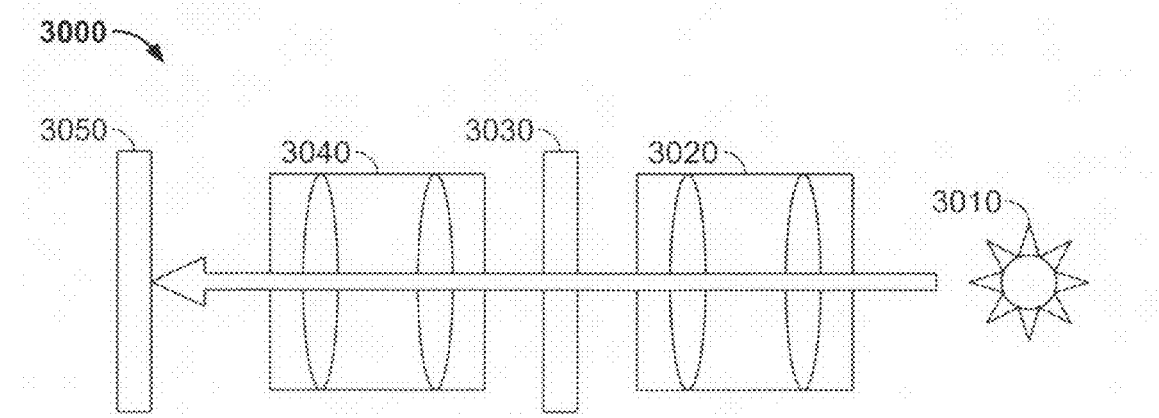
FIG. 31 illustrates a conventional liquid crystal tunable filter scanned spectral imaging system.
Figure 32:
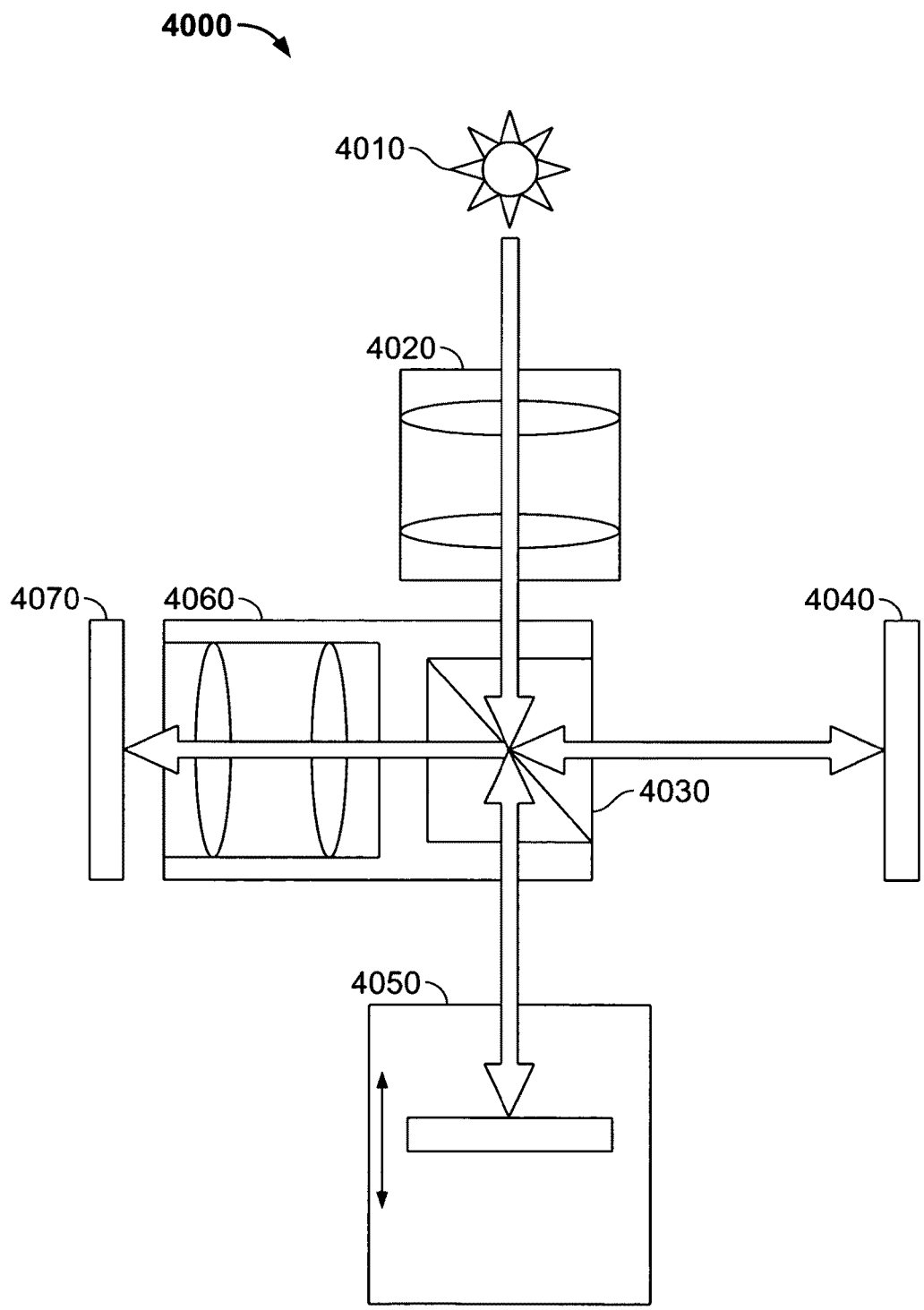
FIG. 32 is illustrates a conventional scanning multiplexed spectral imaging system, such as a Fourier transform focal plane array spectral imaging system.
Figure 33A:
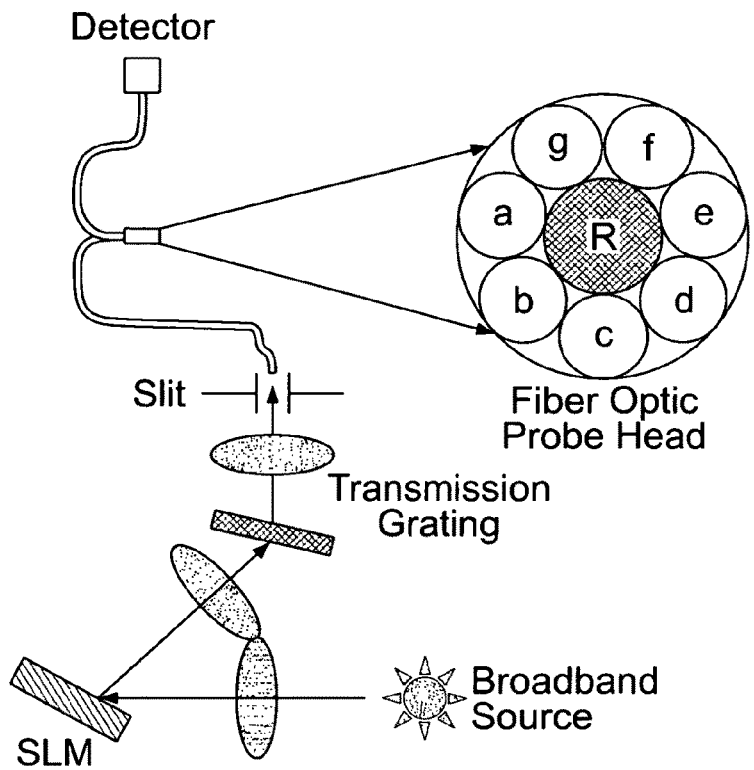
FIGS. 33A-E illustrate different embodiments of an imaging spectrograph used in accordance with this invention in de-dispersive mode.
Figure 33B:
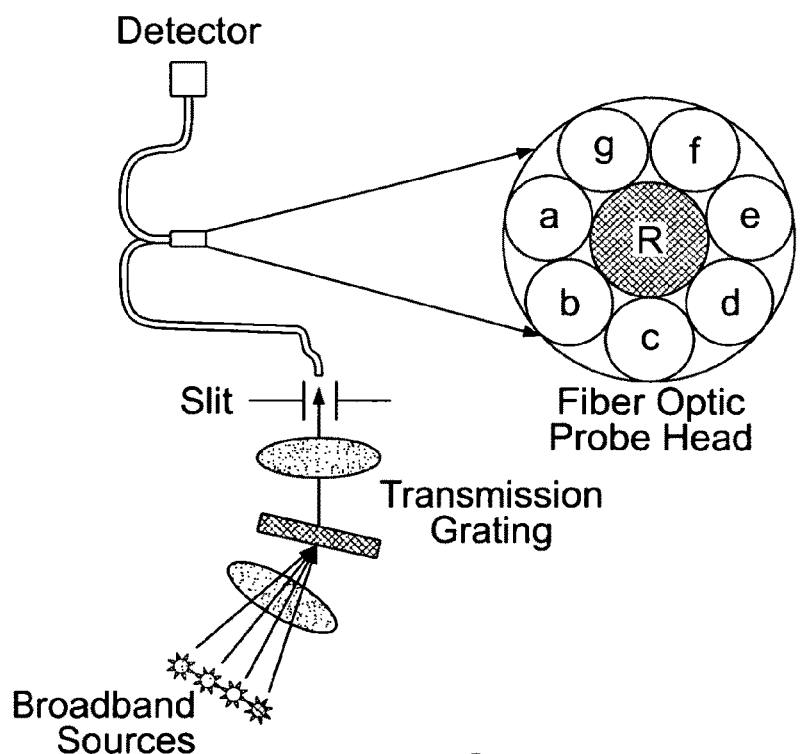
Figure 33C:
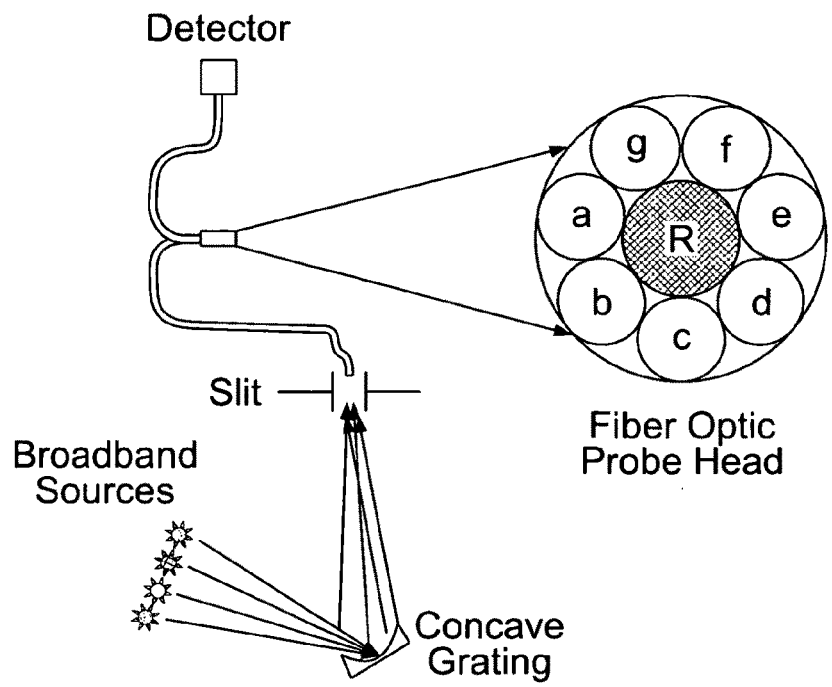
Figure 33D:
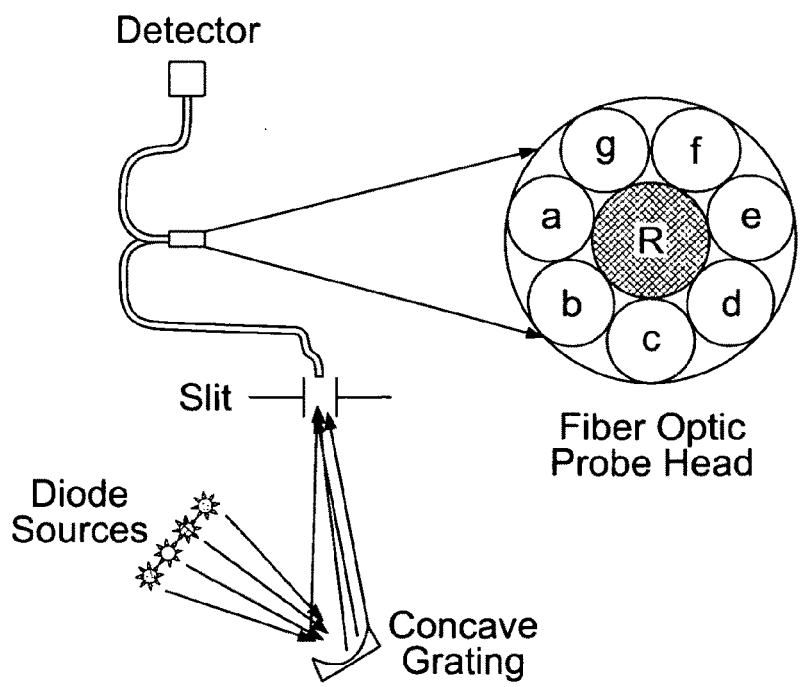
Figure 33E:
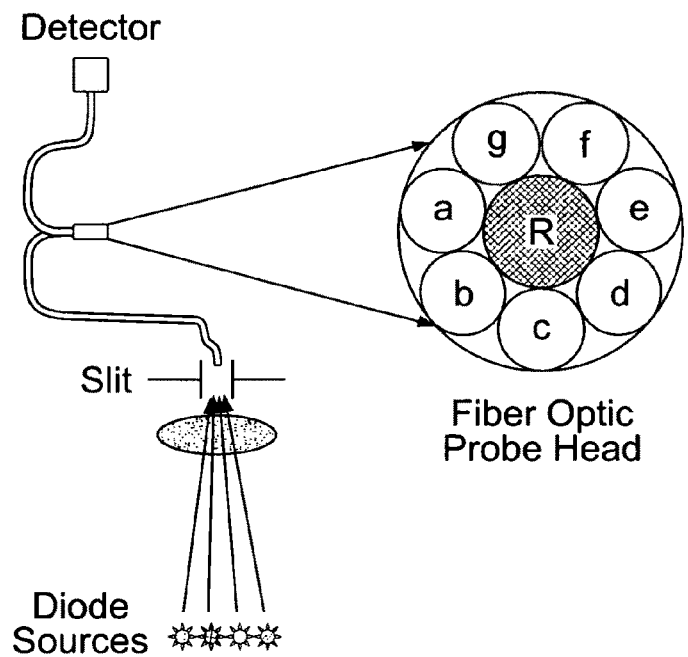

In accordance with the present invention, significant improvement over the prior art can be achieved using hyperspectral processing that focuses of predefined characteristics of the data. For example, in many cases only a few particular spectral lines or bands out of the whole data space are required to discriminate one substance over another. It is also often the case that target samples do not possess very strong or sharp spectral lines, so it can not be necessary to use strong or sharp bands in the detection process. A selection of relatively broad bands can be sufficient to discriminate between the target object and the background. It should be apparent that the ease with which different spatio-spectral bands can be selected and processed in accordance with the present invention is ideally suited for such hyperspectral applications. A generalized block diagram of hyper-spectral processing in accordance with the invention is shown in FIG. 29. FIG. 30 illustrates two spectral components (red and green) of a data cube produced by imaging the same object in different spectral bands. It is quite clear that different images contain completely different kinds of information about the object.

FIGS. 33A-E illustrate different embodiments of an imaging spectrograph in de-dispersive mode, that can be used in accordance with this invention for hyper-spectral imaging in the UV, visual, near infrared and infrared portions of the spectrum. For illustration purposes, the figures show a fiber optic probe head with a fixed number of optical fibers. As shown, the fiber optic is placed at an exit slit. It will be apparent that a multitude of fiber optic elements and detectors can be used in alternate embodiments.

Figure 34:
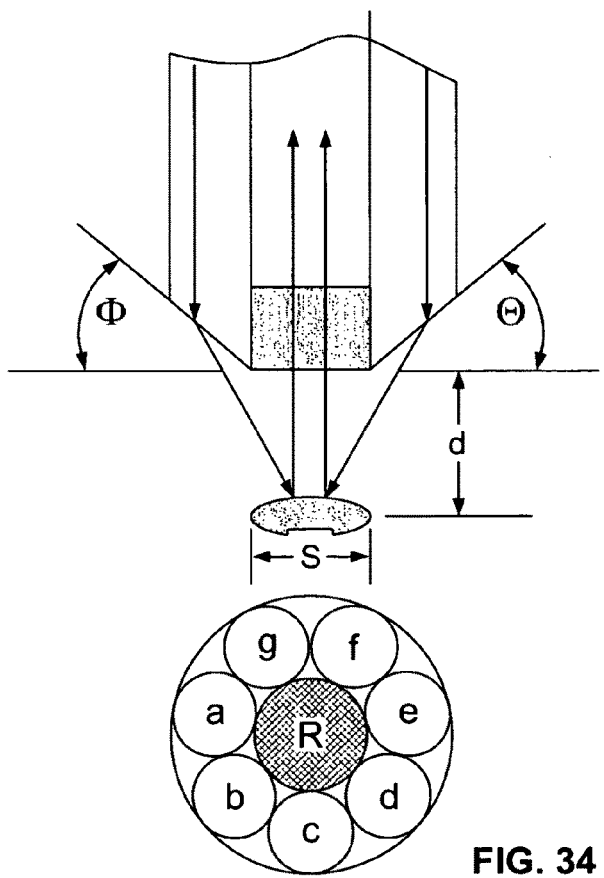
FIG. 34 shows an axial and a cross-sectional views of a fiber optic assembly.

FIG. 34 shows an axial and cross-sectional view of the fiber optic assembly illustrated in FIGS. 33A-E.

Figure 35:
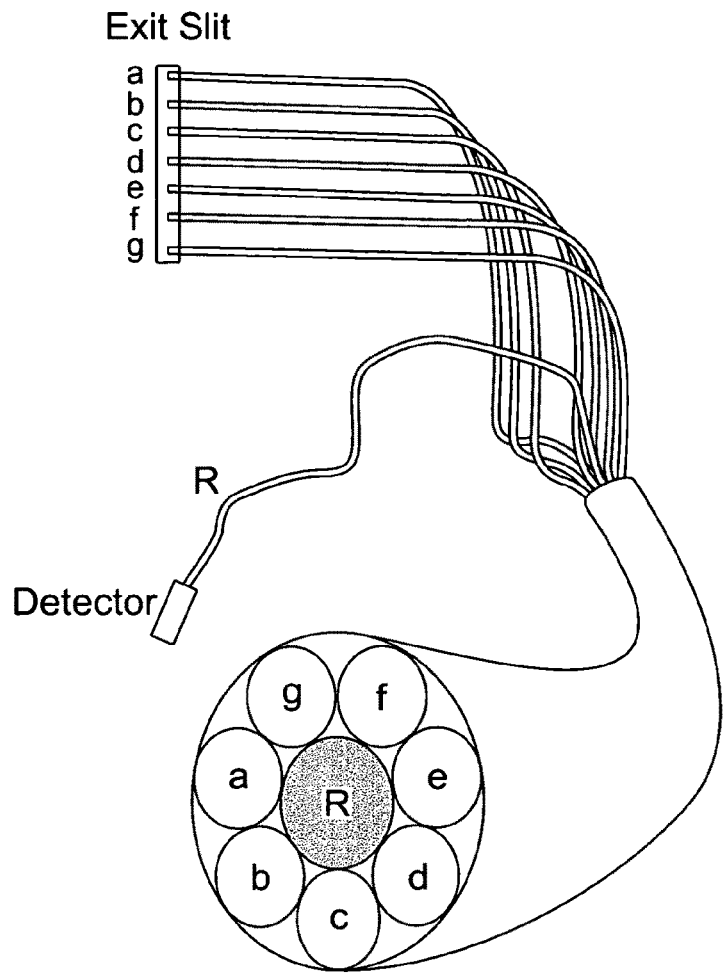
FIG. 35 shows a physical arrangement of the fiber optic cable, detector and the slit.
Figure 36:
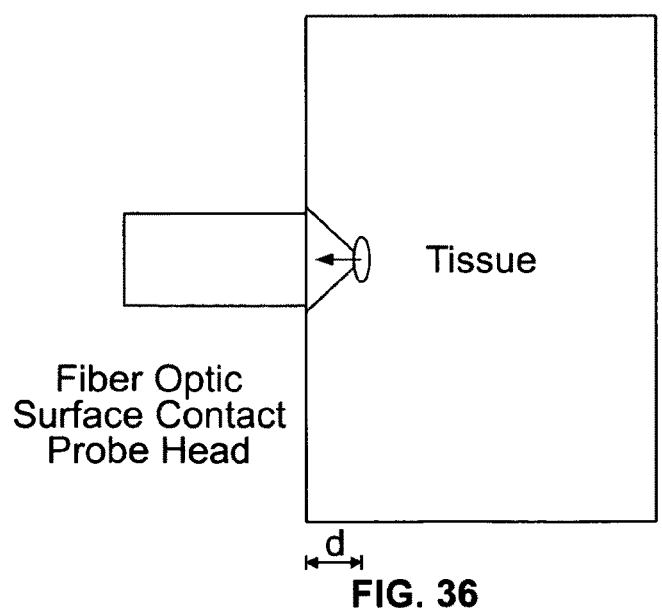
FIG. 36 illustrates a fiber optic surface contact probe head abutting tissue to be examined.

FIG. 35 shows a physical arrangement of the fiber optic cable, detector and the slit. FIG. 36 illustrates a fiber optic surface contact probe head abutting tissue to be examined.

Figure 37A:
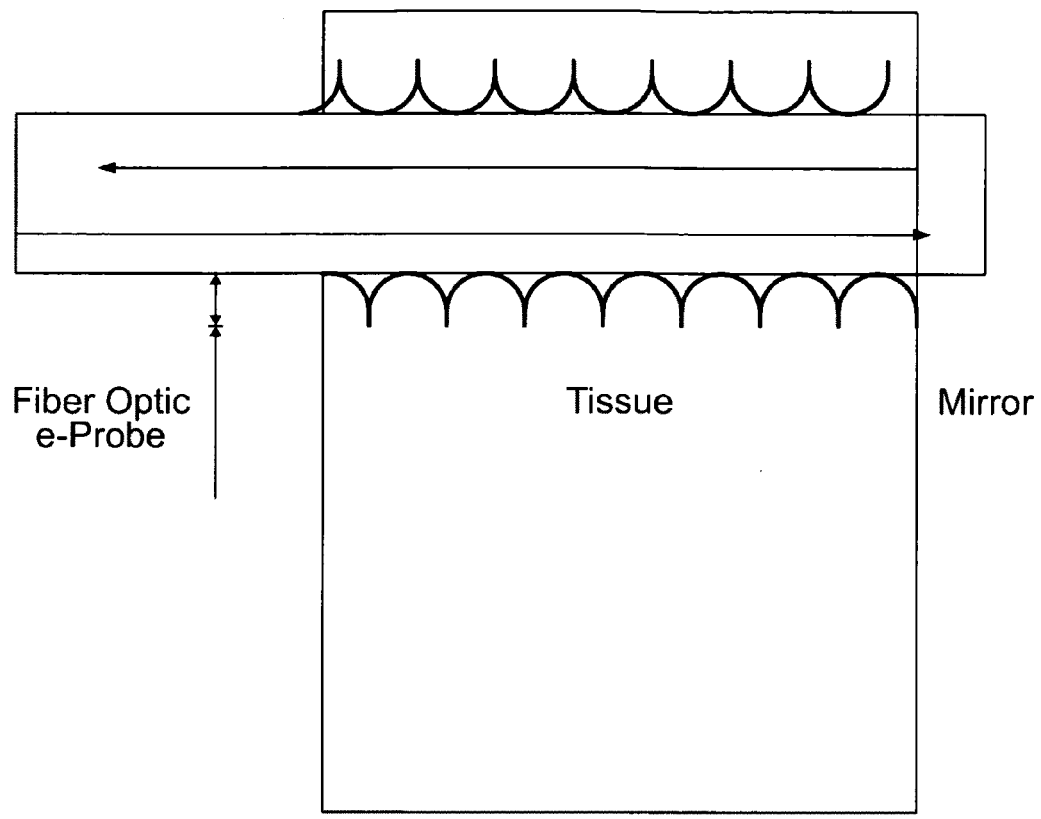
FIGS. 37A and 37 B illustrate a fiber optic c-Probe for pierced ears that can be used for medical monitoring applications in accordance with the present invention.
Figure 37B:
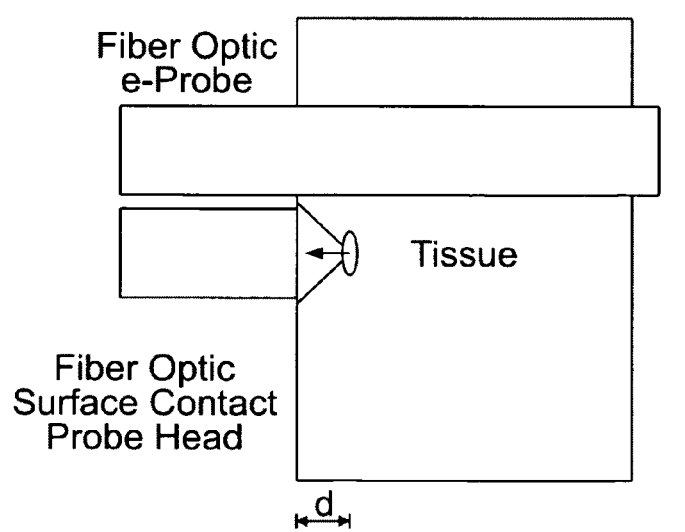

FIGS. 37A and 37B illustrate a fiber optic e-Probe for pierced ears that can be used for medical monitoring applications in accordance with the present invention.

Figure 38A:
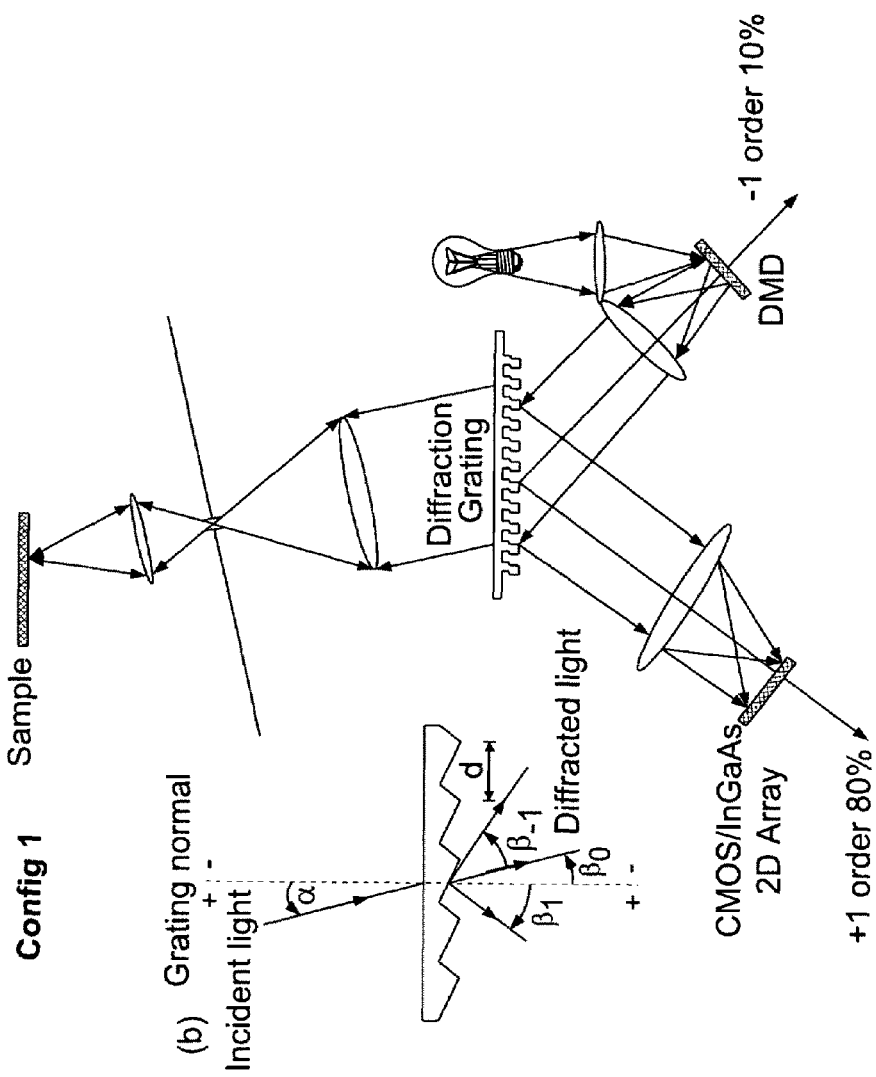
FIGS. 38A, 38B and 38C illustrate different configurations of a hyper-spectral adaptive wavelength advanced illuminating imaging spectrograph (HAWAIIS) in accordance with this invention.
Figure 38B:
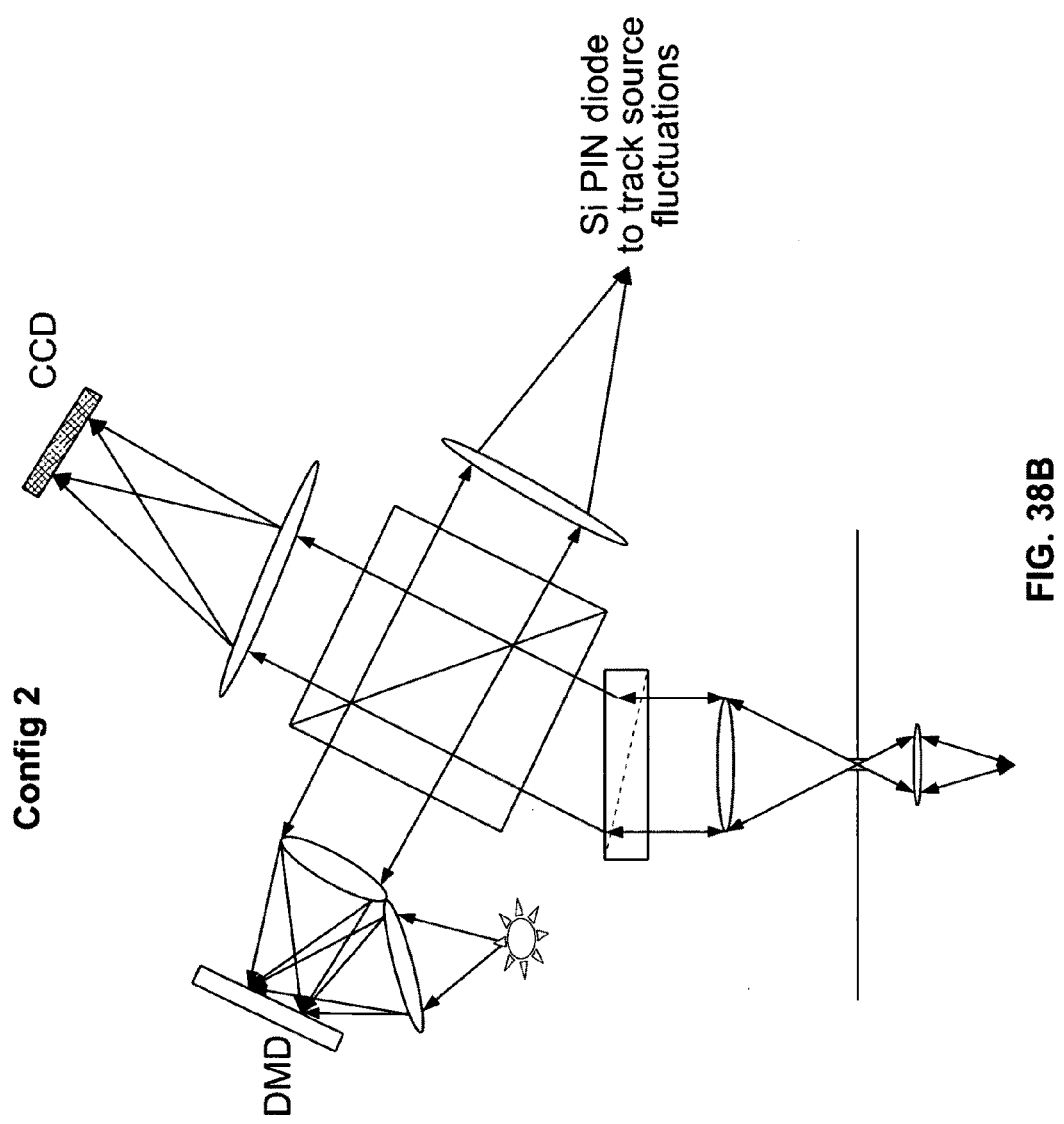
Figure 38C:
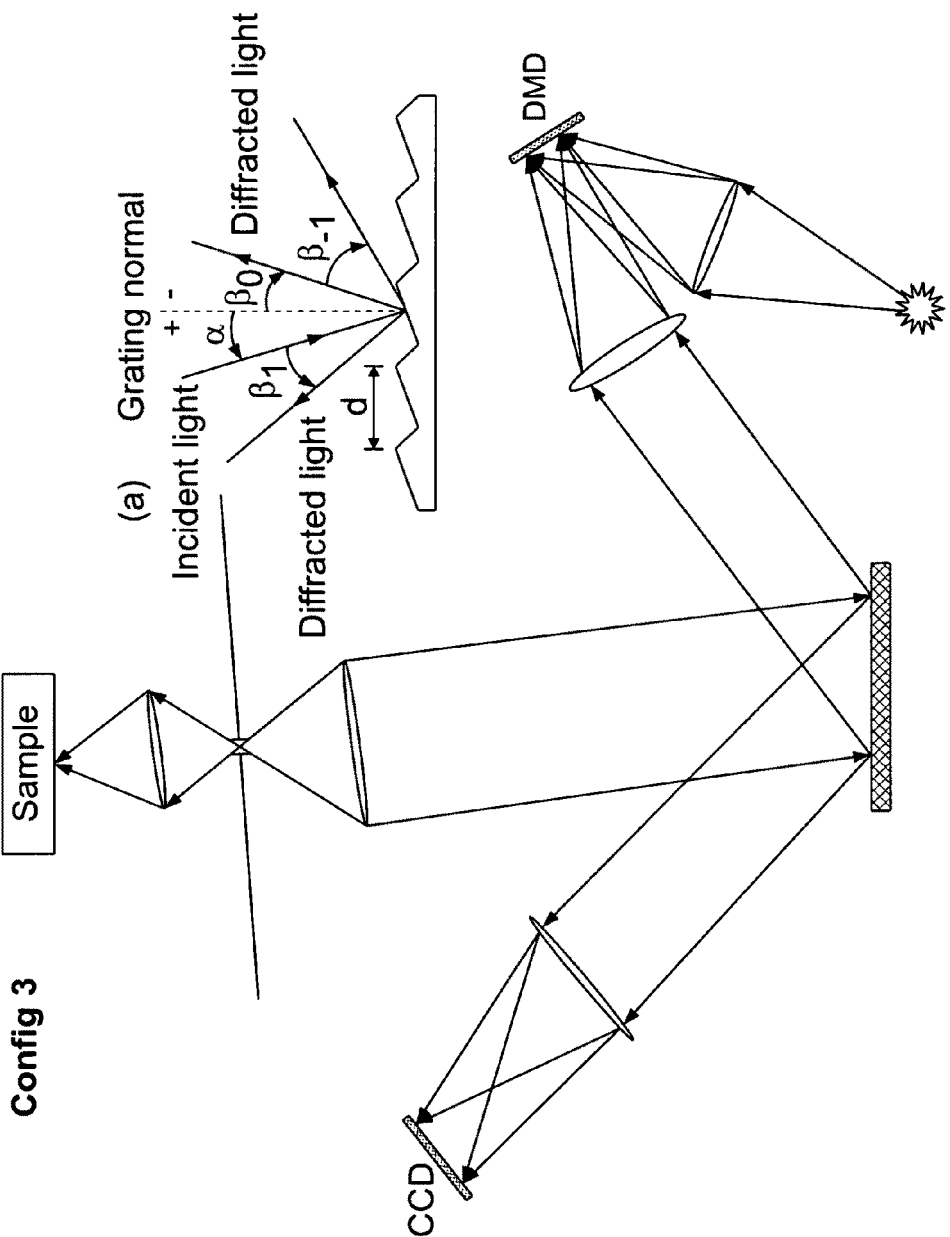

FIGS. 38A, 38B and 38C illustrate different configurations of a hyper-spectral adaptive wavelength advanced illuminating imaging spectrograph (HAWAIIS).

In FIG. 38A, DMD (shown illuminating the −1 order) is a programmable spatial light modulator that is used to select spatio/spectral components falling upon and projecting from the combined entrance/exit slit. The illumination is fully programmable and can be modulated by any contiguous or non-contiguous combination at up to 50 KHz. The corresponding spatial resolution element located at the Object/sample is thus illuminated and is simultaneously spectrally imaged by the CCD (located in order +1 with efficiency at 80%) as in typical CCD imaging spectrographs used for Raman spectral imaging.

With reference to FIG. 38, the output of a broadband light source such as a TQH light bulb (1001) is collected by a collection optic (lens 1002) and directed to a spatial light modulator such as the DMA used in this example (1003). Specific spatial resolution elements are selected by computer controlled DMA driver to propagate to the transmission diffraction grating (1005) via optic (lens 1004). The DMA (1003) shown illuminating the −1 order of the transmission diffraction grating (1005) is a programmable spatial light modulator that is used to select spatio/spectral resolution elements projecting through the entrance/exit slit (#1007) collected and focused upon the sample (1009) by optic (lens 1008). The spatio/spectral resolution elements illuminating the sample are fully programmable. The sample is thus illuminated with specific and known spectral resolution elements. The reflected spectral resolution elements from specific spatial coordinates at the sample plane are then collected and focused back through the entrance/exit slit by optic (lens 1008). Optic (lens 1006) collimates the returned energy and presents it to the transmission diffraction grating (1005). The light is then diffracted preferentially into the +1 order and is subsequently collected and focused by the optic (lens 1010) onto a 2D detector array (1011). This conjugate spectral imaging device has the advantage of rejecting out of focus photons from the sample. Spectral resolution elements absorbed or reflected are measured with spatial specificity by the device.

FIGS. 45-49(A-D) illustrate hyperspectral processing in accordance with the present invention, including data maps, encodement mask, DMA programmable resolution using different numbers of mirrors and several encodegrams.

One aspect of the present invention is the use of modulation of single array elements or groups of array elements to "tag" radiation impinging on these elements with its own pattern of modulation. In essence, this aspect of the invention allows to combine data from a large number of array elements into a few processing channels, possibly a single channel, without losing the identity of the source and/or the spatial or spectral distribution of the data.

As known in the art, combination of different processing channels into a smaller number of channels is done using signal multiplexing. In accordance with the present invention, multiplexing of radiation components which have been "tagged" or in some way encoded to retain the identity of their source, is critical in various processing tasks, and in particular enables simple, robust implementations of practical devices. Thus, for example, in accordance with the principles of the present invention, using a micro mirror array, an optical router, an on-off switch (such as an LCD screen), enables simplified and robust image formation with a single detector and further makes possible increasing the resolution of a small array of sensors to any desired size.

In accordance with this invention, methods for digitally-controlled modulation of sensor arrays are used to perform signal processing tasks while collecting data. Thus, the combination and binning of a plurality of radiation sources is manipulated in accordance with this invention to perform calculations on the analog data, which is traditionally done in the digital data analysis process. As a result, a whole processing step can be eliminated by preselecting the switching modulation to perform the processing before the A/D conversion, thereby only converting data quantities of interest. This aspect of the present invention enables realtime representation of the final processed data, which in processing intense applications can be critical.

By modulating the SLM array used in accordance with this invention, so as to compute inner products with elements of an orthogonal basis, the raw data can be converted directly on the sensor to provide the data in transform coordinates, such as Fourier transform, Wavelet transform, Hadamard, and others. This is because the amount of data collected is so large that it can swamp the processor or result in insufficient bandwidth for storage and transmission. As known in the art, without some compression an imaging device can become useless. As noted above, for hyper-spectral imaging a full spectrum (a few hundred data points) is collected for each individual pixel resulting in a data glut. Thus, compression and feature extraction are essential to enable a meaningful image display. It will be appreciated that the resulting data file is typically much smaller, providing significant savings in both storage and processing requirements. A simple example is the block 8×8 Walsh expansion, which is automatically computed by appropriate mirror modulation, the data measured is the actual compressed parameters.

In another related aspect of the present invention, data compression can also be achieved by building an orthogonal basis of functions. In a preferred embodiment, this can be achieved by use of the best basis algorithm. See, for example, Coifman, R. R. and Wickerhauser, M. V., "Entropy-based Algorithms for Best Basis Selection", IEEE Trans. Info. Theory 38 (1992), 713-718, and U.S. Pat. Nos. 5,526,299 and 5,384,725 to one of the inventors of this application. The referenced patents and publications are incorporated herein by reference.

By means of background, it is known that the reduction of dimensionality of a set of data vectors can be accomplished using the projection of such a set of vectors onto a orthogonal set of functions, which are localized in time and frequency. In a preferred embodiment, the projections are defined as correlation of the data vectors with the set of discretized rescaled Walsh functions, but any set of appropriate functions can be used instead, if necessary.

The best basis algorithm to one of the co-inventors of this application provides a fast selection of an adapted representation for a signal chosen from a large library of orthonormal bases. Examples of such libraries are the local trigonometric bases and wavelet packet bases, both of which consist of waveforms localized in time and frequency. An orthonormal basis in this setting corresponds to a tiling of the time-frequency plane by rectangles of area one, but an arbitrary such tiling in general does not correspond to an orthonormal basis. Only in the case of the Haar wavelet packets is there a basis for every tiling, and a fast algorithm to find that basis is known. See, Thiele, C. and Villemoes, L., "A Fast Algorithm for Adapted Time-Frequency Tilings", Applied and Computational Harmonic Analysis 3 (1996), 91-99, which is incorporated by reference.

Walsh packet analysis is a robust, fast, adaptable, and accurate alternative to traditional chemometric practice. Selection of features for regression via this method reduces the problems of instability inherent in standard methods, and provides a means for simultaneously optimizing and automating model calibration.

The Walsh system $\{W_n\}_{n=0}^{\infty}$ is defined recursively by $$W_{2n}(t) = W_n(2t) + (-1)^n W_n(2t-1)$$

$$W_{2n+1}(t) = W_n(2t) - (-1)^n W_n(2t-1)$$

With $W_0(t)=1$ on $0 \leq t < 1$. If $[0,1] \times [0,\infty]$ is the time frequency plane, dyadic rectangles are subsets of the form $$I \times \omega = [2^{-j}k, 2^{-j}(k+1)] \times [2^m n, 2^m(n+1)],$$

with j, k, m and n non-negative integers, and the tiles are the rectangles of area one (j=m). A tile p is associated with a rescaled Walsh function by the expression $$w_p(t) = 2^{j/2} W_n(2^j t - k)$$

Fact: The function $w_p$ and $w_q$ are orthogonal if and only if the tiles p and q are disjoint. Thus, any disjoint tiling will give rise to an orthonormal basis of $L^2(0,1)$ consisting of rescaled Walsh functions. For any tiling B, we may represent a function f as $$f = \sum_{p \in B} <f, w_p> w_p$$

and may find an optimal such representation for a given additive cost functional by choosing a tiling minimizing the cost evaluated on the expansion coefficients.

An example contrasting the use of adaptive Walsh packet methods with standard chemometrics for determining protein concentration in wheat is discussed herein. The data consists of two groups of wheat spectra, a calibration set with 50 samples and a validation set of 54 samples. Each individual spectrum is given in units of log(1/R) where R is the reflectance and is measured at 1011 wavelengths, uniformly spaced from 1001 nm to 2617 nm. Standard chemometric practice involves computing derivative-like quantities at some or all wavelengths and building a calibration model from this data using least squares or partial least squares regression.

To illustrate this, let $Y_i$ be the percent protein for the i-th calibration spectrum $S_i$, and define the feature $X_i$ to be $$X_i = \frac{S_i(2182 \text{ nm}) - S_i(2134 \text{ nm})}{S_i(2183 \text{ nm}) - S_i(2160 \text{ nm})}$$

where $S_i(WL\text{nm})$ is $\log(1/R)$ for the i-th spectrum at wavelength WL in nanometers. This feature makes use of 4 of the 1011 pieces of spectral data, and may be considered an approximate ratio of derivatives. Least squares provides a linear model $AX_i+B$ yielding a prediction $\hat{Y}_i$ of $Y_i$. An estimate of the average percentage regression error is given by:

$$\frac{100}{N} \sum_{i=1}^{N} \frac{|\hat{Y}_i - Y_i|}{|Y_i|}$$

with N being the number of sample spectra in the given data set (N is 50 for the calibration set). Retaining the same notation as for the calibration set, one can compute the feature $X_i$ for each validation spectrum $S_i$ and use the above model to predict $Y_i$ for the validation spectra. The average percentage regression error on the validation set is 0.62%, and this serves as the measure of success for the model. This model is known to be state-of-the-art in terms of both concept and performance for this data, and will be used as point of comparison.

The wavelength-by-wavelength data of each spectrum is a presentation of the data in a particular coordinate system. Walsh packet analysis provides a wealth of alternative coordinate systems in which to view the data. In such a coordinate system, the coordinates of an individual spectrum would be the correlation of the spectrum with a given Walsh packet. The Walsh packets themselves are functions taking on the values 1, −1, and 0 in particular patterns, providing a square-wave analogue of local sine and cosine expansions. Examples of Walsh packets are shown in FIG. 28.

In accordance with the present invention, such functions can be grouped together to form independent coordinate systems in different ways. In particular, the Walsh packet construction is dyadic in nature and yields functions having $N=2^k$ sample values. For N=1024, the closest value of N for the example case of spectra having 1011 sample values, the number of different coordinate systems is approximately $10^{272}$. If each individual Walsh packet is assigned a numeric cost (with some restrictions), a fast search algorithm exists, which will find the coordinate system of minimal (summed) cost out of all possible Walsh coordinate systems. Despite the large range for the search, the algorithm is not approximate, and provides a powerful tool for finding representations adapted to specific tasks.

These ideas can be applied to the case of regression for the wheat data in question. Any Walsh packet provides a feature, not unlike the $X_i$ computed above, simply by correlating the Walsh packet with each of the spectra. These correlations can be used to perform a linear regression to predict the protein concentration. The regression error can be used as a measure of the cost of the Walsh packet. A good coordinate system for performing regression is then one in which the cost, i.e. the regression error, is minimal. The fast algorithm mentioned above gives us the optimal such representation, and a regression model can be developed out of the best K (by cost) of the coordinates selected.

In a particular embodiment, for each of the calibration spectra S; first compute all possible Walsh packet features and then determine the linear regression error in predicting the Y; for each Walsh packet. Using this error as a cost measure, select a coordinate system optimized for regression, to provide a (sorted) set of features $\{X_i(1), \ldots, X_i(K)\}$ associated with each spectrum $S_i$. These features are coordinates used to represent the original data, in the same way that the wavelength data itself does. Four features were used in the standard model described above, and, hence, one can choose K=4 and use partial least squares regression to build a model for predicting $Y_i$. The average percentage regression error of this model on the validation data set is 0.7%, and this decreases to 0.6% for K=10. FIG. 41A shows a typical wheat spectrum together with one of the top 4 Walsh packets used in this model. The feature that is input to the regression model is the correlation of the Walsh packet with the wheat spectrum. (In this case the Walsh feature computes a second derivative, which suppresses the background and detects the curvature of the hidden protein spectrum in this region).

Similar performance is achieved by Walsh packet analysis using the same number of features. The benefit of using the latter becomes clear if noise is taken into account. Consider the following simple and natural experiment: add small amounts of Gaussian white noise to the spectra and repeat the calibrations done above using both the standard model and the Walsh packet model. The results of this experiment are shown in FIG. 43A, which plots the regression error versus the percentage noise energy for both models (we show both the K=4 and the K=10 model for the Walsh packet case to emphasize their similarity). A very small amount of noise takes the two models from being essentially equivalent to wildly different, with the standard model having more than three times the percentage error as the Walsh packet model. The source of this instability for the standard model is clear. The features used in building the regression model are isolated wavelengths, and the addition of even a small amount of noise will perturb those features significantly. The advantage of the Walsh packet model is clear in FIG. 44. The feature being measured is a sum from many wavelengths, naturally reducing the effect of the noise.

The Walsh packet method described here has other advantages, such as automation. The fast search algorithm automatically selects the best Walsh packets for performing the regression. If the data set were changed to, say, blood samples and concentrations of various analytes, the same algorithm would apply off the shelf in determining optimal features. The standard model would need to start from scratch in determining via lengthy experiment which wavelengths were most relevant.

Adaptability is also a benefit. The optimality of the features chosen is based on a numeric cost function, in this case a linear regression error. However, many cost functions can be used and in each case a representation adapted to an associated task will be chosen. Optimal coordinates can be chosen for classification, compression, clustering, non-linear regression, and other tasks. In each case, automated feature selection chooses a robust set of new coordinates adapted to the job in question.

In accordance with an embodiment of the present invention, a system in which a video camera is synchronized to the tunable light source modulation allowing analysis of the encoded spectral bands from a plurality of video images, thereby providing a multispectral image. Since the ambient light is not modulated it can be separated from the desired spectral information. This system is the functional equivalent of imaging the scene a number of times with a multiplicity of color filters. It allows the formation of any virtual photographic color filter with any absorption spectrum desired. A composite image combining any of these spectral bands can be formed to achieve a variety of image analysis, filtering and enhancing effects.

For example, an object with characteristic spectral signature can be highlighted by building a virtual filter transparent to this signature and not to others (which should be suppressed). In particular, for seeing the concentration of protein in a wheat grain pile (the example discussed below) it would be enough to illuminate with two different combination of bands in sequence and take the difference of the two consecutive images. More elaborate encodements can be necessary if more spectral combinations has to be measured independently, but the general principle remains.

In a different embodiment, an ordinary video camera used in accordance with this invention is equipped with a synchronized tunable light source so that odd fields are illuminated with a spectral signature which is modulated from odd field to odd field while the even fields are modulated with the complementary spectral signature so that the combined even odd light is white. Such an illumination system allows ordinary video imaging which after digital demodulation provides detailed spectral information on the scene with the same capabilities as the gray level camera.

This illumination processing system can be used for machine vision for tracking objects and anywhere that specific real time spectral information is useful In another embodiment, a gray level camera can measure several preselected light bands using, for example, 16 bands by illuminating the scene consecutively by the 16 bands and measuring one band at a time. A better result in accordance with this invention can be obtained by selecting 16 modulations, one for each band, and illuminating simultaneously the scene with all 16 colors. The sequence of 16 frames can be used to demultiplex the images. The advantages of multiplexing will be appreciated by those of skill in the art, and include: better signal to noise ratio, elimination of ambient light interference, tunability to sensor dynamic range constraints, etc.

A straightforward extension of this idea is the use of this approach for multiplexing a low resolution sensor array to obtain better image quality. For example, a 4×4 array of mirrors with Hadamard coding could distribute a scene of 400×400 pixels on a CCD array of 100×100 pixels resulting in an effective array with 16 times the number of CCD. Further, the error could be reduced by a factor of four over a raster scan of 16 scenes.

In accordance with the present invention by irradiating a sample of material with well-chosen bands of radiation that are separately identifiable using modulation, one can directly measure constituents in the material of interest. This measurement, for example, could be of the protein quantity in a wheat pile, different chemical compounds in human blood, or others. It should be apparent that there is no real limitation on the type of measurements that can be performed, although the sensors, detectors and other specific components of the device, or its spectrum range can differ.

In the following example we illustrate the measurement of protein in wheat. The data consists of two groups of wheat spectra, a calibration set with 50 samples and a validation set of 54 samples.

Figure 39:
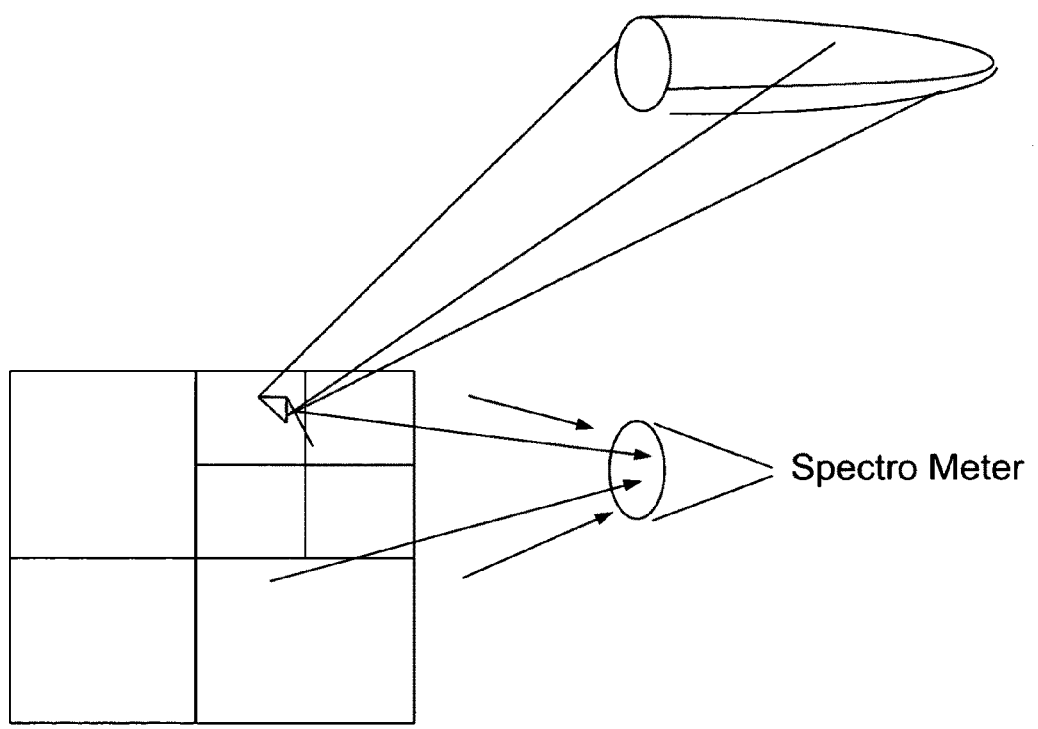
FIG. 39 illustrates a DMA search by splitting the scene.

FIG. 39 shows a DMA search by splitting the scene. The detection is achieved by combining all photons from the scene into a single detector, then splitting the scene in parts to achieve good localization. In this example, one is looking for a signal with energy in the red and blue bands. Spectrometer with two detectors, as shown in FIG. 27 can be used, so that the blue light goes to the top region of the DMA, while the red goes to the bottom.

First, the algorithm checks if it is present in the whole scene by collecting all photons into the spectrometer, which looks for the presence of the spectral energies. Once the particular spectrum band is detected, the scene is split into four quarters and each is analyzed for presence of target. The procedure continues until the target is detected.

Figure 40:
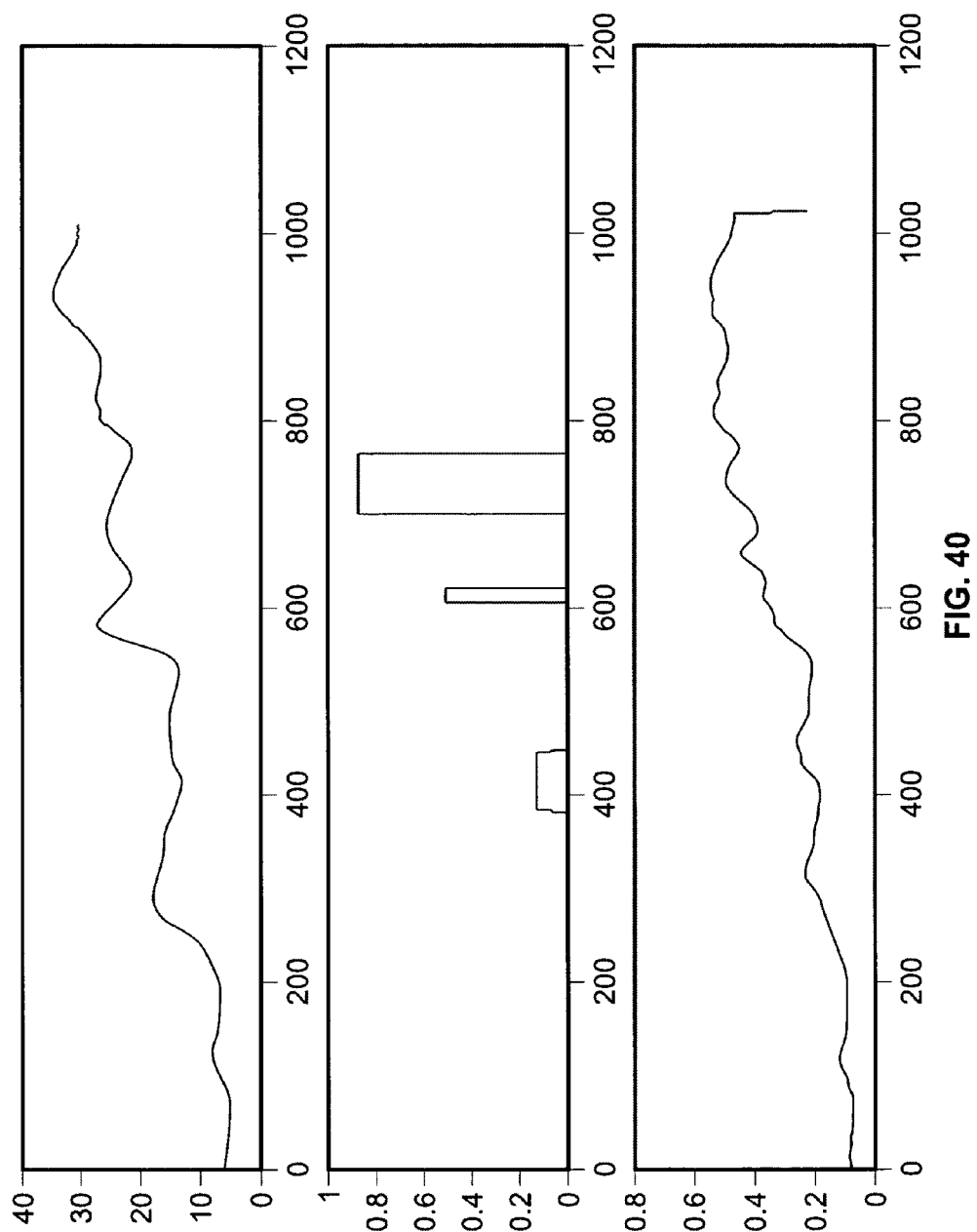
FIG. 40 illustrates wheat spectra data (training) and wavelet spectrum in an example of determining protein content in wheat.

FIG. 40 illustrates the sum of wheat spectra training data (top) Sum of |w| for top 10 wavelet packets (middle) and an example of protein spectra—soy protein (bottom). The goal is to estimate the amount of protein present in wheat. The middle portion of the figure shows the region where the Walsh packets provide useful parameters for chemo-metric estimation.

Figures 1, 41:
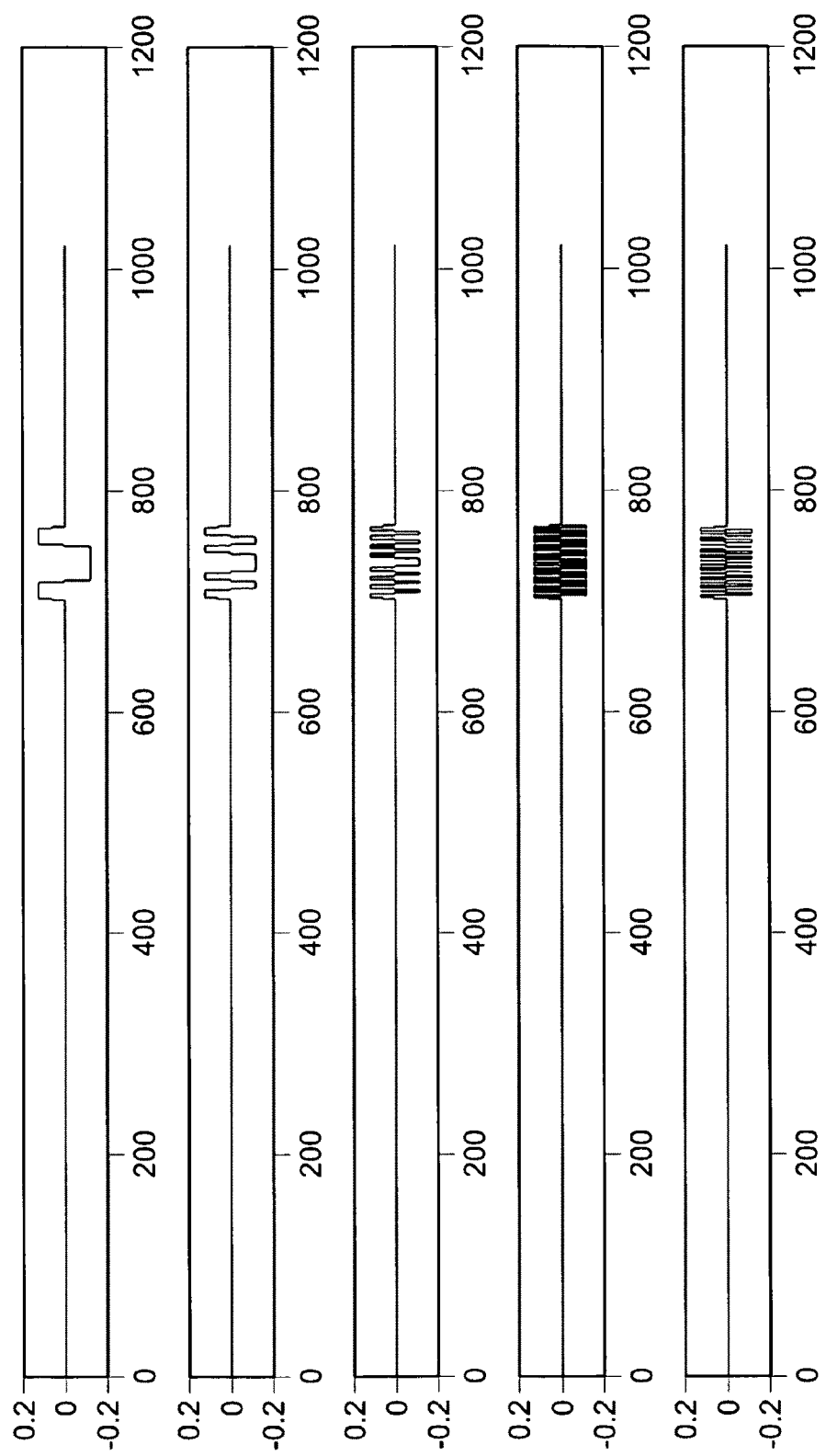
Figures 2, 41:
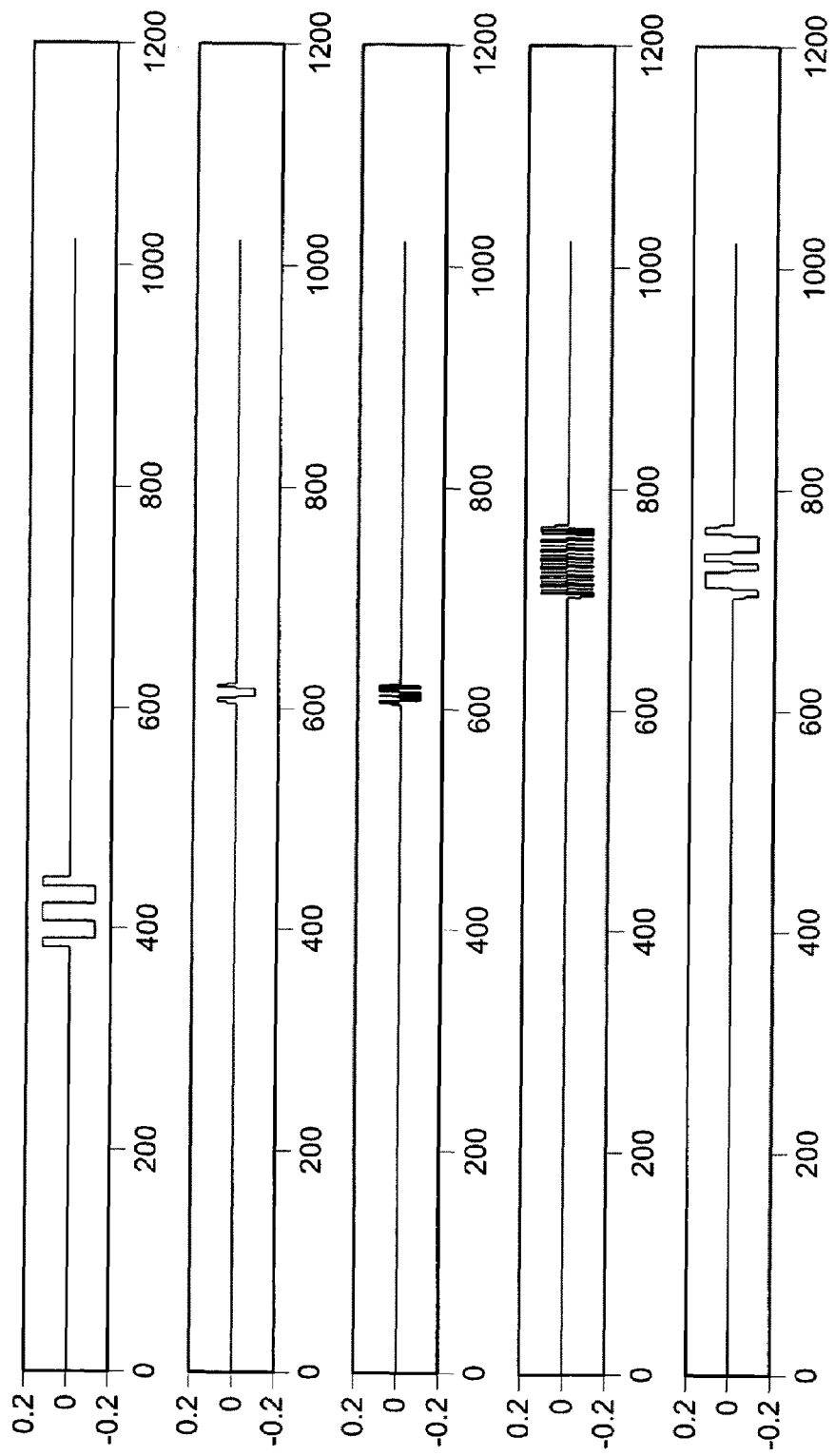
Figure 41A:
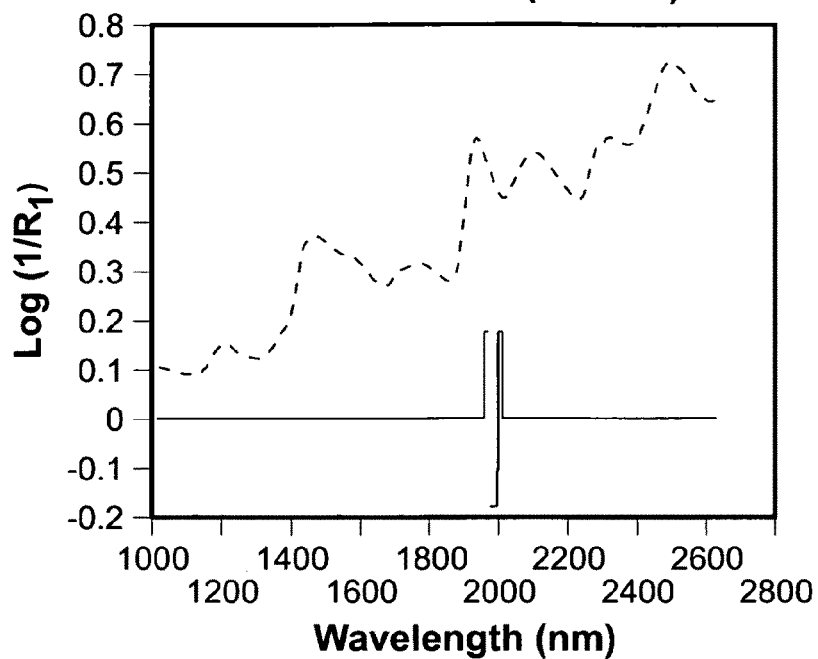
Figure 42:
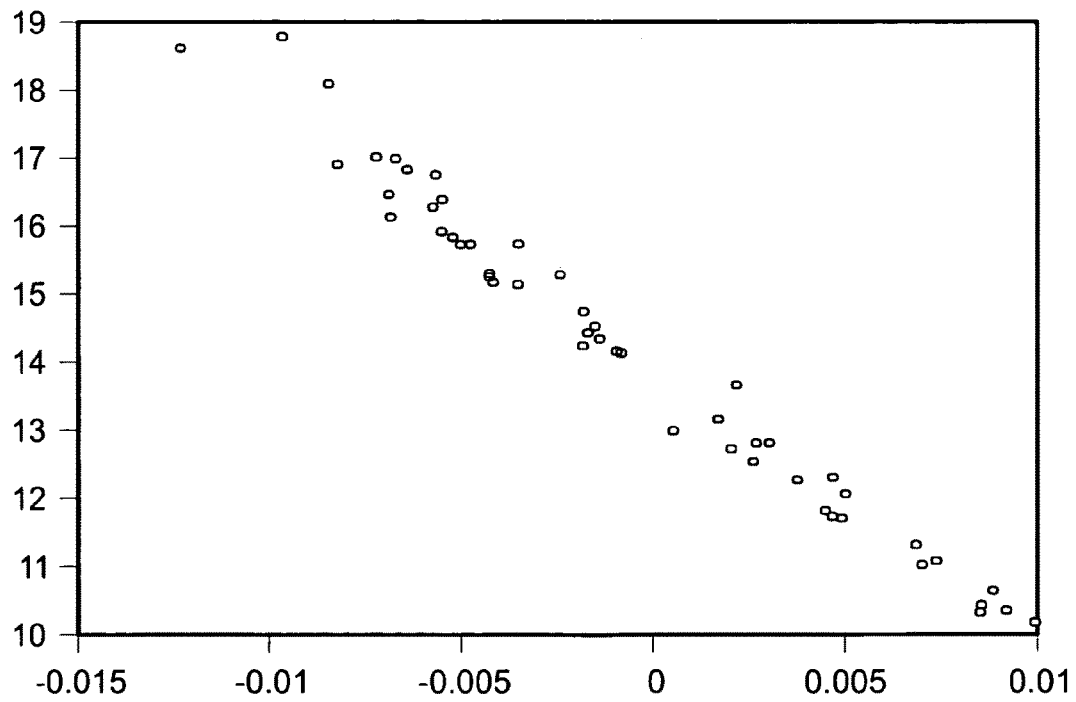
FIG. 42 is a scatter plot of protein content (test data) vs. correlation with top wavelet packet.

FIGS. 41-1 and 41-2 illustrate the top 10 wavelet packets in local regression basis selected using 50 training samples. Each Walsh packet provides a measurement useful for estimation. For example, the top line indicates that by combining the two narrow bands at the ends and then subtracting the middle band we get a quantity which is linearly related to the protein concentration. FIG. 42 is a scatter plot of protein content (test data) vs. correlation with top wavelet packet. This illustrates a simple mechanism to directly measure relative concentration of desired ingredients of a mixture.

It will be appreciated that in this case one could use an LED-based flashlight illuminating in the three bands with a modulated light, which is then imaged with a CCD video camera that converts any group of consecutive three images into an image of protein concentration. Another implementation is to replace the RGB filters on a video camera by three filters corresponding to the protein bands, to be displayed after subtraction as false RGB. Various other alternative exist and will be appreciated by those of skill in the art.

Figure 43:
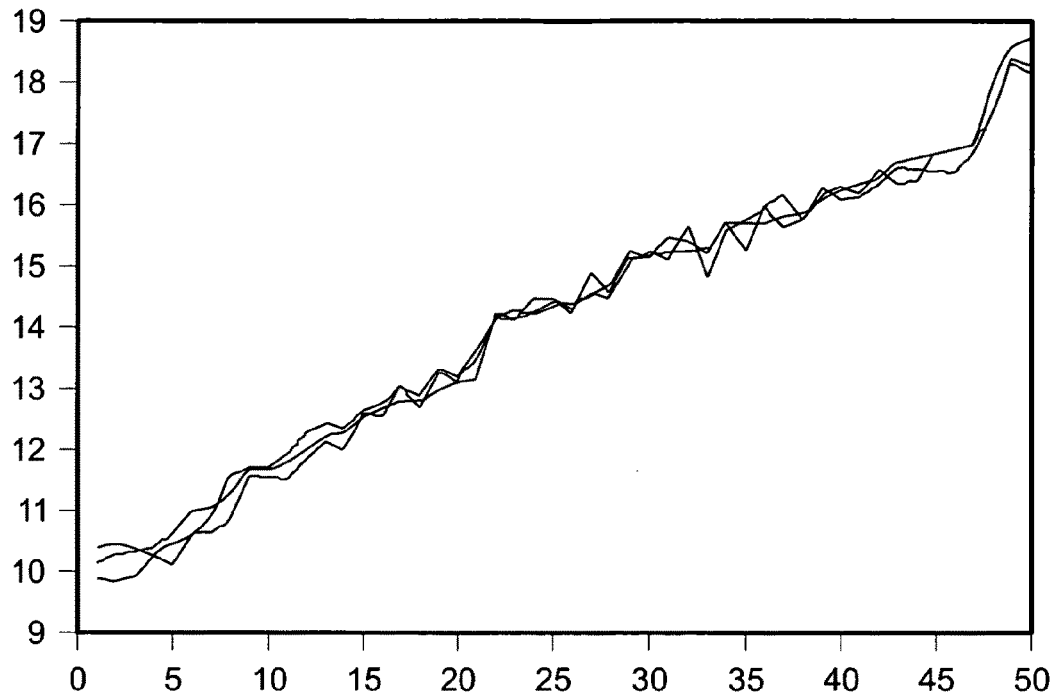
FIG. 43 illustrates PLS regression of protein content of test data.
Figure 43A:
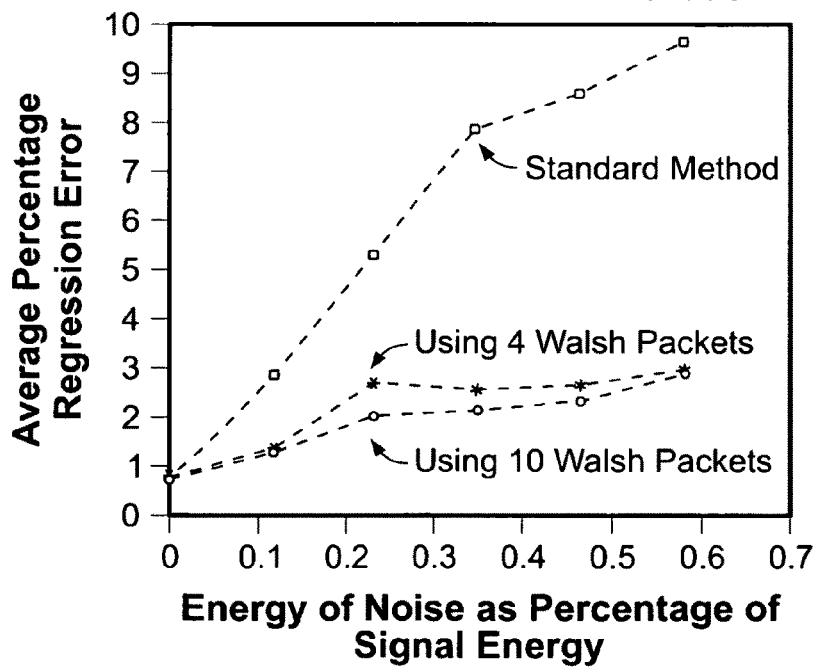

FIG. 43 illustrates PLS regression of protein content of test data: using top 10 wavelet packets (in green—1.87% error, from 6 LVs) and top 100 (in red—1.54% error from 2 LVs)—compare with error of 1.62% from 14 LVs using all original data. This graph compares the performance of the simple method described above to the true concentration values.

Figure 44:
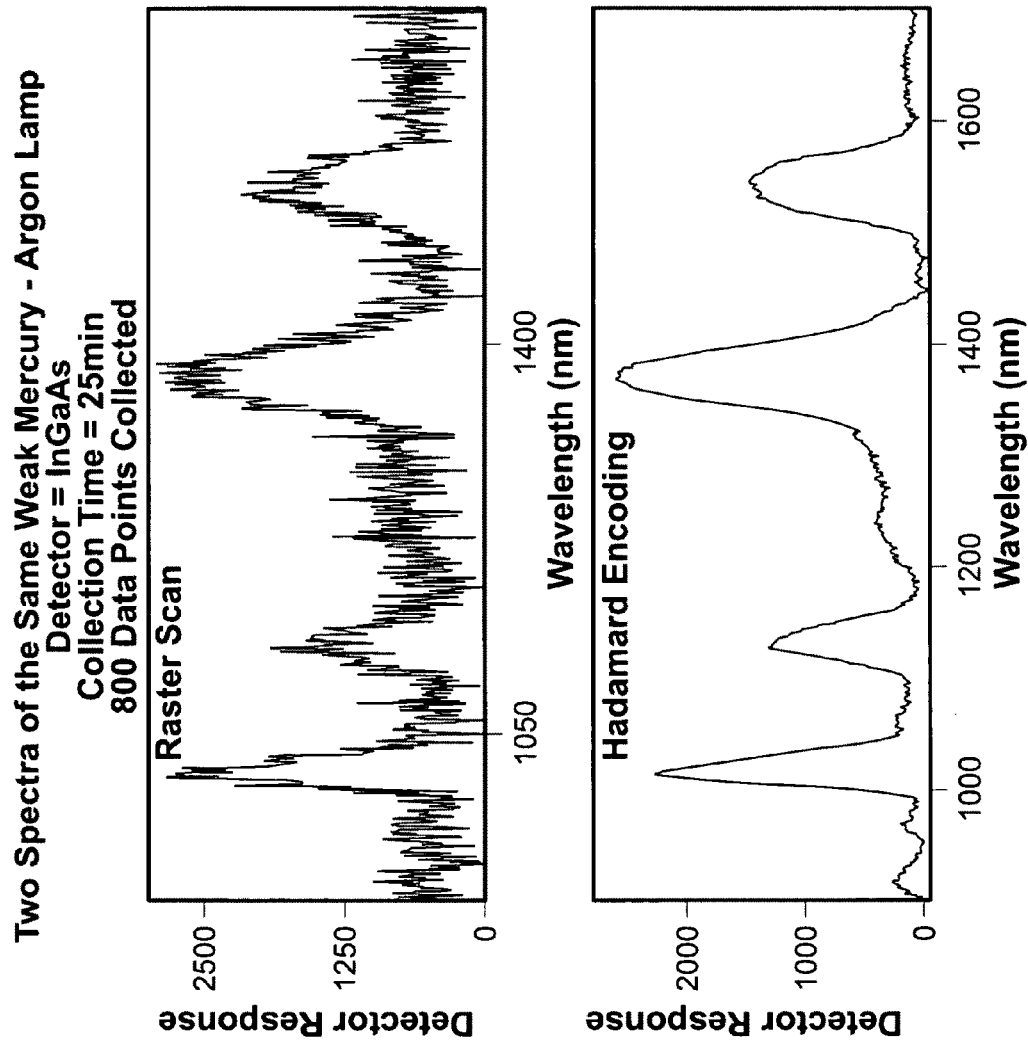
FIG. 44 illustrates the advantage of DNA-based Hadamard Spectroscopy used in accordance with the present invention over the regular raster scan.
Figure 45:
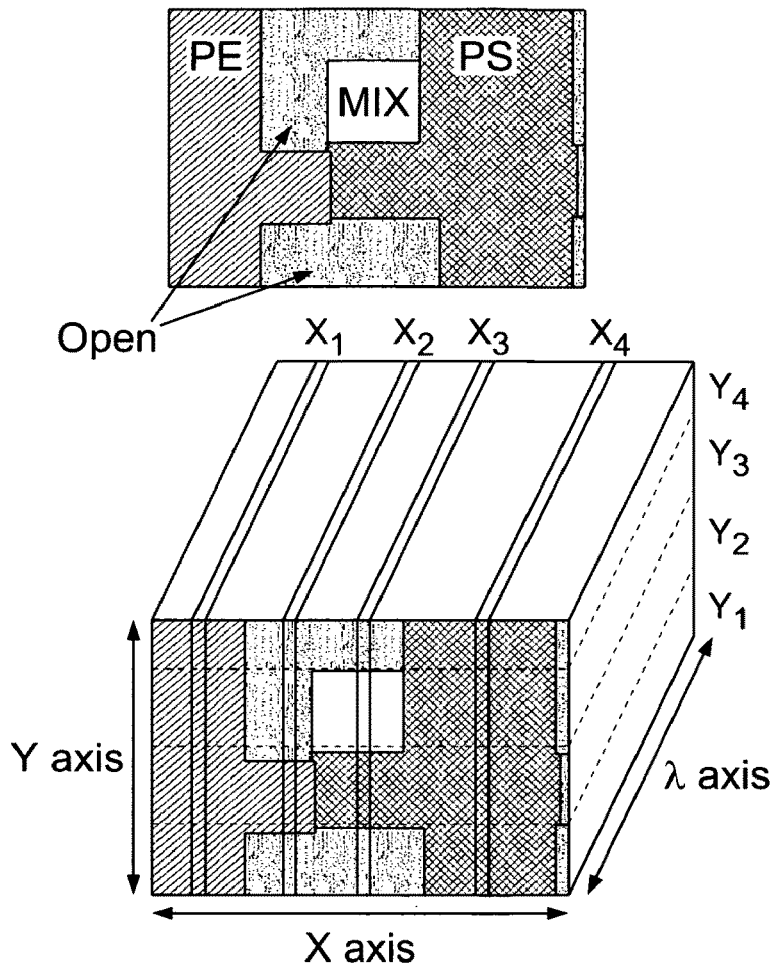
FIGS. 45-49(A-D) illustrate hyperspectral processing in accordance with the present invention.
Figure 46:
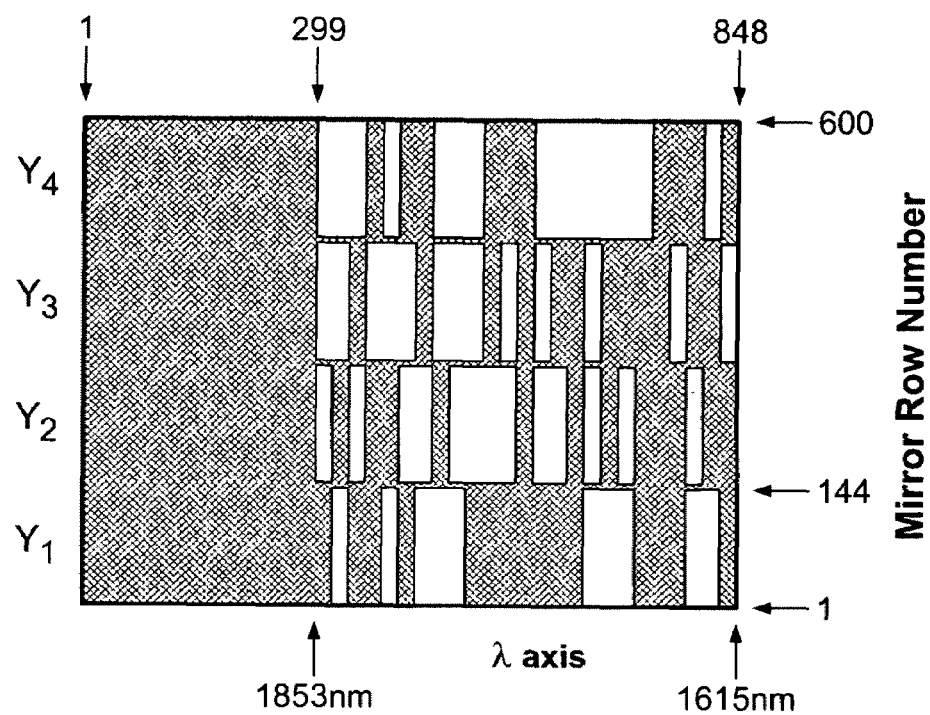
Figure 47:
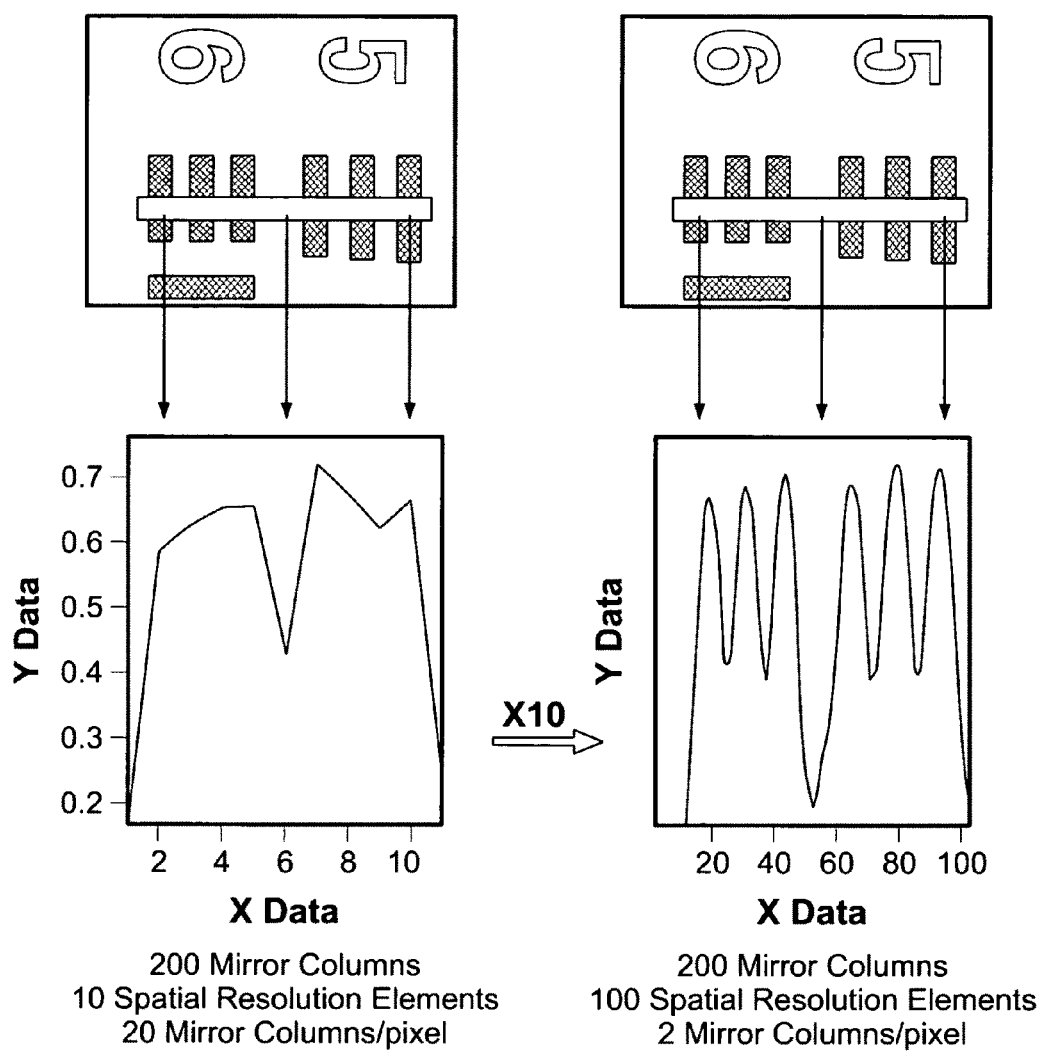
Figure 48:
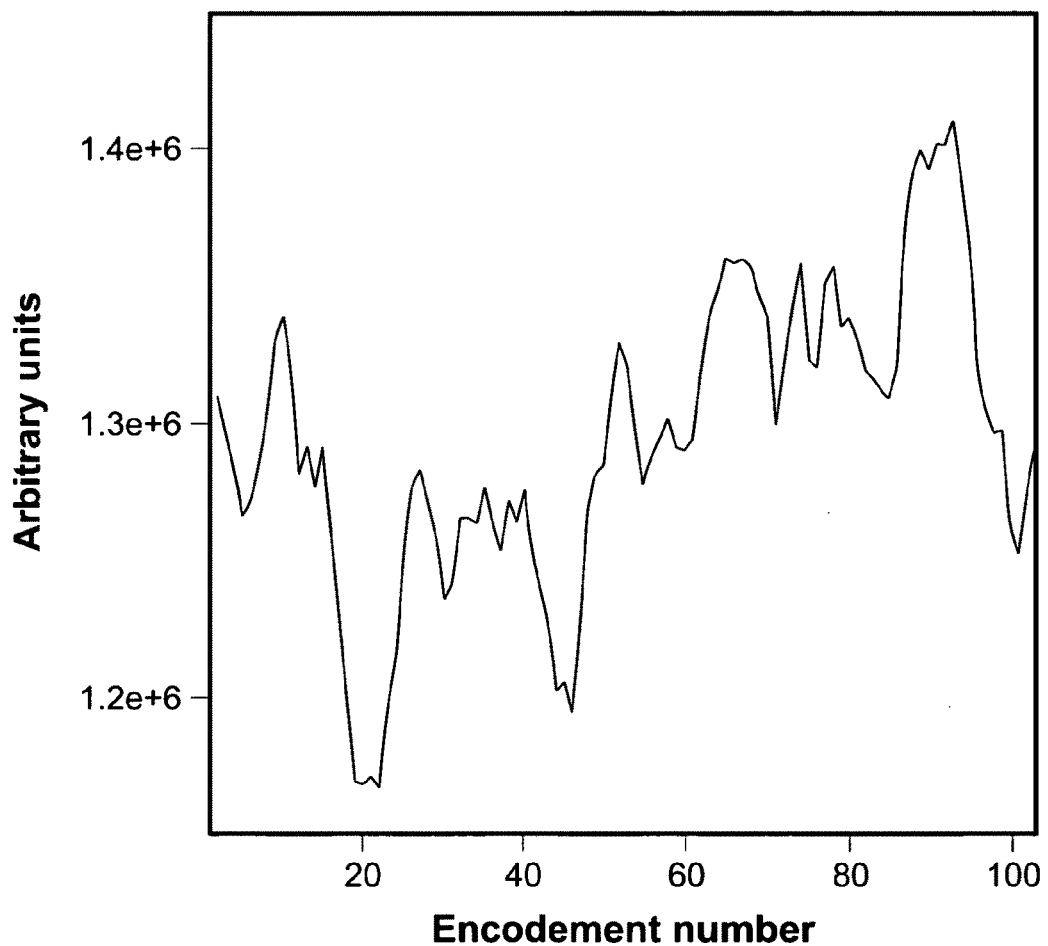
Figure 49A:
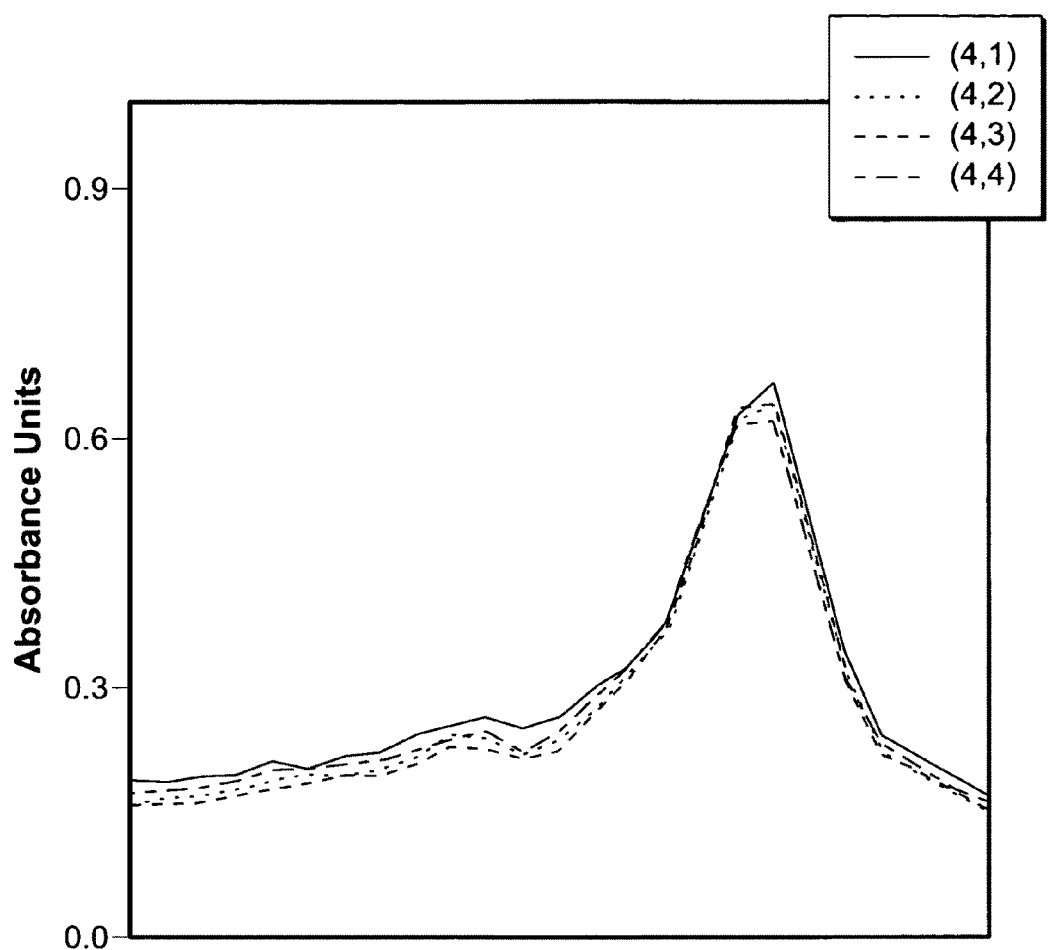
Figure 49B:
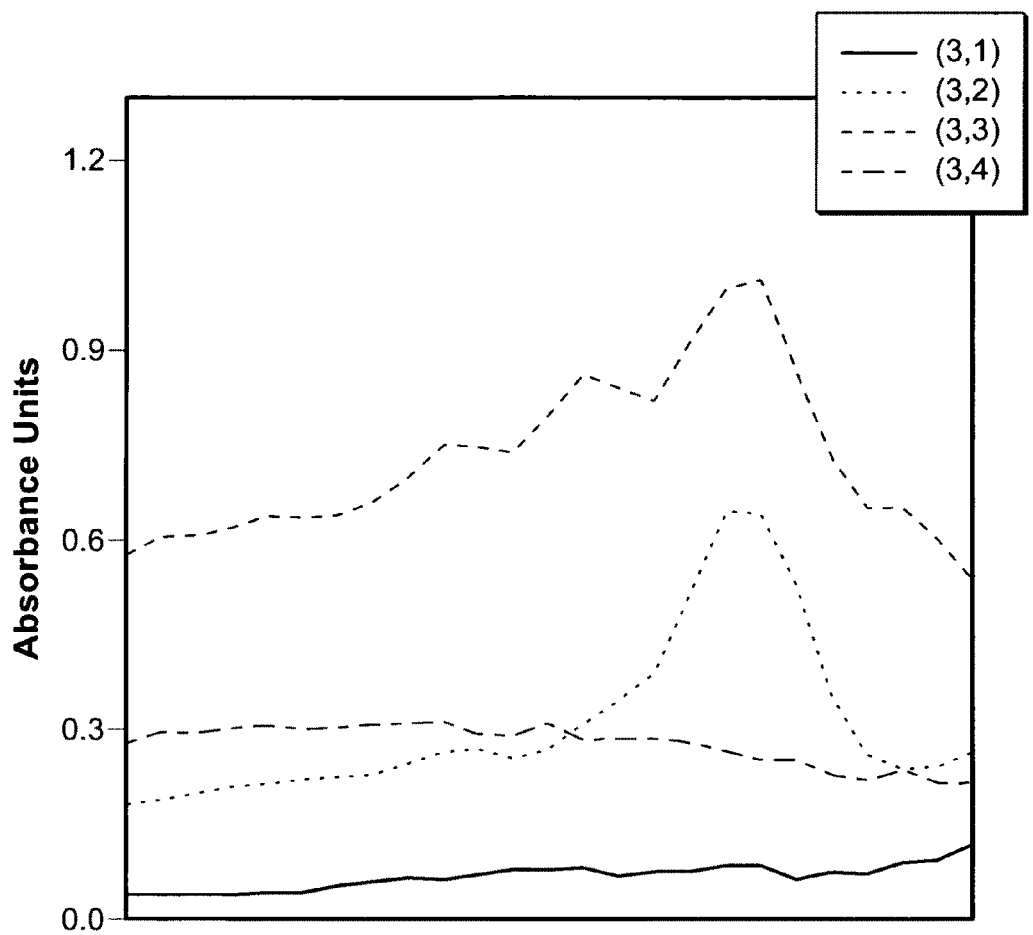
Figure 49C:
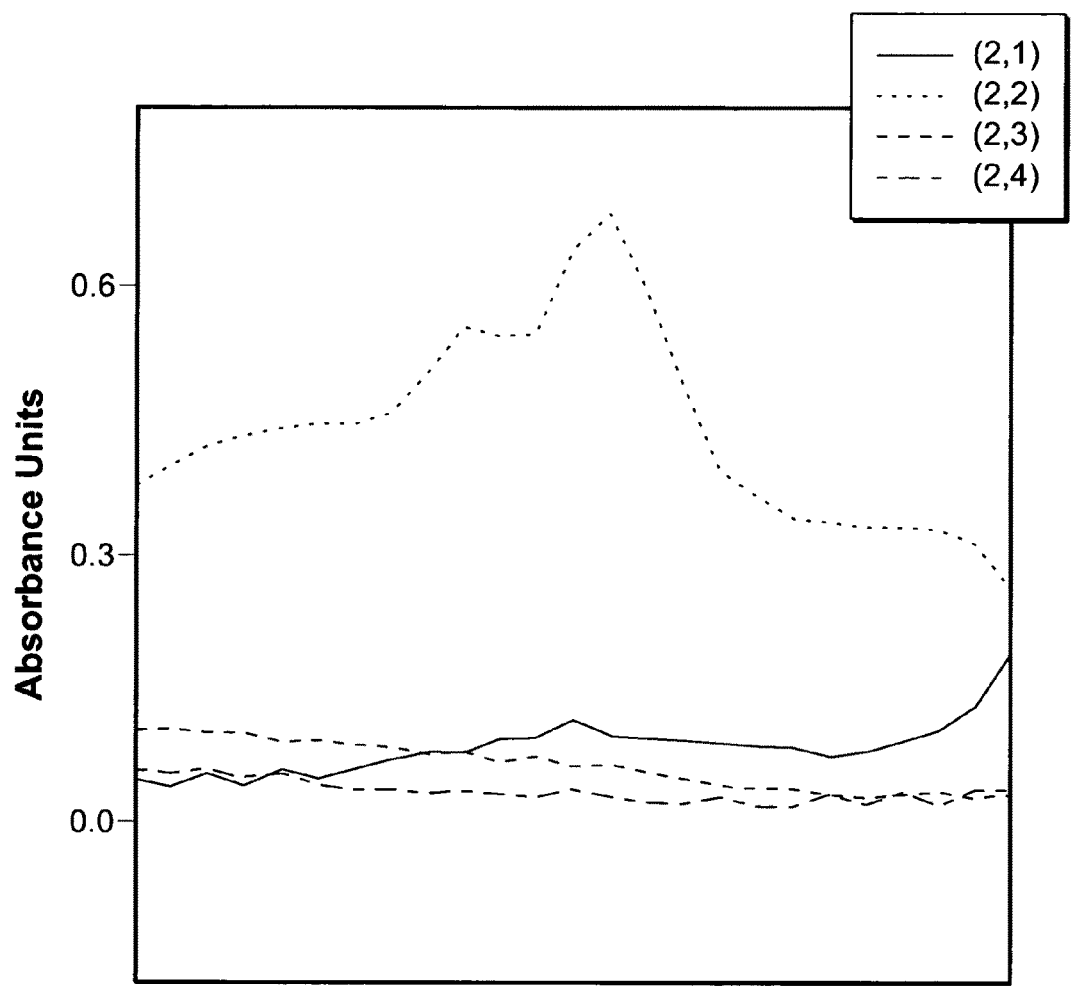
Figure 49D:
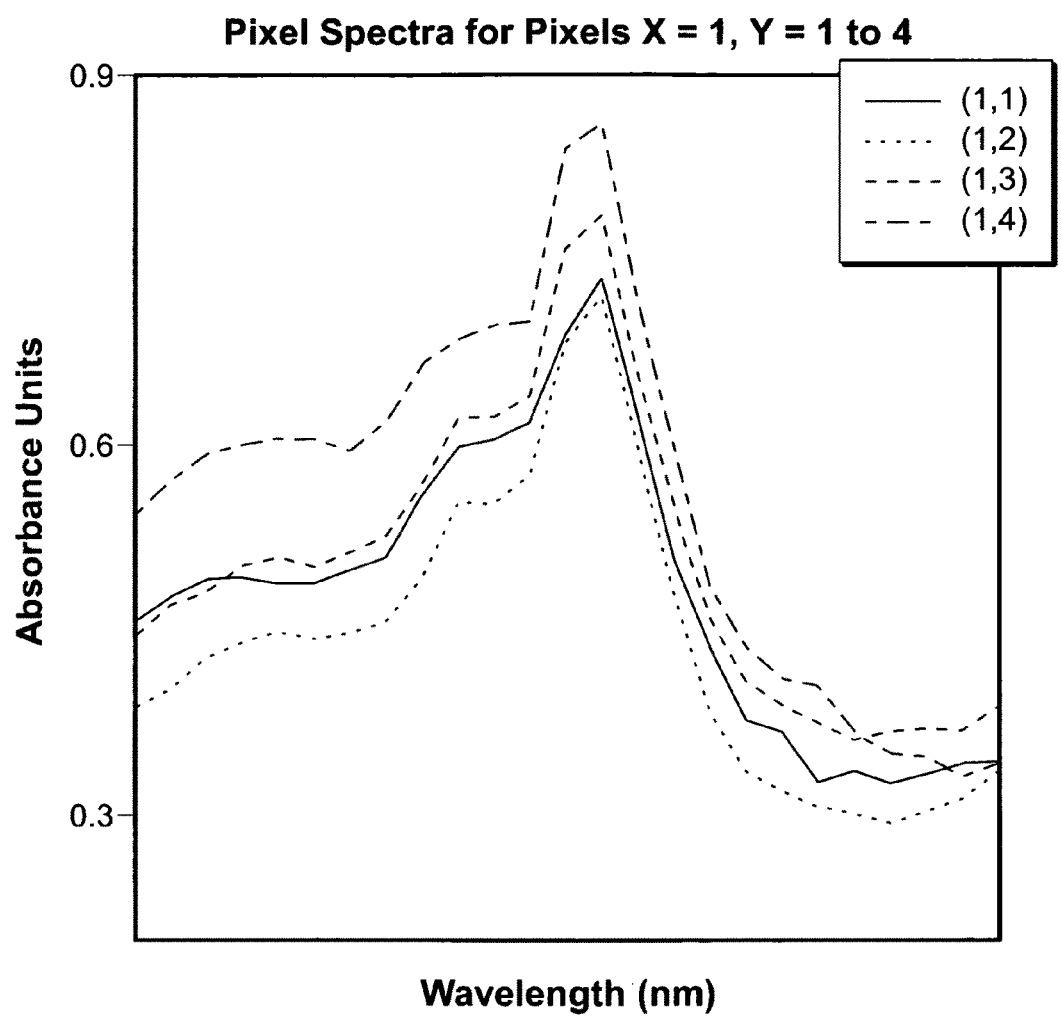

FIG. 44 illustrates the advantage of DNA-based Hadamard Spectroscopy in terms of visible improvement in the SNR of the signal for the Hadamard Encoding over the regular raster scan.

It will be appreciated that the above approach can be generalized to a method of detecting a chemical compound with known absorption lines. In particular, a simple detection mechanism for compounds with known absorption is to use an active illumination system that transmits light (radiation) only in areas of the absorption spectrum of the compound. The resulting reflected light will be weakest where the compound is present, resulting in dark shadows in the image (after processing away ambient light by, for example, subtracting the image before illumination). Clearly, this approach can be used to dynamically track objects in a video scene. For example, a red ball could be tracked in a video sequence having many other red objects, simply by characterizing the red signature of the ball, and tuning the illumination to it, or by processing the refined color discrimination. Clearly this capability is useful for interactive TV or video-gaming, machine vision, medical diagnostics, or other related applications. Naturally, similar processing can be applied in the infrared range (or UV) to be combined with infrared cameras to obtain a broad variety of color night vision or (heat vision), tuned to specific imaging tasks. To encode the received spatial radiation components one can use pulse code modulation (PCM), pulse width modulation (PWM), time division multiplexing (TDM) and any other modulation technique that has the property of identifying specific elements of a complex signal or image.

In accordance with the invention, in particular applications one can rapidly switch between the tuned light and its complement, arranging that the difference will display the analate of interest with the highest contrast. In addition, it is noted that the analate of interest will flicker, enabling detection by the eye. Applications of this approach in cancer detection in vivo, on operating table, can easily be foreseen.

Another straightforward extension of the present invention is method for initiating select chemical reactions using a tunable light source. In accordance with this aspect, the tunable light source of this invention can be tuned to the absorption profile of a compound that is activated by absorbing energy, to achieve curing, drying, heating, cooking of specific compounds in a mixture. Applications further include photodynamic therapy, such as used in jaundice treatment, chemotherapy, and others.

Yet another application is a method for conducting spectroscopy with determining the contribution of individual radiation components from multiplexed measurements of encoded spatio-spectral components. In particular a multiplicity of coded light in the UV band could be used to cause fluorescence of biological materials, the fluorescent effect can be analyzed to relate to the specific coded UV frequency allowing a multiplicity of measurements to occur in a multiplexed form. An illumination spectrum can be designed to dynamically stimulate the material to produce a detectable characteristic signature, including fluorescence effects and multiple fluorescent effects, as well as Raman and polarization effects. Shining UV light in various selected wavelengths is known to provoke characteristic fluorescence, which when spectrally analyzed can be used to discriminate between various categories of living or dead cells.

Another application of the system and method of this invention is the use of the OSPU as a correlator or mask in an optical computation device. For example, an SLM, such as DMA can act as a spatial filter or mask placed at the focal length of a lens or set of lenses. As illustrated above, the SLM can be configured to reject specific spatial resolution elements, so that the subsequent image has properties that are consistent with the spatial filtering in Fourier space. It will be apparent that the transform of the image by optical means is spatially effected, and that the spatial resolution of images produced in this manner can be altered in any desired way.

Yet another area of use is performing certain signal processing functions in analog domain. For example, spatial processing with a DMA can be achieved directly in order to acquire various combinations of spatial patterns. Thus, an array of mirrors can be arranged to have all mirrors of the center of the image point to one detector, while all the periphery goes to the other. Another useful arrangement designed to detect vertical edges will raster scan a group of, for example, 2×2 mirrors pointing left combined with an adjacent group of 2×2 mirrors pointing right. This corresponds to a convolution of the image with an edge detector. The ability to design filters made out of patterns of 0, 1, −1 i.e., mirror configurations, will enable the imaging device to only measure those features which are most useful for display, discrimination or identification of spatial patterns.

The design of filters can be done empirically by using the automatic best basis algorithms for discrimination, discussed above, which is achieved by collecting data for a class of objects needing detection, and processing all filters in the Walsh Hadamard Library of wavelet packets for optimal discrimination value. The offline default filters can then be upgraded online in real-time to adapt to filed conditions and local clutter and interferences.

Figure 50:
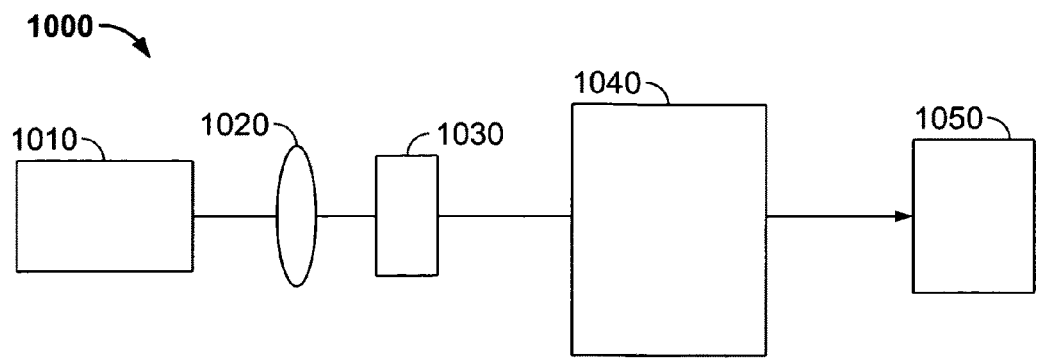
FIG. 50 is a block diagram of an exemplary NSTIS in accordance with an embodiment of the present invention.

Turning now to FIG. 50, there is shown a block diagram of a near-infrared spectral target identification system (NSTIS) 1000 in accordance with an embodiment of the present invention. Light from a scene 1010 is imaged through fore optics 1020 and onto a spatial light modulator, such as a DMD 1030. This imaging can be accomplished, for example, using an ordinary camera lens. The light from the DMD 1030 is then sent through an imaging spectrograph 1040 which has been modified to have its slit removed and disposed such that the DMD 1030 sits in the plane in which the slit previously sat. The output light of the imaging spectrograph 1040 is then sent, in the usual manner, onto a camera 1050.

The NSTIS system 1000 collects data by sequentially rendering a sequence of coded patterns on the DMD 1030, and, for each pattern, grabbing a frame of data from the camera 1050. In accordance with an aspect of the present invention, the coded patterns on the DMD 1030 consists of a series of binary images, each with a single column of mirrors in the "on" position, and all other mirrors in the "off" position. The on-column is moved across the DMD 1030 (e.g., from left to right). In so doing, the scene 1010 is scanned. At each fixed position of the on-column, the system 1000 behaves like an ordinary imaging spectrograph with slit position corresponding to the location of the on-row. As the row is scanned across the image of the scene 1010, a spectrograph image is captured, one for each position of the "virtual slit". In this manner, the entire scene 1010 is scanned without the need for macro-moving parts.

In accordance with an embodiment of the present invention, instead of rendering a series of virtual slit images, a series of encodements, such as a series of Hadamard patterns, are rendered. For example, a Hadamard pattern of columns can be rendered. That is, in contrast to turning the rows "on" one at a time for a total of N images, (N+1)/2 rows are turned "on" at a time in N different ways to collect N images. The selection of which (N+1)/2 rows to turn "on" is dictated by a Hadamard code of length N. In this manner, a Hadamard encoded dataset is collected. It is appreciated that this encoded dataset is the Hadamard transform of the dataset collected with respect to the "virtual slit" embodiment discussed in the previous paragraph. Hence, an inverse Hadamard transform is only necessary to produce essentially the same data as the "virtual slit embodiment, ignoring system response and signal-to-noise-ratio (SNR) issues. Although these are typically important issues, and the Hadamard multiplexed use generally provides many advantages noted herein.

Figure 59:
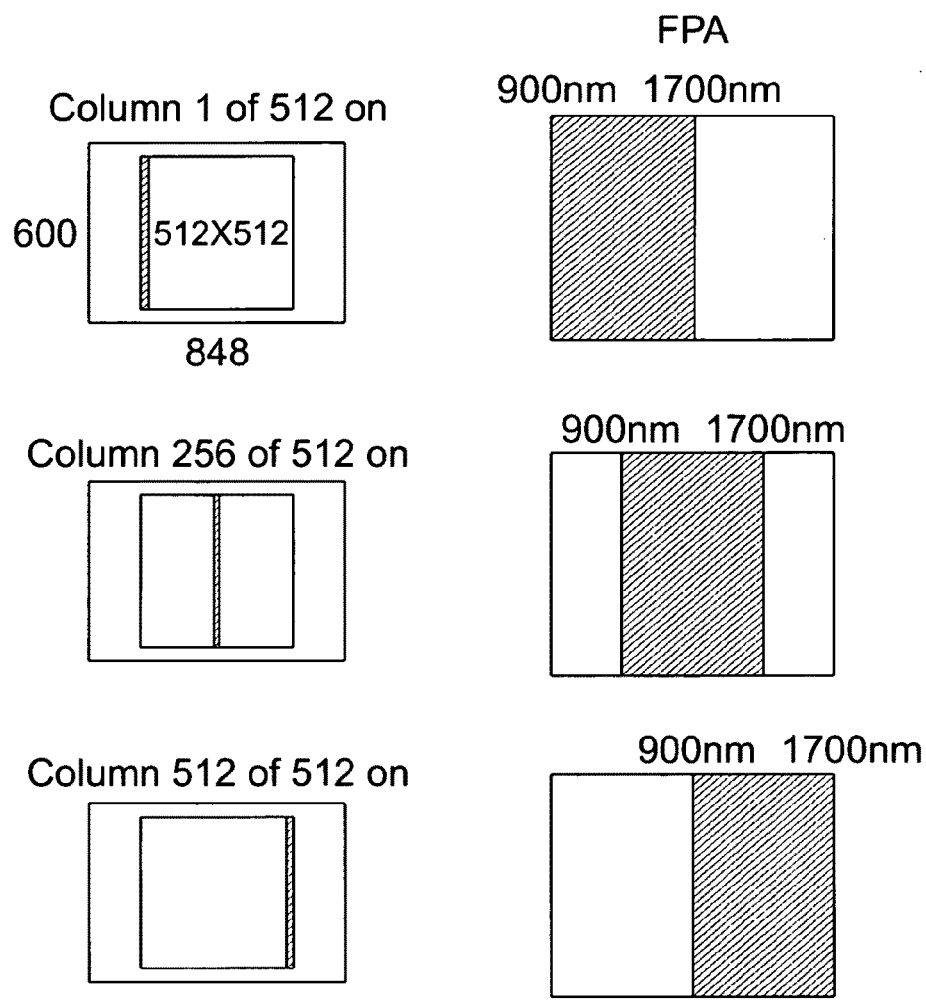
FIG. 59 is an example of the mapping of micro-mirror columns to the dispersed spectral images at the focal plane of a 2D array sensor, FPA or camera in accordance with an embodiment of the present invention.
Figure 60:
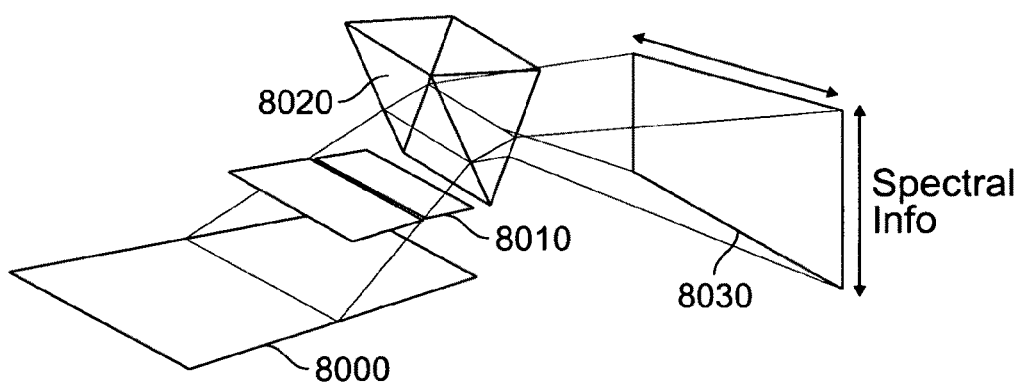
FIG. 60 illustrates a conventional pushbroom spectral imaging spectral system.

Returning to the discussion about scanning of single virtual slits across an image. FIG. 59 demonstrates that as the virtual slit is scanned across the input image, the dispersed light from the spectrograph portion 1040 of the system 1000 moves by a corresponding amount across the output image. Depending on the magnification factor of the system 1000, a shift of one pixel on the DMD 1030 can correspond to a shift of other than one pixel in the output image. In accordance with an aspect of the present invention, a magnification factor of less than 1 can be selected and used, so that the mirrors of the DMD 1030 sub-modulate the pixels of the camera 1050, thus increasing the system resolution.

FIG. 59 is an example of a mapping of micro-mirror columns to the dispersed spectral images at the focal plane of a 2D array sensor, focal plane array (FPA) or camera in accordance with an embodiment of the present invention. That is, a map of DMD SLM micro-mirrors to the FPA is depicted in FIG. 59. The DMD micro-mirror representation is shown on the left column of FIG. 59. The corresponding spectrally dispersed images of the micro-mirror column are shown as a shaded block at the representative FPA on the right column of FIG. 59. As the column of micro-mirrors that are selected to be in the "on" condition moves from left to right, the spectrally dispersed images of the column move from left to right on the FPA for a given spectral range of operation. A multitude of columns can be simultaneously selected which has the effect of presenting a multitude of overlapping spectral images onto the FPA (multiplexing).

It is appreciated that the data collected by the hyper-spectral imaging system of the present invention results in a skewed datacube. That is, if one imagines the image frames collected as being stacked directly on top of each other, then the active area of data collected in the images forms a skewed parallelepiped within a solid rectangle corresponding to the image stack. In order to create a traditional datacube, with two spatial dimensions and one spectral dimension, this data must be deskewed. This can be accomplished by simply shifting each successive image by one more pixel than the previous image, and selecting a portion of the shifted image corresponding to the active data area, for example see FIG. 59. When the system magnification factor is such that a shift of one pixel on the DMD 1030 corresponds to other than a shift of one pixel on the camera 1050, interpolation schemes known to those of ordinary skill in the art can be employed to correct for the non-integer shift.

The digital micro-mirror device (DMD) spatial light modulator (SLM) presents a challenge in that typical imaging optics have image planes that are perpendicular to the optical propagation axis Z. When the object is imaged by these conventional optical imaging systems onto the DMD 1030, the image becomes an object for the imaging spectrograph and the DMD 1030 can selectively relay spatial resolution elements of this object-image onto the imaging spectrograph portion 1040 of the system 1000. However, this requires special optical systems capable of handling the tilted object. Furthermore the resultant image itself is tilted. Generally speaking, this results in poor optical performance for imaging systems and typical imaging systems cannot cope with such condition at low F numbers of operation.

Figure 51:
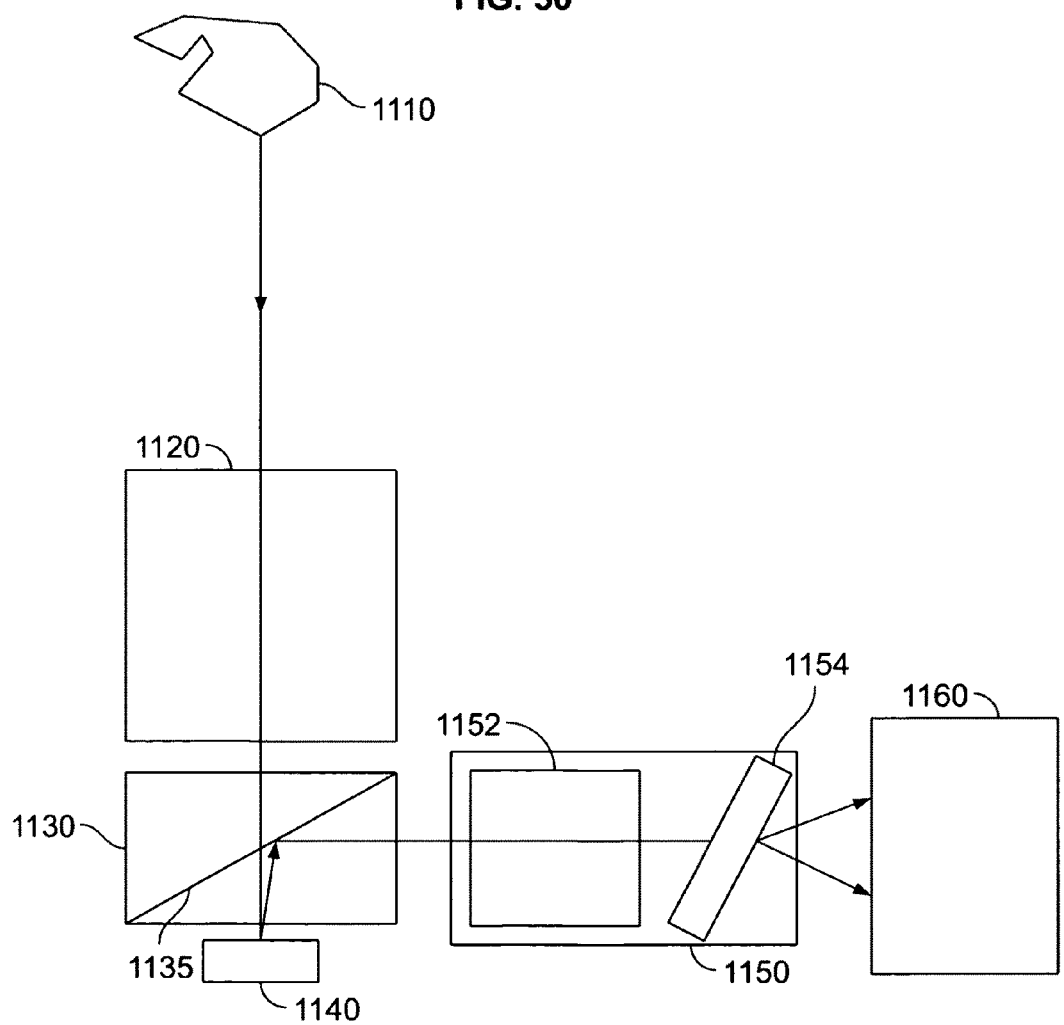
FIG. 51 illustrates an example of the tilted object plane imaged onto a resultant tilted image plane using a simple image relay lens system in accordance with an embodiment of the present invention.

FIG. 51 shows an example of the tilted object plane imaged onto a resultant tilted image plane using a simple image relay lens system 1100. Light from a scene 1110 is imaged through a fore optic or objective lens 1120 and through a TIR prism 1130 such that the light passes through the internal face 1135 of the TIR prism 1130, and onto a DMD 1140. The system 1100 is disposed such that light from the "on" mirrors of the DMD 1140 bounce off of the face 1135 and onto the imaging spectrograph 1150. Whereas light from the "off" mirrors of the DMD 1140 pass through the face 1135 and do not propagate further through the system 1100 and onto the imaging spectrograph 1150. The imaging spectrograph 1150 includes a relay lens 1152 and a dispersion device 1154, such that the light from the "on" mirrors of the DMD 1140 goes to the relay lens 1152 and then onto the dispersion device 1154. The dispersion device 1154 then disperses the light across a focal plane array 1160. The operation of the relay lens system 1100 is not described herein because its operation is similar to the NSTIS 1000 of FIG. 50.

Figure 52:
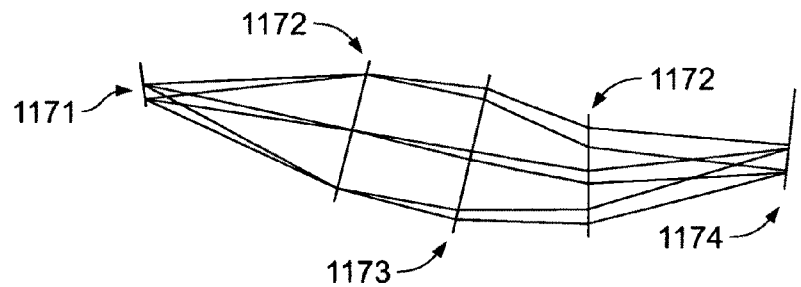
FIG. 52 illustrates an example of an asymmetric imaging relay spectrograph in accordance with an embodiment of the present invention using simulated DMD tilted object, two paraxial lenses, a grating and a tilted FPA at the image plane.

Turning now to FIG. 52, there is illustrated an model of a representative tilted plane imaging spectrograph system in accordance with an embodiment of the present invention. The source image is collimated and re-imaged without magnification after dispersion by a set of paraxial lens systems. The figure illustrates an example of an asymmetric imaging relay spectrograph in accordance with an embodiment of the present invention using simulated DMD tilted object 1171, two paraxial lenses 1172, a grating 1173 and a tilted FPA at the image plane 1174.

Figure 53:
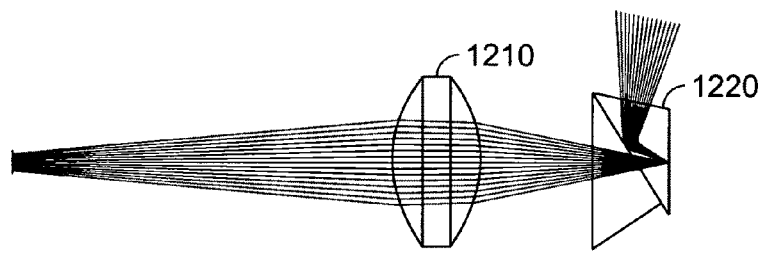
FIG. 53 illustrates an imaging lens and TIR prism example for improving F numbers of operation using the DMD as an SLM in accordance with an embodiment of the present invention.

A model of a lens 1210 imaging a source onto the DMD SLM through a Near Infrared optimized total internal reflection (TIR) prism assembly 1220 in accordance with an embodiment of the present invention is shown in FIG. 53. The imaging lens 1210 and the TIR prism assembly 1220 improves the F numbers of operation by sung the DMD as an SLM to select spatial resolution elements of an image to pass to subsequent optical elements of the imaging or spectral imaging system. That is, the prism assembly 1220 functions to reduce effective F numbers of operation by creating a greater path divergence of the incoming and outgoing beam of light. The prism assembly 1220 can be so constructed that it functions to separate both the "on" deflected light (+10 degree mirror position) and the "off" light (−10 degree mirror positions). FIG. 52 shows only the "on" or (+10) degree position of the mirrors so as to direct the light to the subsequent optical system such as the imaging spectrograph.

Figure 54:
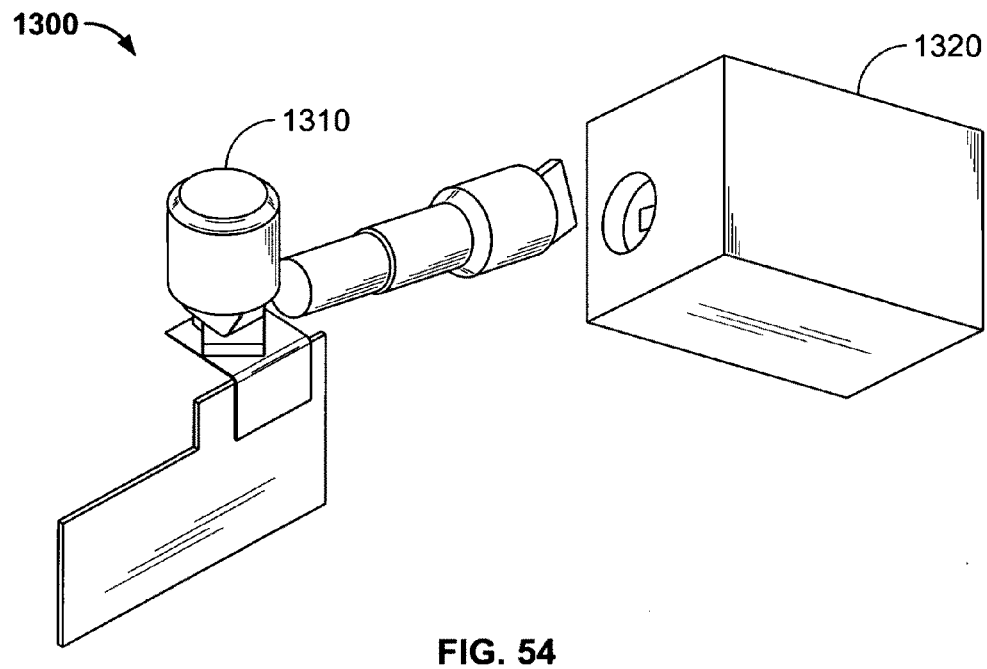
FIG. 54 illustrates a schematic diagram of the hyper-spectral imaging system in accordance embodiment of the present invention.

In accordance with an embodiment of the present invention, a DMD enabled spectral imaging system 1300 is shown in FIG. 54. The system 1300 uses a typical imaging lens 1310 to present an image of the object under observation to the DMD SLM through a near-infrared (NIR) TIR prism assembly. The spatial resolution elements are selected to pass onto the relay lens system and transmission diffraction grating, and presented to the camera 2D sensor array or focal plane array (FPA). The camera lens or imaging lens receives light from the source object and re-images the object onto the DMD where the plane of micro-mirrors are surface normal to the optical propagation axis Z. The DMD can then be used to select which spatial resolution elements of the image will propagate through the TIR prism and into the relay lens, through the transmission grating and spectrally imaged onto the camera sensor or focal plane array (FPA).

In accordance with an aspect of the present invention, the system 1300 can comprises two lens sets that are used in conjugate positions such that the first lens set collimates the light from the DMD SLM to the diffraction optical element and the second lens focuses the dispersed light onto the FPA. The lenses can be either refractive elements or reflective optical systems.

Figure 55:
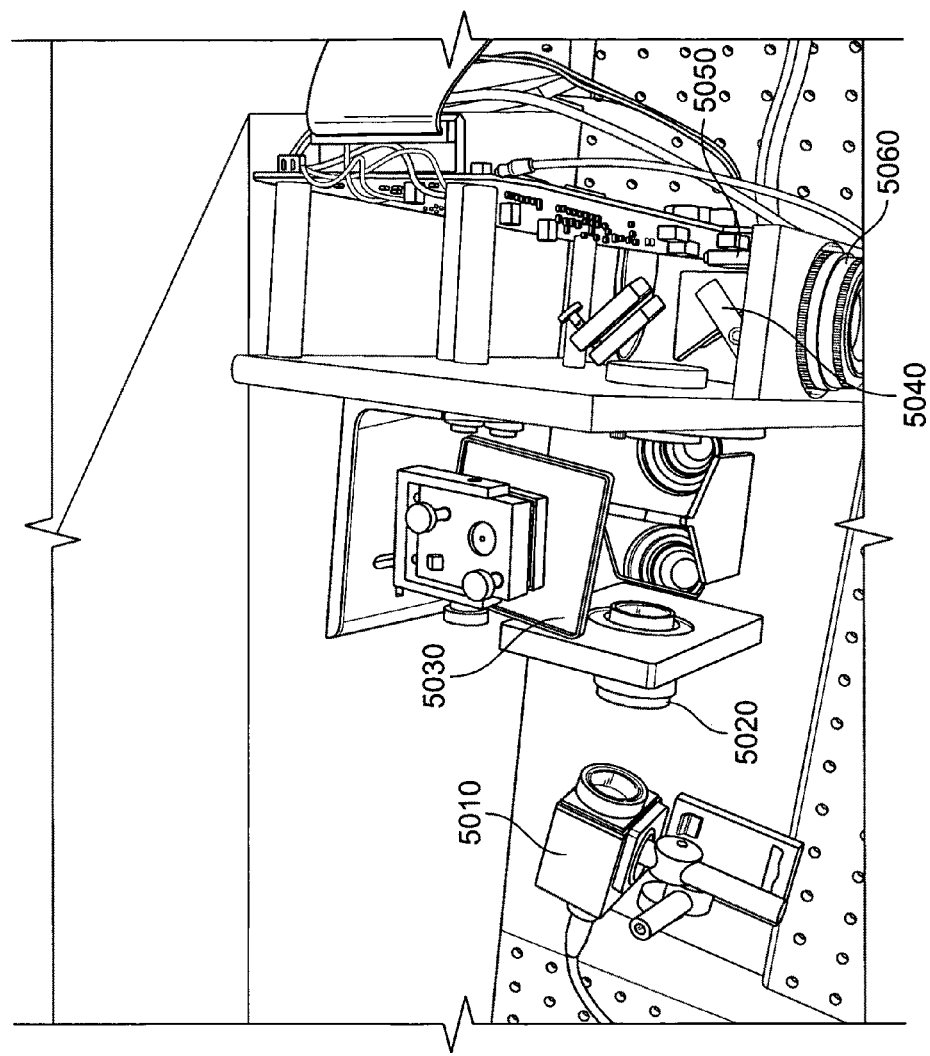
FIG. 55 is an exemplary hyper-spectral imaging system in accordance with an embodiment of the present invention.

Turning now to FIG. 55, there is a photograph of a prototype of a hyper-spectral imaging system in accordance with an embodiment of the present invention. The photograph shows an embodiment in which light from a scene of interest is imaged by an imaging optic 5060, through a TIR prism assembly 5040, onto a DMD 5050, back through the TIR prism assembly 5040, and sent onto and off of a grating 5030 through a series of transfer optics 5020. The resulting spatiospectral image is sent to and captured by a camera 5010.

In accordance with an embodiment of the present invention, the hyper-spectral imaging system utilizes all reflective optical components such that the system is not limited by the spectral range of transmission of the refractive elements. The utilization of all reflective optical elements also permit chromatic error free operation. In accordance with an aspect of the present invention, the hyper-spectral imaging system utilizes a special optical relay system developed by Plain Sight Systems (PSS) to place the image onto the DMD in a manner where the image plane that is perpendicular to the optical propagation axis Z is made tilted for presentation to the DMD without a TIR prism assembly.

Figure 56:
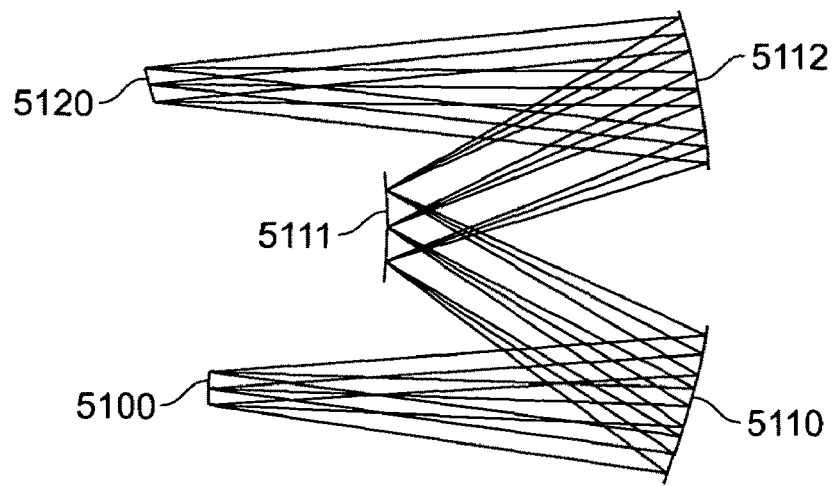
FIG. 56 depicts an optimized model of an all reflective image delivery system for a DMD enabled SLM spectral imaging system or imaging system in accordance with an embodiment of the present invention.

An optimized model of an all reflective image delivery system for a DMD enabled SLM spectral imaging system or imaging system in accordance with an embodiment of the present invention is shown in FIG. 56. The object 5100 to be imaged onto the DMD is shown at the bottom of the image perpendicular to the optical propagation axis. The design and placement of the relay optical system presents a tilted image 5120 appropriate for presentation to the DMD SLM such that the subsequent spatial resolution elements so selected propagate perpendicular the DMD micro-mirror plane. This allows conventional optical systems to be employed subsequently to the DMD such that image quality is maintained to a high degree of coherence and performance.

The optimized all reflective model takes an object plane and presents a tilted image at the correct angle to the DMD so as to allow the use of typical optical sub-systems to receive the spatial resolution elements that are selected to propagate through the system in a conventional manner. This is important because most spectral imaging systems are very sensitive to the degree of collimation for resolution elements impinging upon a diffraction element. If the DMD object that is a result of the primary object image is tilted, the conventional spectral imaging system has difficulty with spectrally re-imaging the primary object at the FPA. Beginning with an Offner Type 1:1 all spherical image relay system, one can begin to decenter and tilt the optical system such that the object plane of the relay is re-imaged at a tilt with respect to the optical axis of propagation. This can be accomplished by setting up an optical design merit function in a given optical design software program such that the system is perturbed in accordance with the figures of merit dictating the solution. Such solution, as embodied for example by reflective elements 5110, 5111, and 5112, being the optimization of a 20 degrees tilt corresponding to the angle required by the DMD to subsequently project the light from the object image on the DMD perpendicular to the plane of the image on the DMD.

Figure 57:
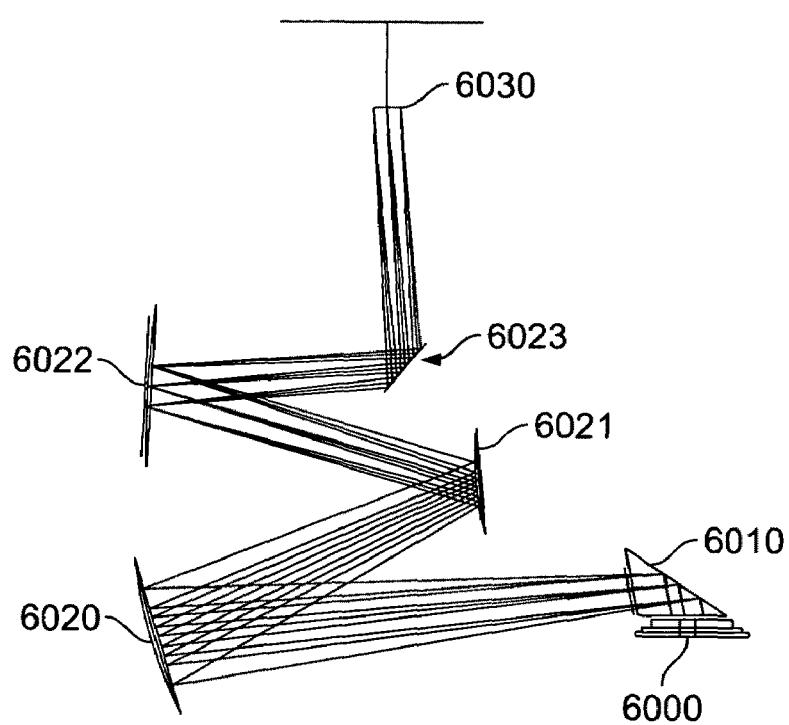
FIG. 57 illustrates an optical relay system in accordance with an embodiment of the present invention optimized for use with a TIR prism assembly and the DMD SLM.

FIG. 57 illustrates an optical relay system in accordance with an embodiment of the present invention optimized for use with a TIR prism assembly and the DMD SLM such that the tilted image presented to the DMD reflects selected resolution elements perpendicular to the micro-mirror array plane. This allows conventional optical systems such as refractive collimating lenses to be used. That is, FIG. 57 shows an extension of the system shown in FIG. 56 for use with a TIR prism assembly. In the subassembly shown in FIG. 57, light reflected off of the activated pixels of a DMD 6000, is sent through a TIR prism assembly 6010, onto a series of reflective lenses 6020, 6021, 6022, and then onto a fold mirror 6023, in order to produce an output image 6030 that is tilt corrected as disclosed herein.

Figure 58:
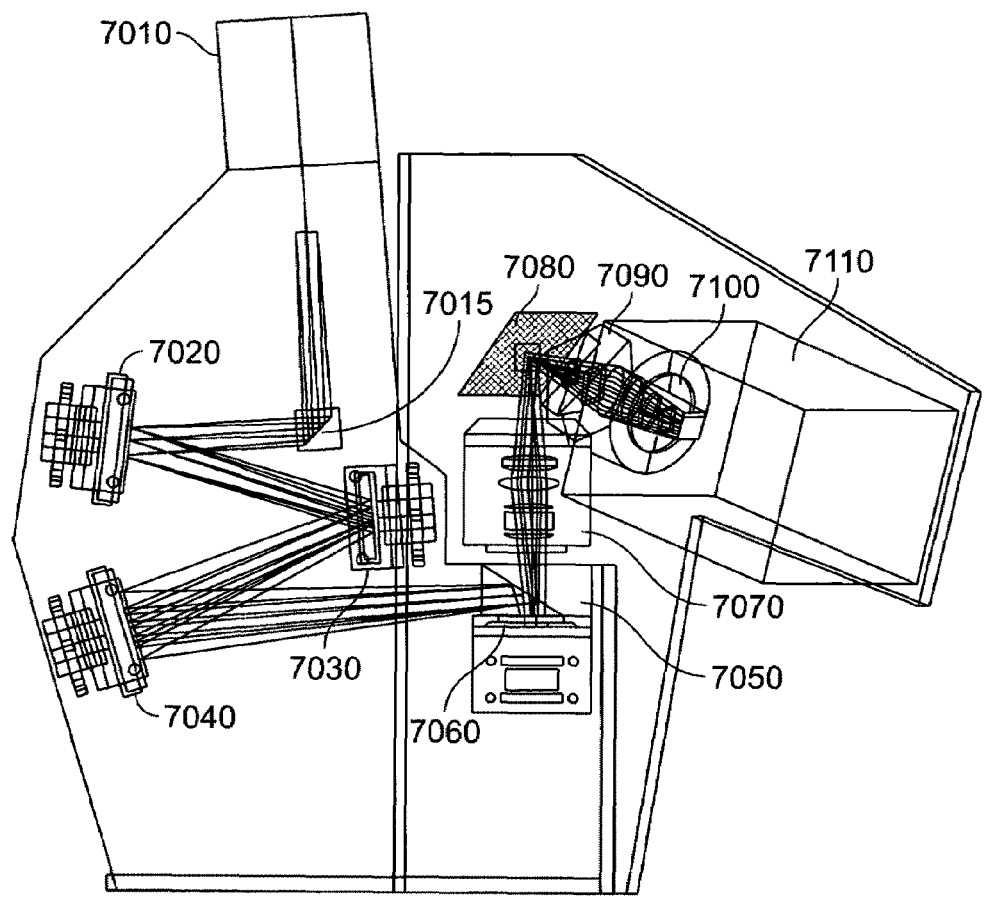
FIG. 58 illustrates a CAD drawing of NSTIS in accordance with an embodiment of the present invention.

FIG. 58 shows a CAD drawing of NSTIS in accordance with an embodiment of the present invention. The optical path is shown beginning at the upper left with a typical refractive camera lens system that places and image at the object plane of the custom designed flat to tilted image relay system. The image of the scene from the camera lens 7010 is folded by a flat mirror 7015 to a spherical collection mirror 7020 and onto spherical mirror 7030 and onto spherical mirror 7040 where the light is passed through a special total internal reflection prism designed for this application 7050 where the image is folded onto the DMD 7060. From the DMD 7060 the light propagates back through 7050 and is picked up by a camera lens 7070 where the rays are collimated onto a grating 7080 and subsequently re-imaged and demagnified by a camera lens 7090 and 7100 to focus onto the InGaAs focal plane 7110.

In the hyper-spectral imaging system of FIG. 58, a refractive camera lens receives the light from the source object and images it onto the object plane of the all reflective transfer optical system. The all reflective transfer optical system takes this conventional perpendicularly presented image with respect to the optical axis from the conventional camera lens system and presents it through the TIR prism to the DMD micro-mirror plane in a tilted fashion with respect to the optical axis such that the selected spatial resolution elements can propagate to the imaging spectrograph portion of the system. This condition allows more typical imaging optical systems to be used and improves the collimation of all of the desired spatial resolution elements used in the DMD SLM. Improving the collimation improves the effectiveness of the diffractive element and improves the subsequent image quality as it is focused by the focusing optical elements in the spectrograph portion of the system.

In accordance with an embodiment of the present invention, the system comprises software for acquisition of hyperspectral data, and a user interface for interactively selecting regions from a 2D projection of the 3D hyper-spectral datacube. Preferably, the system also comprises software for computing features of the selected regions, and display of the 3D datacube, project into 2D via the selected features. For example, the software of the system can compute the mean spectral vector in each region, and then compute a Gram Schmidt orthogonalization of the selected vectors. When there are 3 selected vectors, the output of the Gram Schmidt algorithm can be used to compute 3 spectral inner products over the datacube, and the results are used to render an RGB image of the datacube. The process can then be iterated, providing the user the ability to select regions in the original and the processed 2D projections.

In accordance with an embodiment of the present invention, the MEMS-adapted spectrograph imaging system is used in conjunction with the tunable light source. Light from the tuned light is used to illuminate a scene, sample, or one or more materials of interest. The light reflected, scattered and/or emitted from the sample or materials is imaged by the MEMS-adapted spectrograph imaging system, thereby performing fluoresence imaging without the need for excitation and emission filters.

While the foregoing has described and illustrated aspects of various embodiments of the present invention, those skilled in the art will recognize that alternative components and techniques, and/or combinations and permutations of the described components and techniques, can be substituted for, or added to, the embodiments described herein. It is intended, therefore, that the present invention not be defined by the specific embodiments described herein, but rather by the appended claims, which are intended to be construed in accordance with the well-settled principles of claim construction, including that: each claim should be given its broadest reasonable interpretation consistent with the specification; limitations should not be read from the specification or drawings into the claims; words in a claim should be given their plain, ordinary, and generic meaning, unless it is readily apparent from the specification that an unusual meaning was intended; an absence of the specific words "means for" connotes applicants' intent not to invoke 35 U.S.C. §112 (6) in construing the limitation; where the phrase "means for" precedes a data processing or manipulation "function," it is intended that the resulting means-plus-function element be construed to cover any, and all, computer implementation(s) of the recited "function"; a claim that contains more than one computer-implemented means-plus-function element should not be construed to require that each means-plus-function element must be a structurally distinct entity (such as a particular piece of hardware or block of code); rather, such claim should be construed merely to require that the overall combination of hardware/firmware/software which implements the invention must, as a whole, implement at least the function(s) called for by the claim's means-plus-function element(s).

We claim:

1. A hyper-spectral imaging system comprising:
   imaging foreoptics to focus on a scene or object of interest and transfer the image of said scene or object onto the focal plane of a spatial light modulator;
   a spatial light modulator placed at a focal plane of said imaging foreoptics;
   an imaging dispersion device disposed to receive an output image of said spatial light modulator; and
   an image collecting device disposed to receive the output of said imaging dispersion device.

2. The system of claim 1, wherein said image collecting device is a device from the set consisting of a CCD array camera, or a Focal Plane Array or camera.

3. The system of claim 1, wherein said spatial light modulator is a micro-mirror array, 2-D Liquid crystal array, or micro-shutter array.

4. The system of claim 1, wherein said spatial light modulator is capable of directing coded patterns of radiation in two or more distinct directions at least one of which leads into said imaging dispersion device.

5. The system of claim 1, wherein coded apertures controlled by the spatial light modulator consist of submodulated superpixels which focus on the pixels of the image collecting device consequently increasing its spatial resolution.

6. The system of claim 1, wherein the spatial light modulator is controlled to analyze only a subportion of the full image field of the system.

7. The system of claim 1, wherein the image collecting device is controlled to measure only a subportion of the full field of possibly impinging radiation.

8. The system of claim 1, wherein the spatial light modulator can control the size of spatial-spectral resolution elements.

9. The system of claim 1, wherein the spatial light modulator is operable to enable multiplexing in the direction of dispersion by presenting coded aperture patterns that are Hadamard encodements of single slit patterns in the direction perpendicular to said dispersion.

10. The system of claim 1, wherein the spatial light modulator is driven to emulate a conventional slit-scan imaging spectrograph by allowing only a line/slit perpendicular to the dispersion access to propagate through the system and then translating said slit from one end of full field of view to the other.

11. The system of claim 10, wherein slit width and height and location are controlled to enable the control of spectral and spatial resolution as well as the possibility to analyze a subregion of the full field of view.

12. The system of claim 1, wherein all imaging foreoptics and dispersion system all emply offner type reflective imaging optics which allow performance over multiple wavelength regions.

* * * * *